United States Patent
Hempleman et al.

(10) Patent No.: US 6,763,345 B1
(45) Date of Patent: *Jul. 13, 2004

(54) LIST BUILDING SYSTEM

(75) Inventors: James D. Hempleman, Chicago, IL (US); Sandra M. Hempleman, Chicago, IL (US); Neil A. Schneider, Lake Zurich, IL (US)

(73) Assignee: Premier International Investments, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/770,882

(22) Filed: Jan. 26, 2001

Related U.S. Application Data

(63) Continuation of application No. 08/859,995, filed on May 21, 1997, now Pat. No. 6,243,725.

(51) Int. Cl.[7] .......................... G06F 17/30; G06F 17/00; G10H 7/00
(52) U.S. Cl. .......................... 707/1; 715/530; 715/526; 84/601; 84/645
(58) Field of Search .......................... 707/530, 500–504, 707/512–513, 526; 709/200, 201; 84/601, 645; 715/512–513, 526

(56) References Cited

U.S. PATENT DOCUMENTS

| | | | | |
|---|---|---|---|---|
| 5,668,788 A | * | 9/1997 | Allison | 345/173 |
| 5,864,868 A | * | 1/1999 | Contois | 707/104 |
| 5,914,941 A | * | 6/1999 | Janky | 370/313 |
| 5,918,213 A | * | 6/1999 | Bernard et al. | 705/26 |

* cited by examiner

Primary Examiner—Alford Kindred
(74) Attorney, Agent, or Firm—Welsh & Katz, Ltd.

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

96 Claims, 32 Drawing Sheets

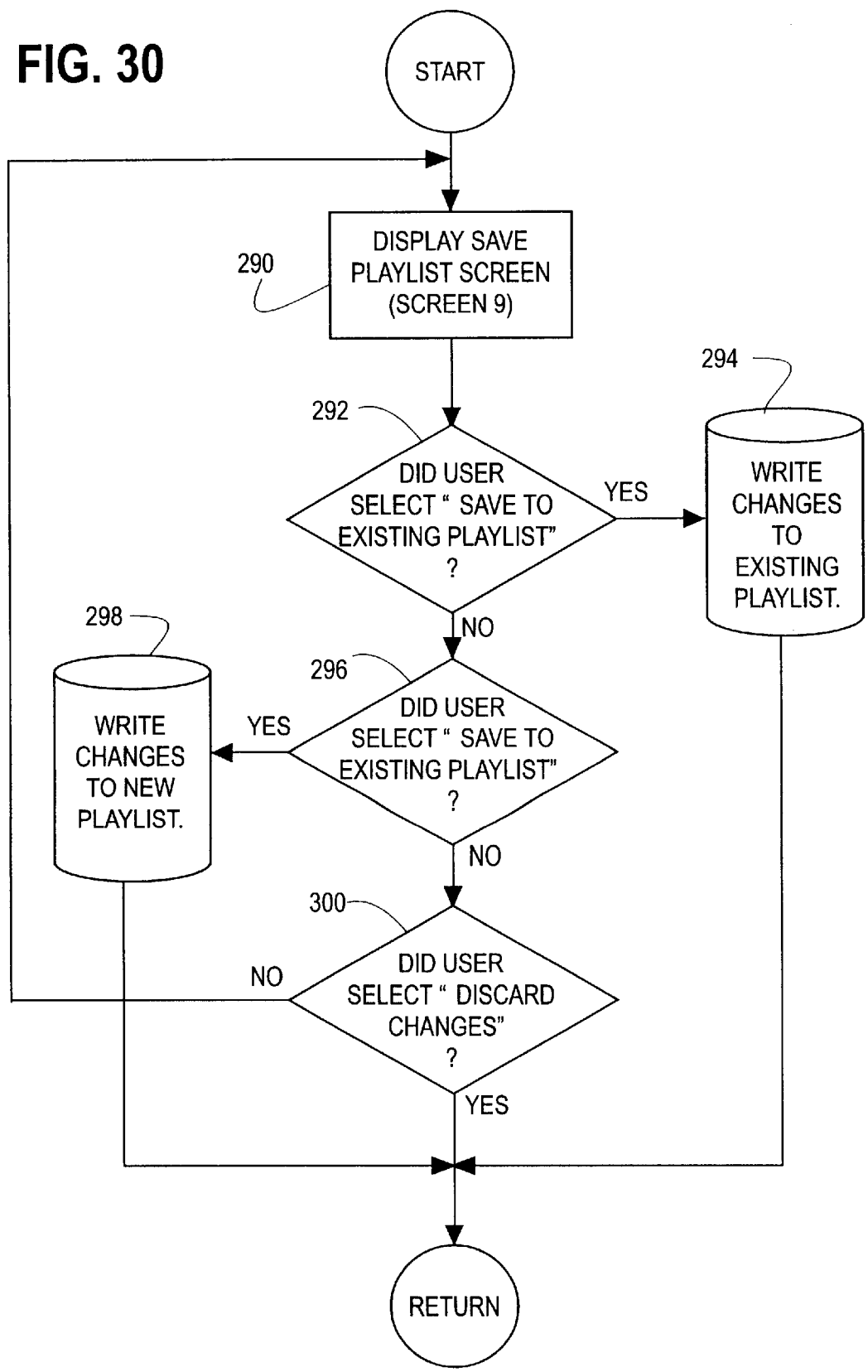

FIG. 4G

PlayList Editor

File  Options  Tables  Help

Recorder | PlayList Editor | PlayList Player | Reports

Media Inventory [Change Selection]

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | Rock N Roll | | 4/21/97 | 2:12 | yes |
| Help me Rhonda | Jan & Dean | Rock N Roll | | 4/29/97 | 2:56 | yes |
| I believe in you and me | Houston, Whitney | Bluegrass | | 4/29/97 | 4:02 | yes |
| Let it flow | Braxton, Toni | Pop | Audio only | 4/18/97 | 4:27 | yes |
| Little Honda | Hondells | Rock N Roll | | 4/21/97 | 2:02 | yes |
| My heart is calling | Houston, Whitney | Pop | | 4/29/97 | 4:15 | yes |

Destination PlayList [Change PlayList] [Save PlayList]  Title: [Dinner music 1]  Total Play: [1:38:45]

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | Audio only | 4/29/97 | 21:50 |
| Let it flow | Braxton, Toni | Pop | | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

[Play]  [Stop]

Volume L / R

Current Time: [06:54 pm]

FIG. 4I

PlayList Editor

File  Options  Tables  Help

Recorder | PlayList Editor | PlayList Player | Reports

Change Selection

Media Inventory

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | | | 4/21/97 | 2:12 | yes |
| Help me Rhonda | Jan & Dean | | | 4/29/97 | 2:56 | yes |
| I believe in you and me | Houston, Wh | | | 4/29/97 | 4:02 | yes |
| Let it flow | Braxton, To | | | 4/18/97 | 4:27 | yes |
| Little Honda | Hondells | | | 4/21/97 | 2:02 | yes |
| My heart is calling | Houston, W | | | 4/29/97 | 4:15 | yes |

Save PlayList

You have edited the current PlayList. Please select how you wish to save the changes Save to Existing PlayList Save to New PlayList Discard the Changes Destination PlayList  Change PlayList  Save

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Pop | | 4/9/97 | 4:26 |
| Surfer Girl | Beach Boys | Rock N Roll | | 4/9/97 | 6:42 |
| My heart is calling | Houston, W | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

OK

▲ Play    ■ Stop

Volume

Current Time: 07:03 pm

FIG. 4K

PlayList Player

File  Options  Tables  Help

Recorder | PlayList Editor | PlayList Player | Reports

PlayList Player | Change PlayList

Title: Dinner music 1    Total Play: 1:38:45

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |
| Ride the wild surf | Jan & Dean | Rock N Roll | | 5/1/97 | 35:54 |
| Surfer Girl | Beach Boys | Rock N Roll | | 4/9/97 | 38:10 |
| The little old lady | Jan & Dean | Rock N Roll | | 4/21/97 | 40:40 |
| Let it flow | Braxton, Toni | Pop | Audio only | 4/18/97 | 45:07 |
| Surfin' Safari | Beach Boys | Rock N Roll | | 4/9/97 | 47:10 |
| I believe in you and me | Houston, Whitney | Bluegrass | | 4/29/97 | 51:12 |
| Papa oom mow mow | Rivingtons | Rock N Roll | | 4/29/97 | 53:30 |
| Surfin' bird | Trashmen | Rock N Roll | | 4/21/97 | 55:49 |
| Exhale | Houston, Whitney | Pop | Audio and video | 4/9/97 | 59:14 |
| Wipe out | Surfaris | Rock N Roll | | 4/21/97 | 1:01:31 |
| Pipeline | Chantays | Rock N Roll | | 4/21/97 | 1:03:45 |
| Count on me | Houston, Whitney | Pop | Audio only | 4/18/97 | 1:08:12 |
| Surf City | Jan & Dean | Rock N Roll | | 4/21/97 | 1:10:43 |
| I believe in you and me | Houston, Whitney | Bluegrass | | 4/29/97 | 1:14:45 |
| Surfin' Safari | Beach Boys | Rock N Roll | | 4/9/97 | 1:16:48 |

Play  Stop  Pause

Volume L / R

Current Time: 07:07 pm    Time Complete: 08:24 pm

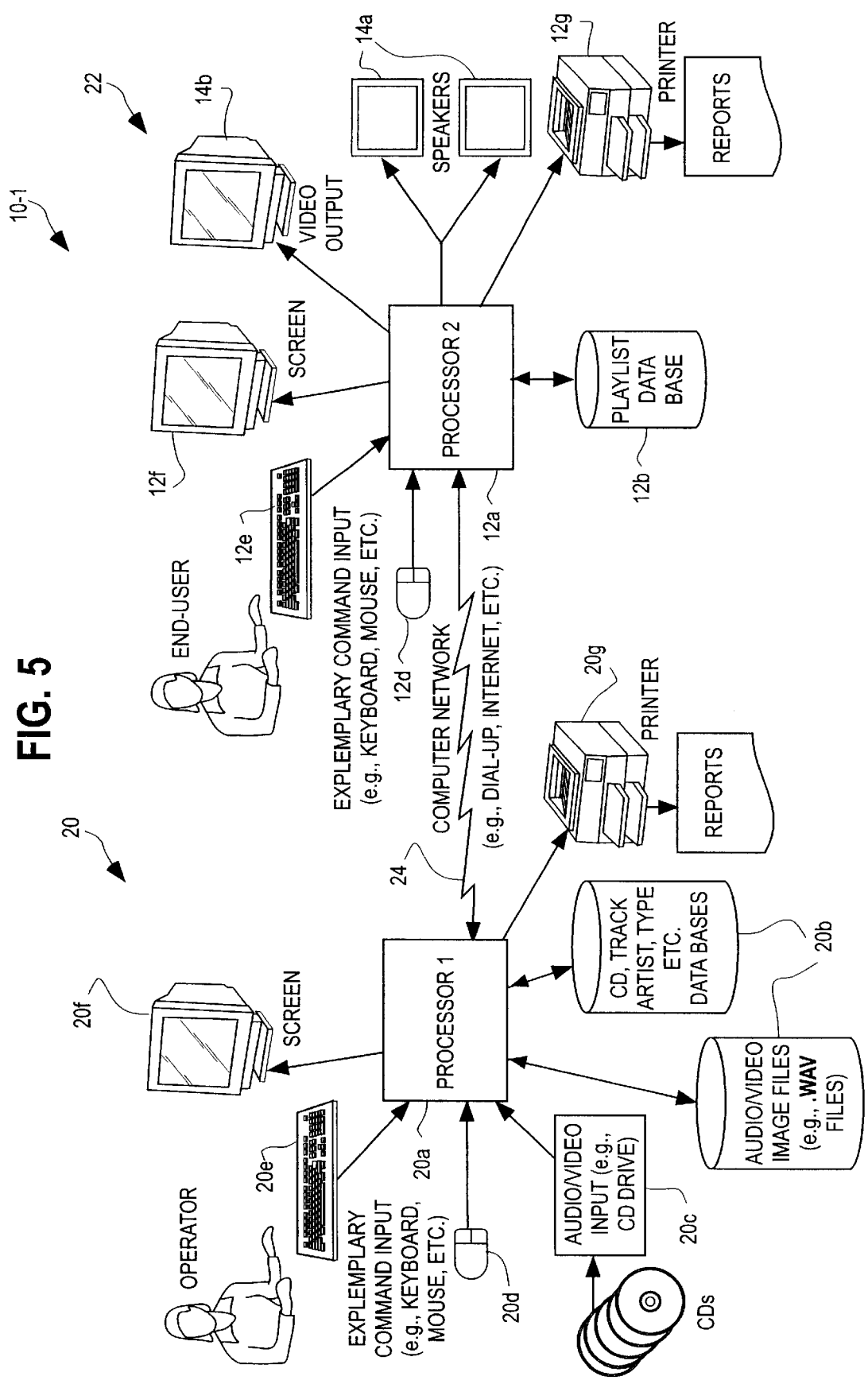

LIST BUILDING SYSTEM

This is a continuation of U.S. patent application Ser. No. 08/859,995, filed May 21, 1997, now U.S. Pat. No. 6,243,725 entitled List Building System.

FIELD OF THE INVENTION

The invention pertains to software driven systems and methods for developing audio/video sequences. More particularly, the invention pertains to such system and methods wherein a user can create an editable list of works which can be presented.

BACKGROUND OF THE INVENTION

With the advent of CDs a wide variety of music, music videos or video sequences are conveniently available for a user in a non-analog, digital format. The advantages of digital recording of both audio and video have been recognized and are to a great extent realized with the ready availability of pre-recorded CDs.

While convenient, pre-recorded CDs present a problem to a user in that while it is possible to select sequentially between the pre-recorded works on a given CD, to switch to another artist or group it is necessary to have multiple drives available or to remove one CD and insert another at the appropriate time. While possible, such arrangements are at the very least inconvenient. In addition, because of the delays inherent in switching from one CD to another, the audio or video output might be lost for an undesirably long period of time thereby detracting from the ambiance afforded by the performance. In addition, listeners at times are only interested in one or two of the tracks on a CD in a given situation.

There thus continues to be a need for systems and methods which will make it possible to combine works by a variety of performers or artists in a relatively arbitrary fashion and to present those works in a given sequence in a fashion that is convenient but which at the same time is cost effective. It would also be desirable to be able to use widely available personal computers as control elements in such systems.

SUMMARY OF THE INVENTION

A system and a method of arranging media elements for later replay make it possible to create new sequential presentations of the elements. The elements can be obtained from a local medium such as a CD, or a video tape. Alternately, the elements can be obtained from a remote location via wired or wireless transmission. Elements can include audio works such as music or audio/visual works including advertisements, music videos or other types of elements.

The elements can be stored on a readable digital storage medium. Some or all of the elements can be played back or performed individually.

A collection of separate elements can be identified and arranged. One form of arrangement is a list. Another is a non-linear tree-like arrangement.

The collection can be played back or performed sequentially as specified in a list. Alternately, the elements can be performed interactively as specified in a tree. In this embodiment, tree nodes represent decision points for a viewer or a listener.

A graphically-oriented editor is provided for building or editing lists or trees. The lists or trees can be stored and subsequently retrieved for editing or performing the collected media elements.

Output can, in one aspect, be an audible or a visible performance of the elements in accordance with a selected list or tree. In another aspect, the collection can be written to a medium. Hence, a CD or other digital medium can be written, or audio or video tapes can be recorded. The output medium is not a limitation of the invention.

In yet another aspect, a system incorporating a card reader or a vending unit can be used to build a list of elements. In this instance an appropriate credit needs to be established before an element can be added to an on-going collection being performed.

Subsequent to a credit being established and a selection or selections made in accordance with the credit, elements can be added to the list and performed. Elements can be exclusively audio. Alternately, elements can include both audio and video components without limitation.

In yet another aspect, the method includes building a list of media elements which can come from a variety of sources. Preferably, the media elements are storable in a digital format.

Subsequently, the list can be reviewed visually by a user and either modified or edited for the purpose of creating a sequence of media elements to be replayed or presented. Subsequently, the list is executed and the elements are either presented audibly or visually or both in accordance with their characteristics.

In a further aspect, a digitized inventory of media elements can be created by either reading a local digital medium, such as a CD ROM or by receiving, via wireless transmission, digitized sequence of works which can then be stored in the inventory. If desired, the user can preview some or all of any element in the inventory.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 4A through 4K illustrate various screens presentable by the control program illustrated in FIGS. 3A through 3P;

FIG. 5 is a block diagram of a system intended to receive audio or visual works from a remote source;

DETAILED DESCRIPTION OF THE PREFERRED EMBODIMENTS

Figure 1:
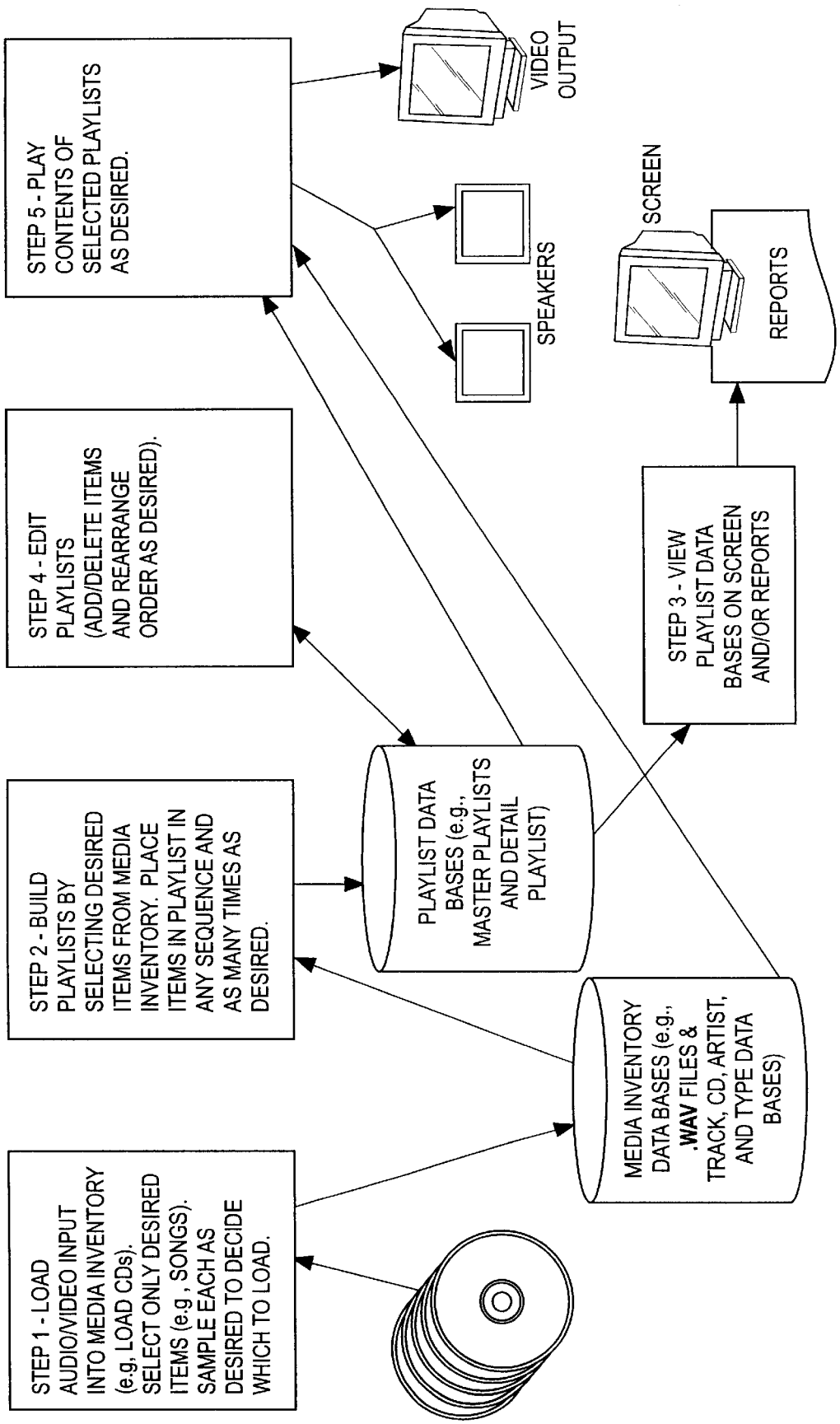
FIG. 1 is an overall flow diagram of a method in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the present invention enable the user to acquire, for example, digitized audio or audio and video works, which are of interest and which are to be represented either in real time as an audio or an audio/visual work or to be written onto a digital storage medium as part of a sequence selected by the user. Functional capability is provided enabling the user to create one or more composite play or presentation lists which incorporate a plurality of titles or designations of the works in a user selected order. The works could come from a variety of different sources and could include other types of sensory outputs without limitation.

As part of the list preparation process, the user can listen to or view some or all of any of the works. A new list can be graphically created. An existing list can be edited to revise existing works identified in the list, change the order of presentation or to add new ones. Subsequently, the list can be executed and the works performed.

Execution of the list will present the works in the determined sequential order audibly or visually and audibly depending on the nature of the work. Alternately, the works represented on the list can be written to a digital storage medium, such as a CD or DVD for subsequent presentation.

FIG. 1 illustrates steps of a method 10 for preparing executable playlists in accordance with one aspect of the invention. In an initial step, selected audio or video elements can be loaded into a digital database, a media inventory, for review and subsequent presentation. Media elements can be obtained from locally played sources or by wireless signals received from a remote source, such as via an antenna, which are demodulated and stored in digital form in the media inventory.

In the next step, a plurality of playlists can be created by graphically selecting media elements to be entered into a selected list from the inventory. As part of the step, one or more playlist records can be built and stored.

In a subsequent step, the lists in the playlist database can be viewed and various reports concerning the subject list can be created.

In a subsequent step, one or more of the lists can be graphically edited thereupon rearranging items in a list, adding items or deleting items as desired.

Finally, a particular list can be selected and executed. Audio works are presented sequentially, in accordance with the selected list, via audio output transducers, typically speakers. Video works or audio/video works or presented in accordance with the selected list on a video display in combination with speakers.

If desired, a selected list or lists can be written to a storage medium such as a CD ROM for later use. If desired, the associated media elements can also be written on to the medium.

A variety of services can be provided to a user while carrying out the steps of the method 10. Analysis can be conducted of the characteristics of various works. For example, beats per minute can be determined and audio works can be sorted accordingly. A list or lists can be created in accordance with a pre-selected tempo or beats per minute.

Sorting or selecting based on other features of audio or video characteristics of the works can also be included. Presentations via a selected list can be controlled based on selected features.

For record keeping purposes, the number of times a given media element is presented or executed can be logged along with date and time information. Reports reflecting any lists created based on any of the above selection features or characteristics can also be printed for invoicing, billing or royalty payment purposes.

Figure 2:
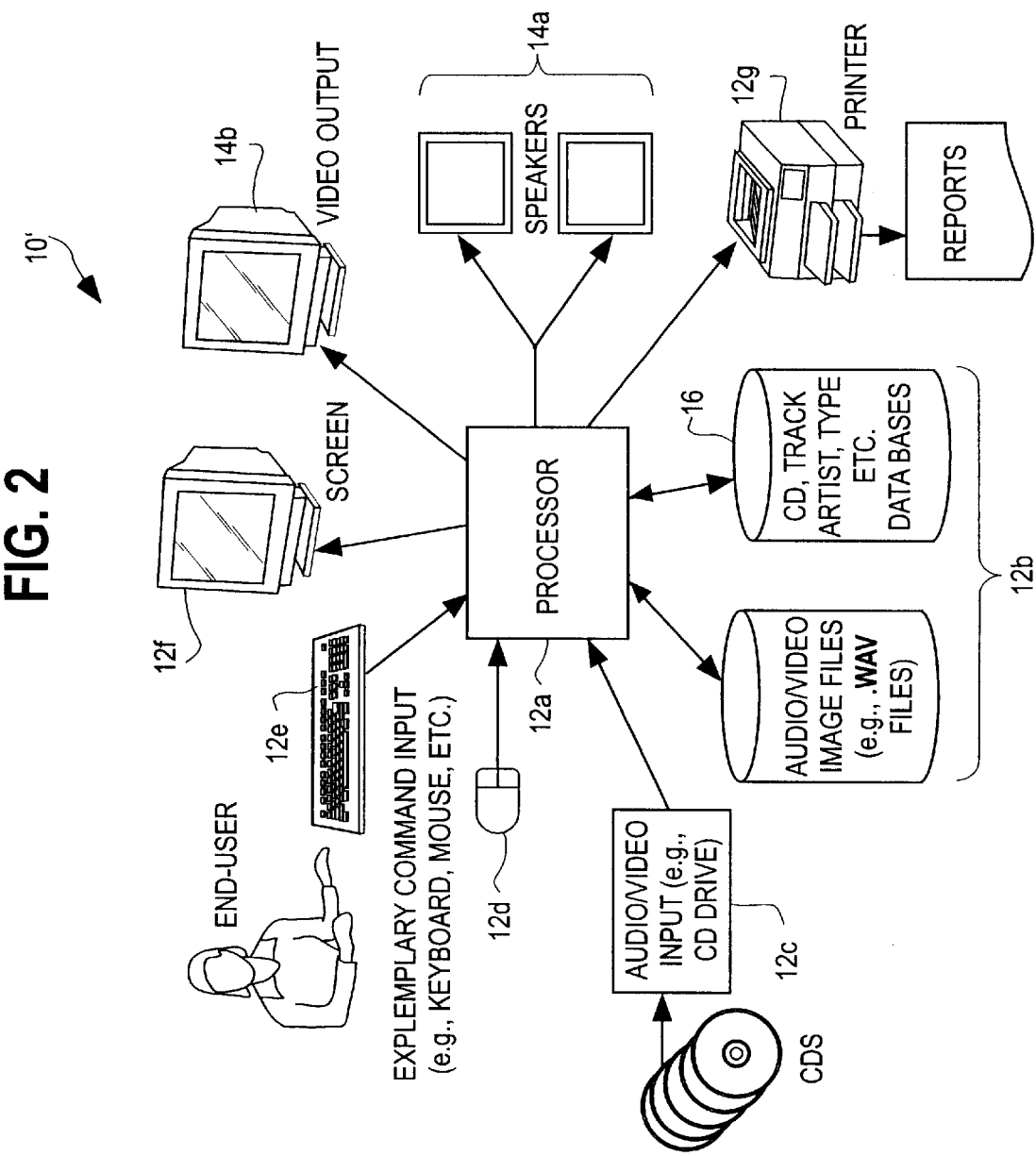
FIG. 2 is a block diagram of a system useable for practicing the method of FIG. 1.

FIG. 2 illustrates in block diagram form a system 10' for implementing the method 10 of FIG. 1. The system 10' incorporates a programmable processor 12a, for example, a personal computer of a selected variety. Coupled to the processor 12a is a mass digital storage medium 12b, such as a hard disk drive for storage of various databases and programs.

Coupled to the processor 12a is a source of digitized audio or audio/visual input signals such as a CD ROM drive 12c. Media elements or works can also be received wirelessly. Also coupled to the processor 12a are user input devices such as a mouse 12d and a keyboard 12e. Other input devices could also be used without limitation.

Output devices include a display screen 12f of a type conventionally used with programmable processors to present visual display of ongoing programs being executed to the user. A printer 12g is available to provide reports.

Audio and video output devices for media elements include speakers 14a and video output device 14b which can be of a size and quality suitable for the type of works being displayed. Other output devices could also be used.

The hardware components of the system 10' interact in accordance with the user inputs and under the control of a control program 16 stored in one of the storage devices 12b. The control program 16 includes pre-created commands for carrying out the method 10 illustrated in FIG. 1.

Figure 3A:
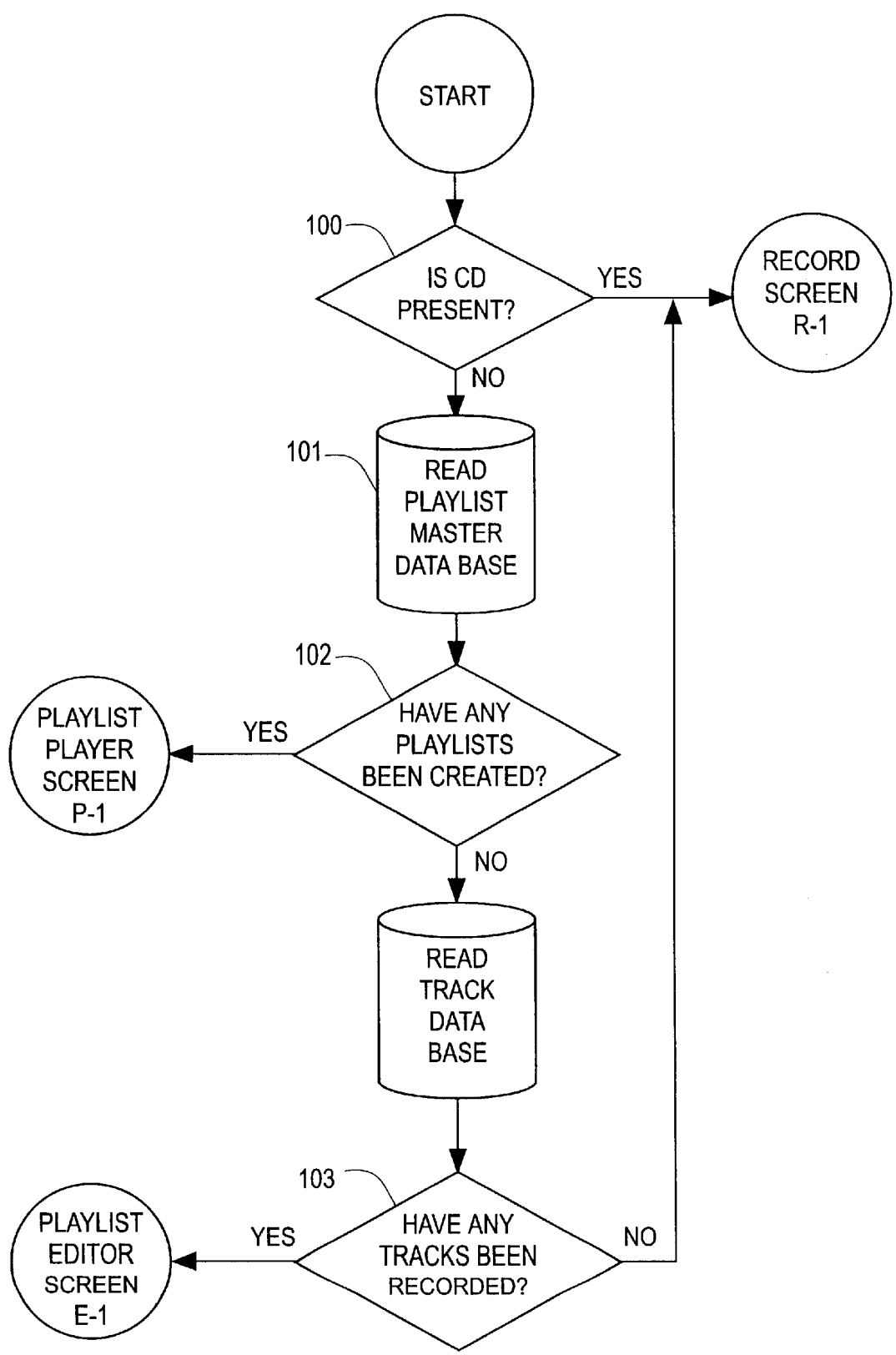
FIGS. 3A through 3P taken together illustrate a flow diagram of a control program useable with the system of FIG. 2.

The control program 16 is described in a set of flow diagrams illustrated in FIGS. 3A . . . 3M. FIGS. 4A–4K illustrate various exemplary displays presented on the display unit 12f while the control program 16 is executing.

Figure 3B:
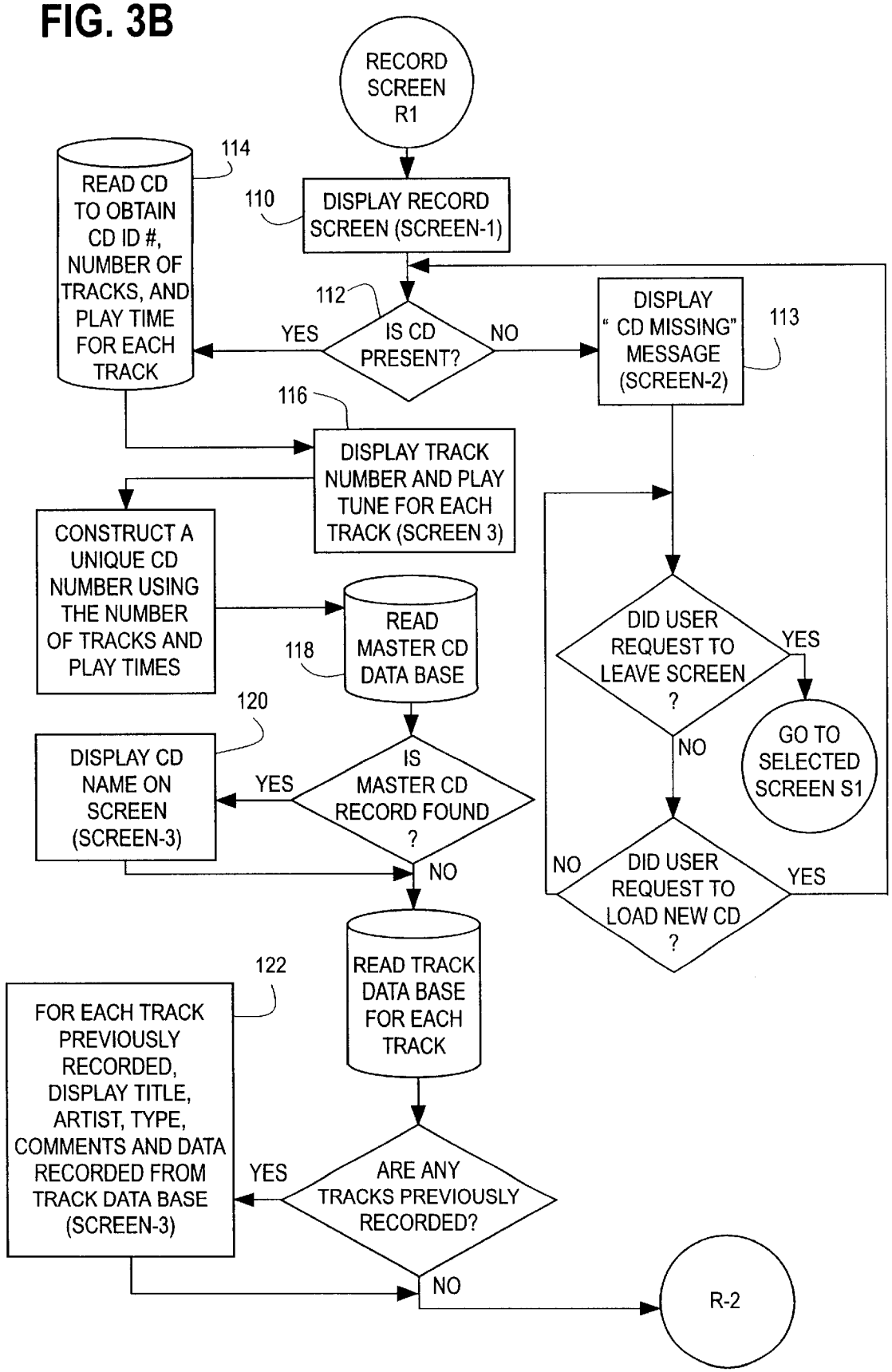
Figure 3C:
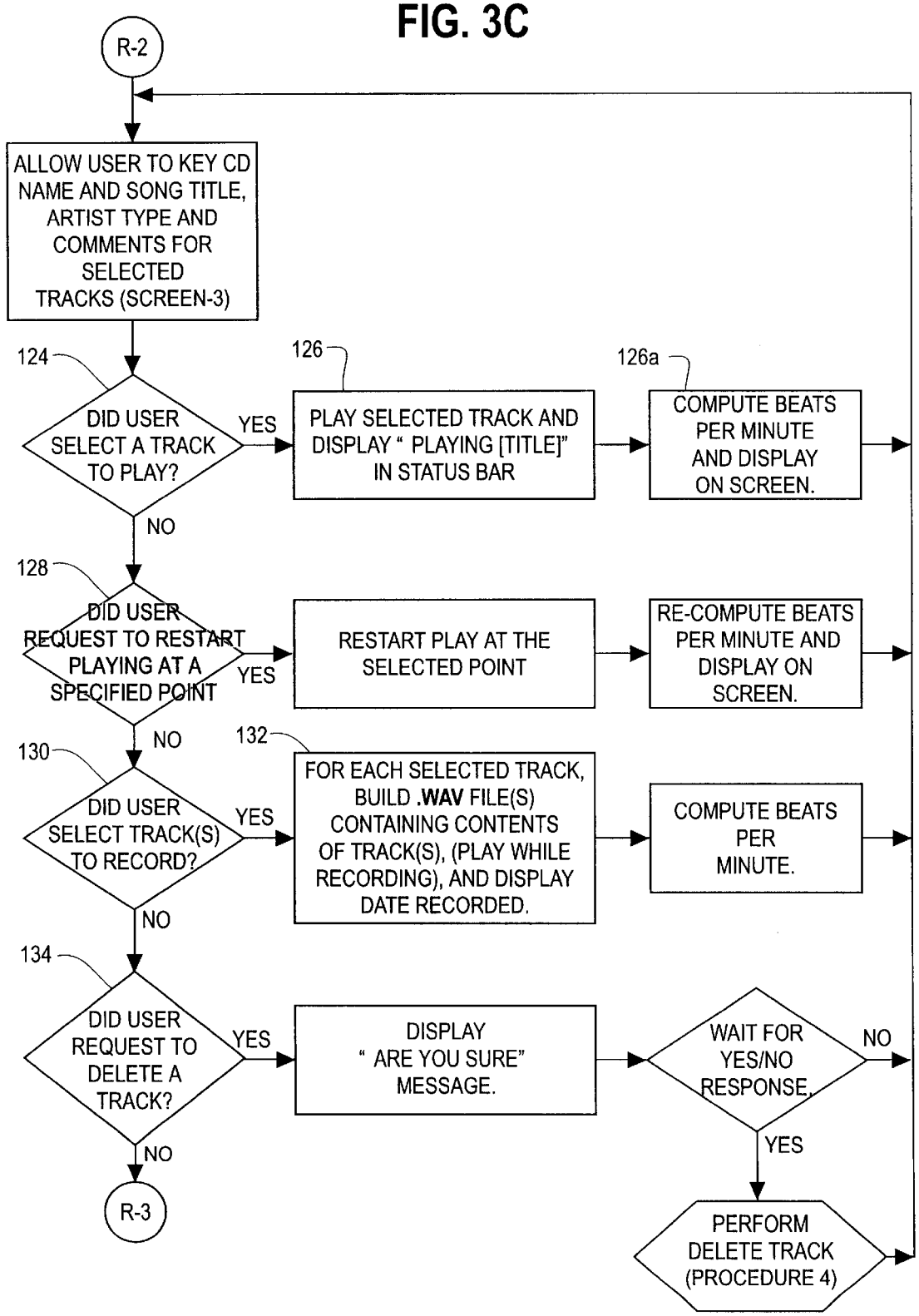
Figure 3D:
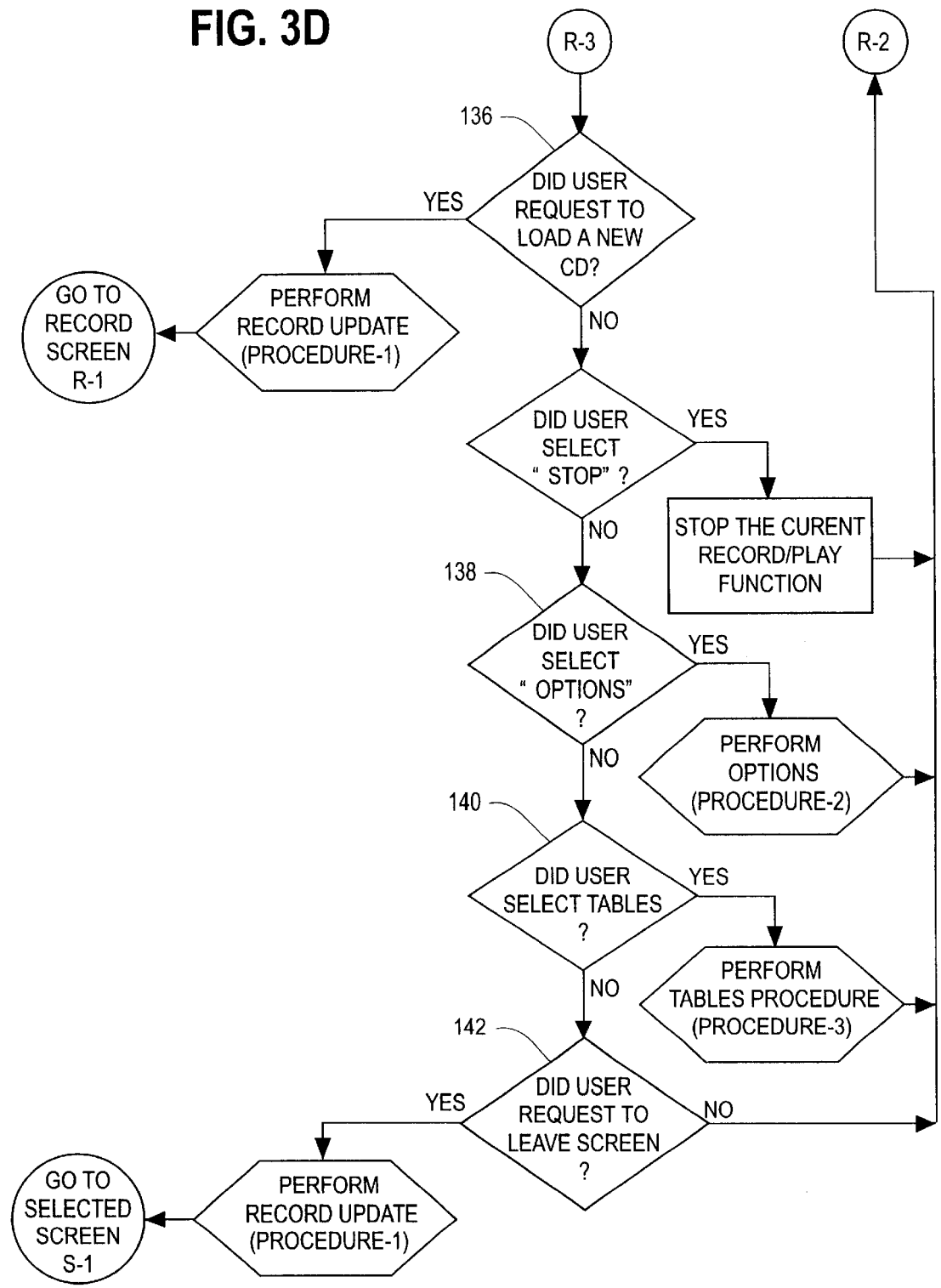
Figure 3E:
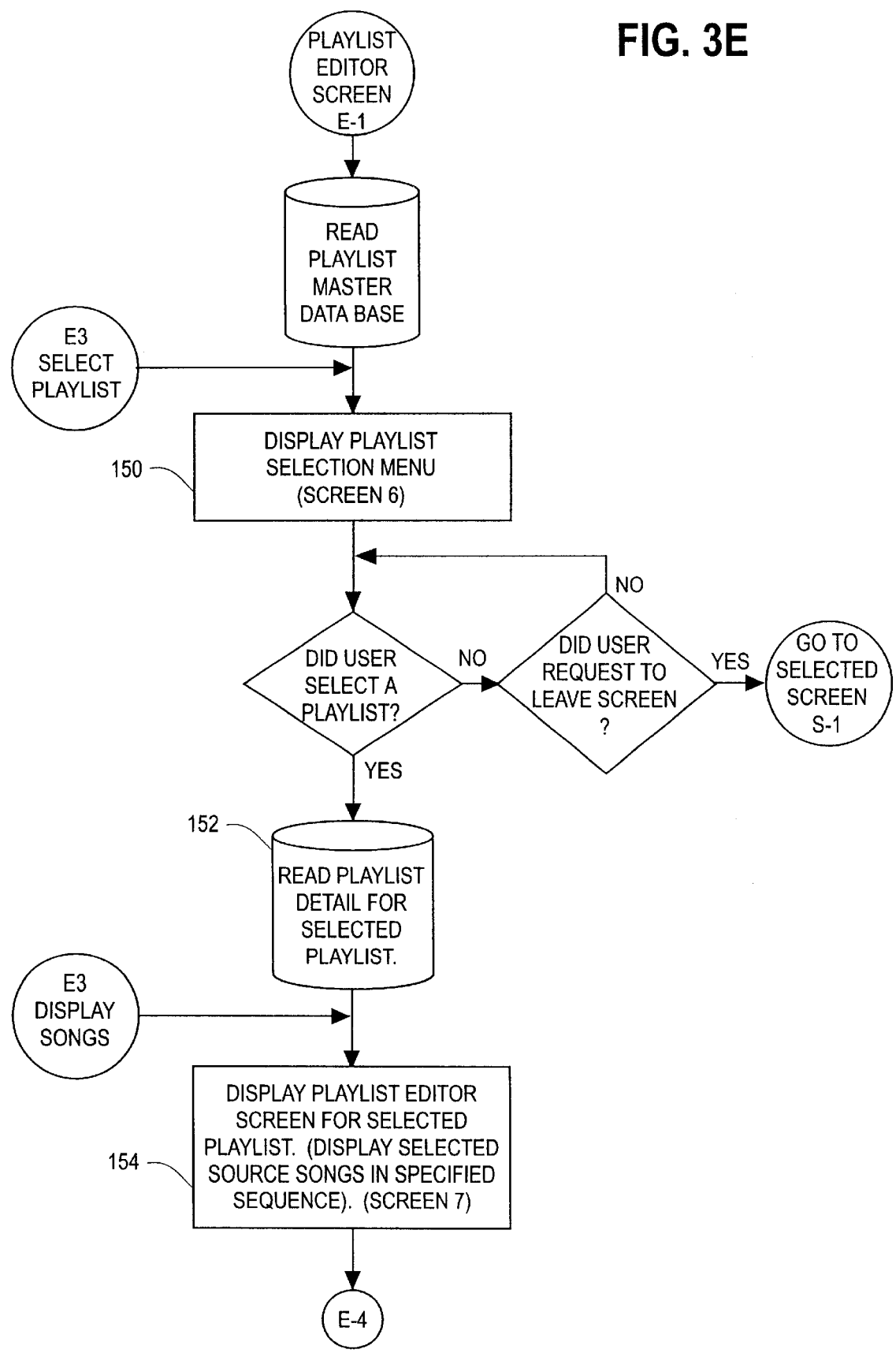
Figure 3F:
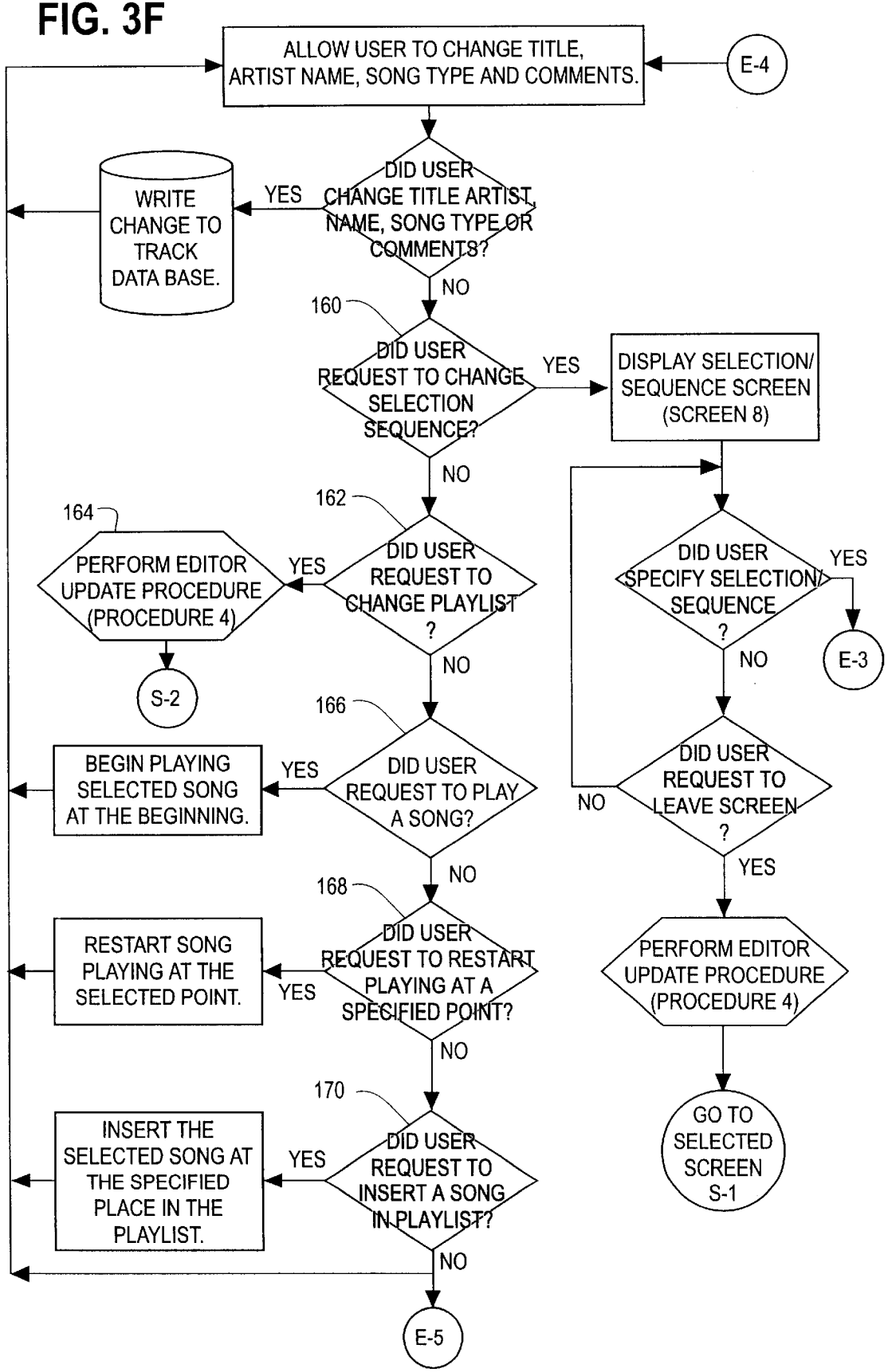
Figure 3G:
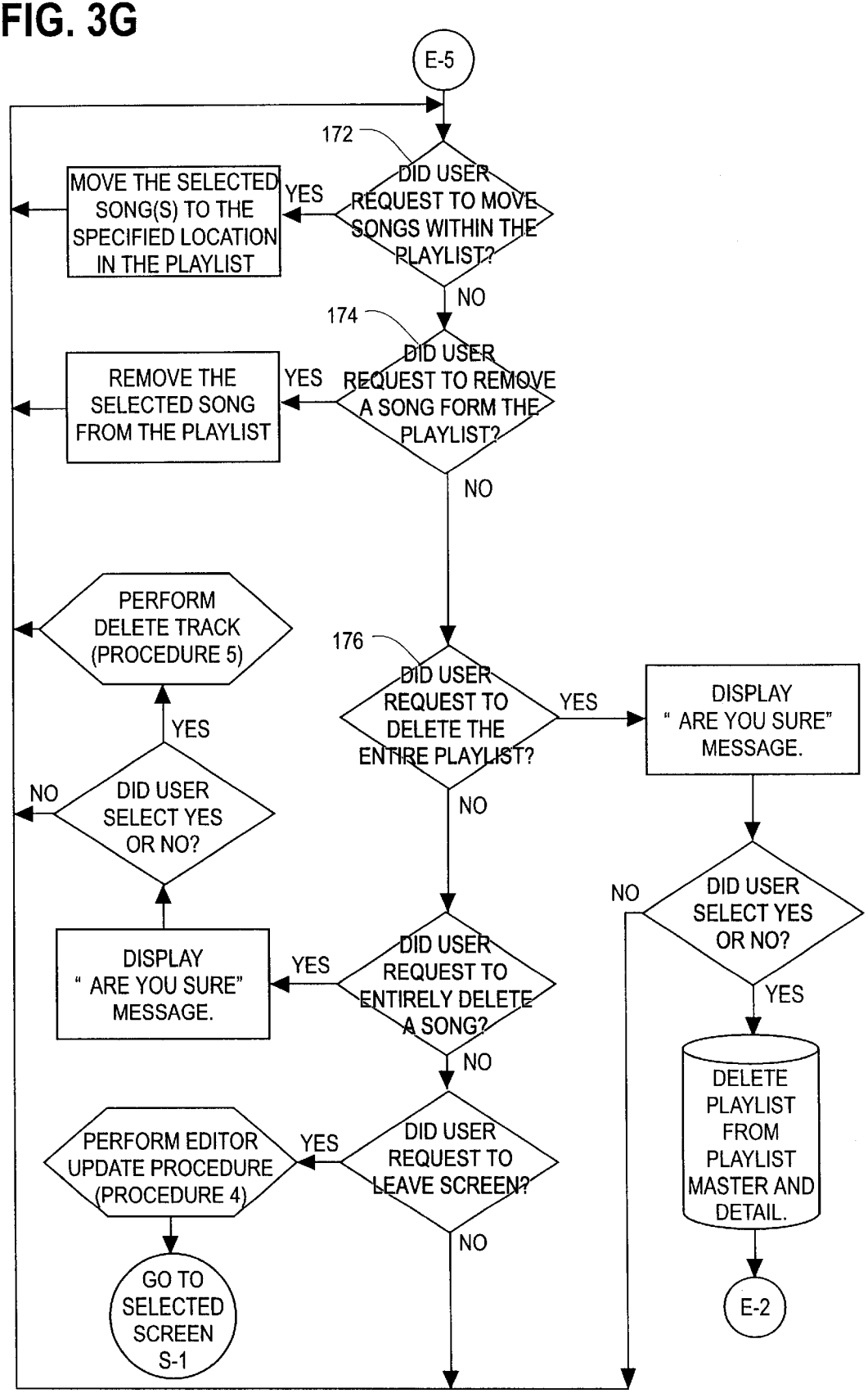
Figure 3H:
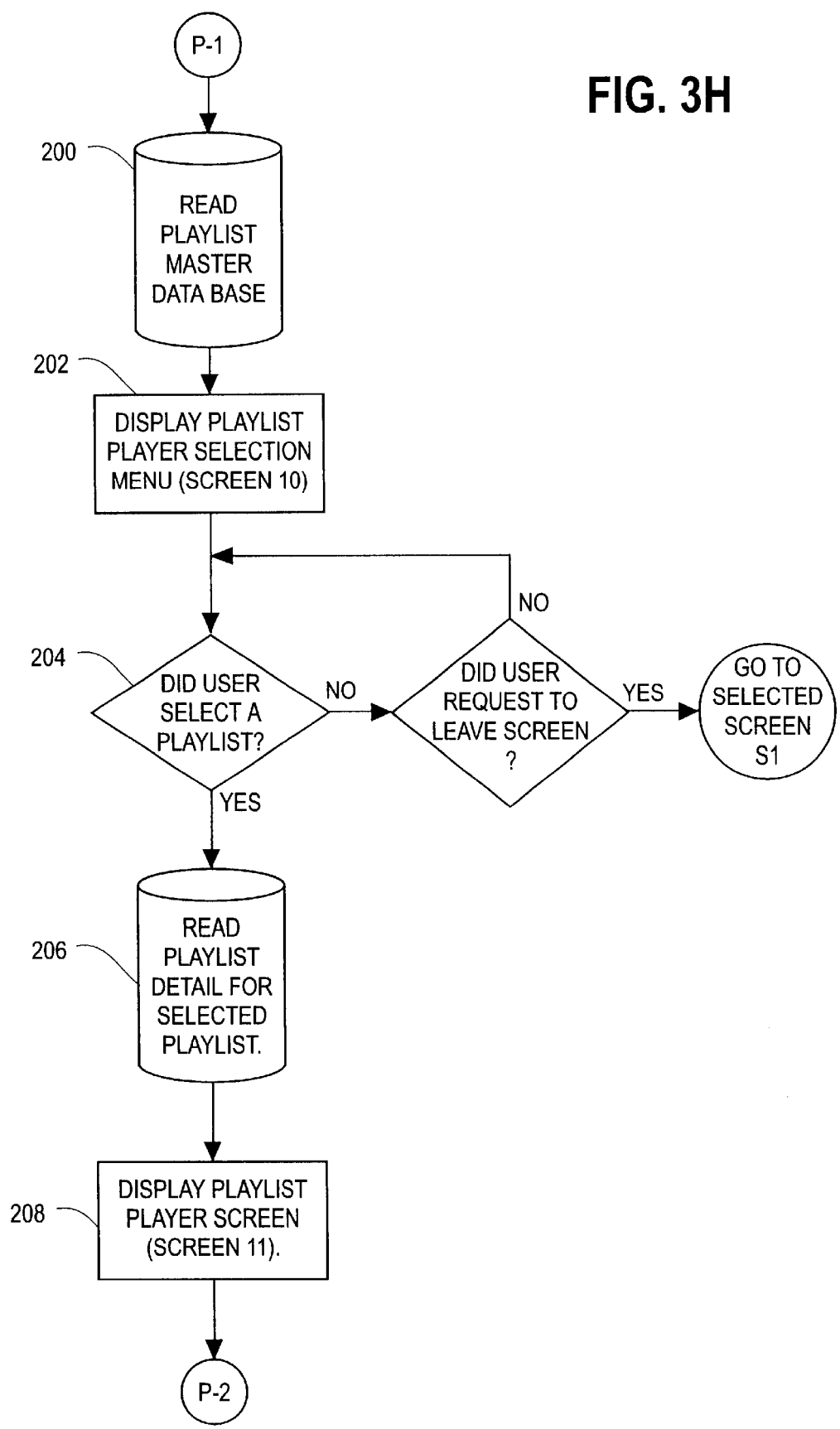
Figure 3I:
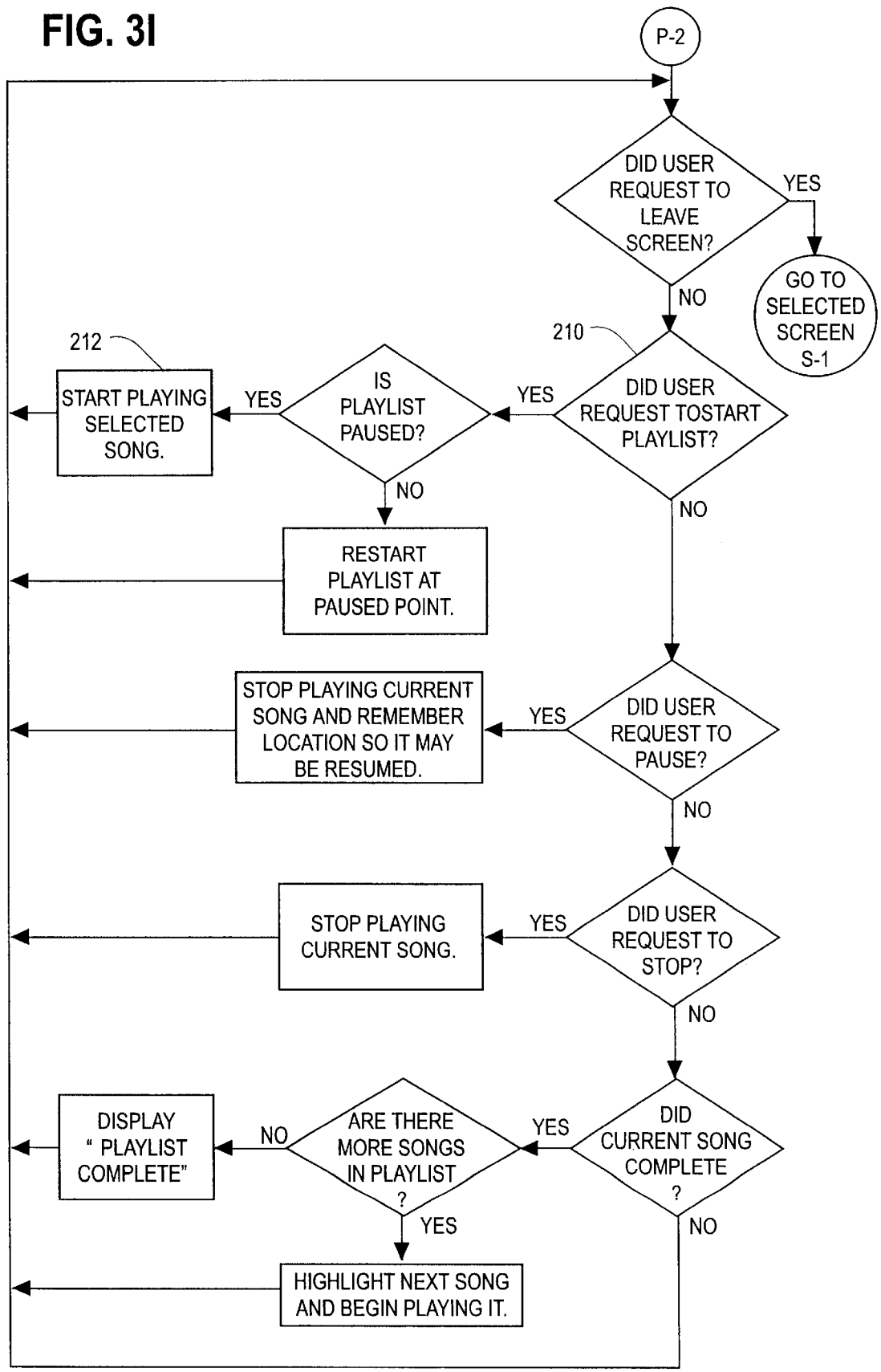

FIG. 3A illustrates the initial steps in reading a source of digitized works, such as a CD and in selecting either the record sequence, FIGS. 3B, 3C, and 3D, the list player sequence FIGS. 3H and 3I, or the playlist editor sequence FIGS. 3E, 3F and 3G. In step 100 a determination is made if a CD is present in the drive 12c. If so, the program 16 initiates record steps illustrated in FIGS. 3B, 3C and 3D. If not, the playlist master database is checked in a step 101. If playlists had previously been created, the playlist screen sequence is executed, FIGS. 3H and 3I in step 102. Alternately the editor sequence can be entered, FIGS. 3E, 3F and 3G in step 103.

Figure 4A:
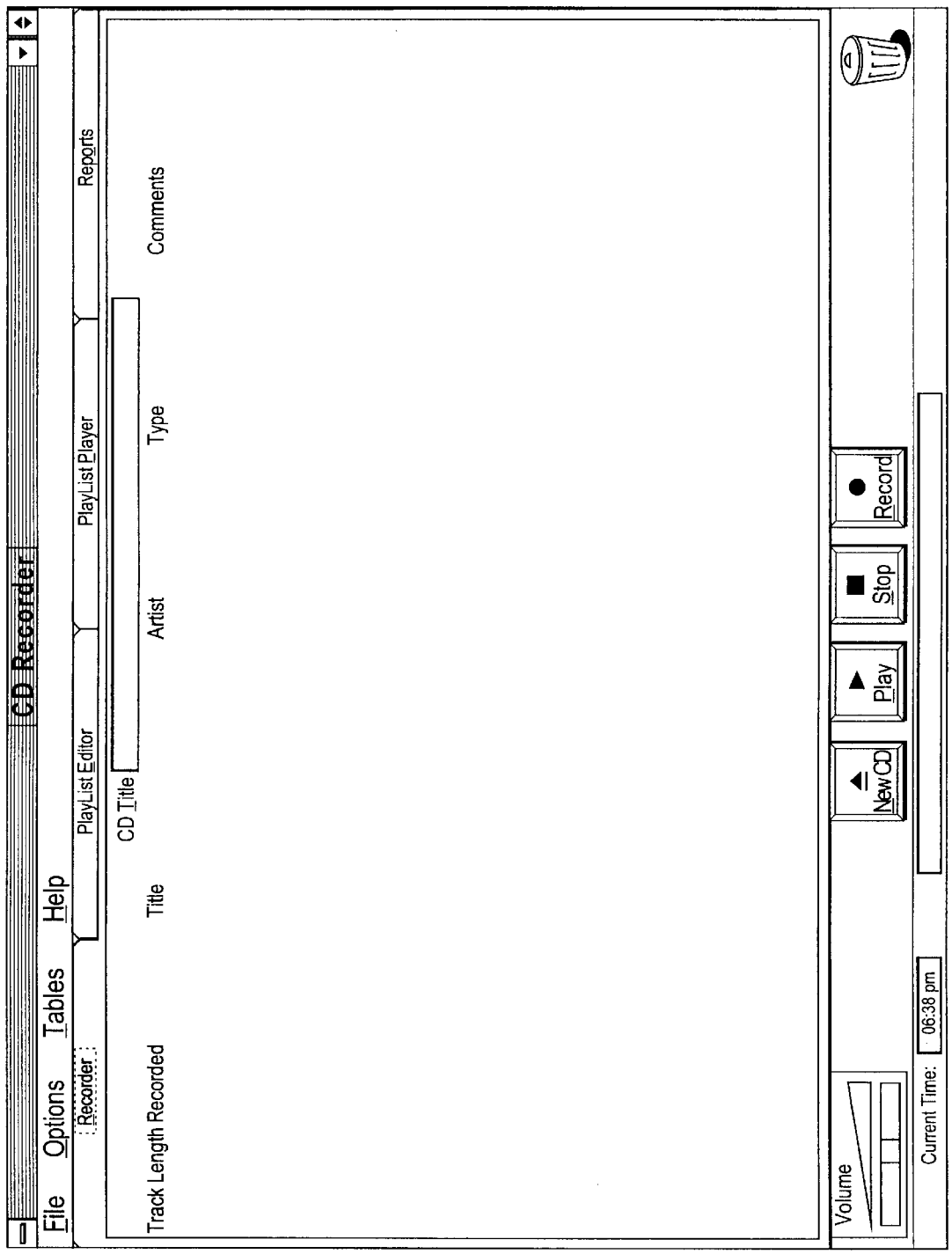
Figure 4B:
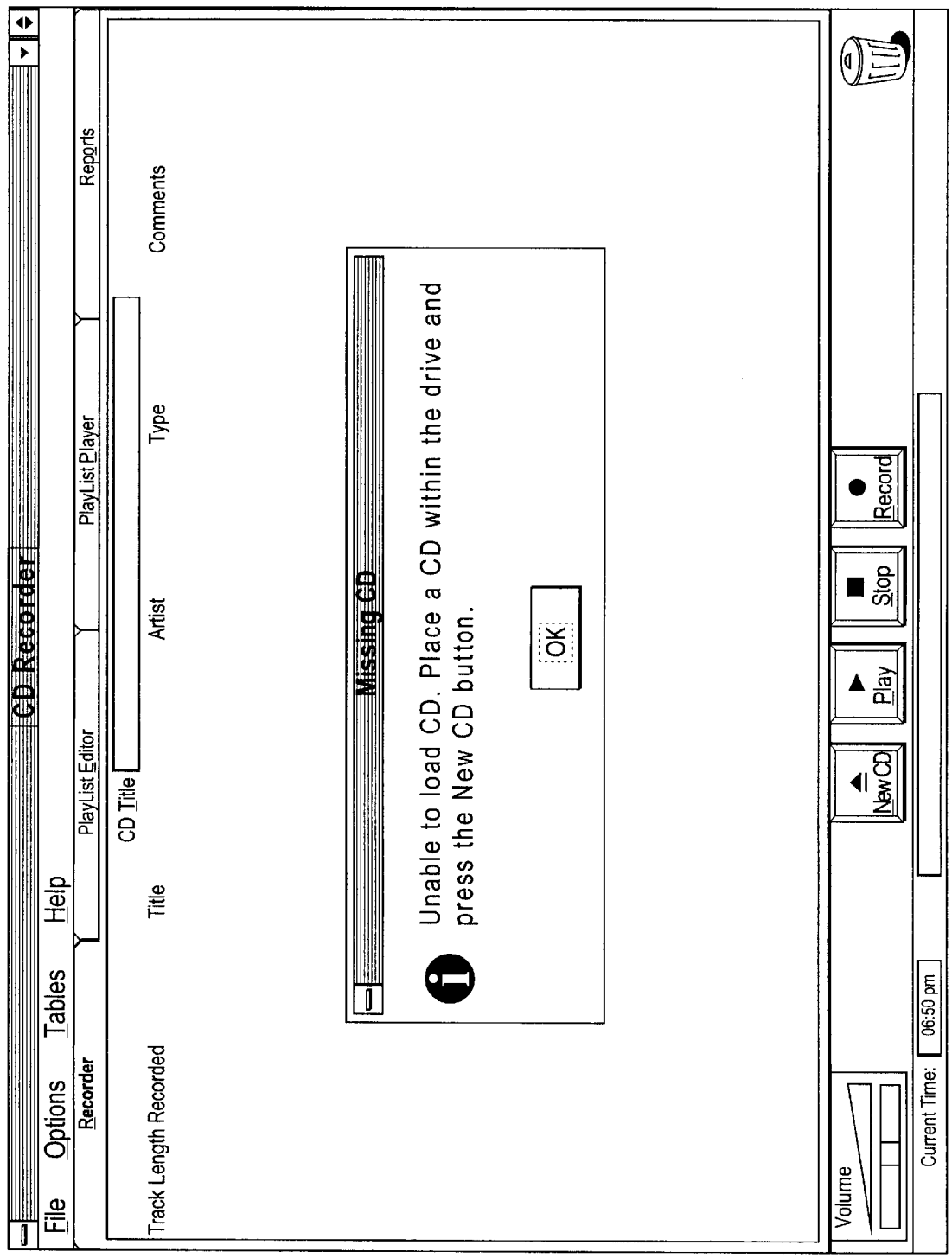

With respect to the record sequence FIG. 3B, during the process of recording information off of the respective CD, in a step 110 an initial screen, FIG. 4A is displayed. If the processor 12a determines in a step 112 that a CD is not present, then a CD missing display, FIG. 4B is presented in a step 113.

Figure 4C:
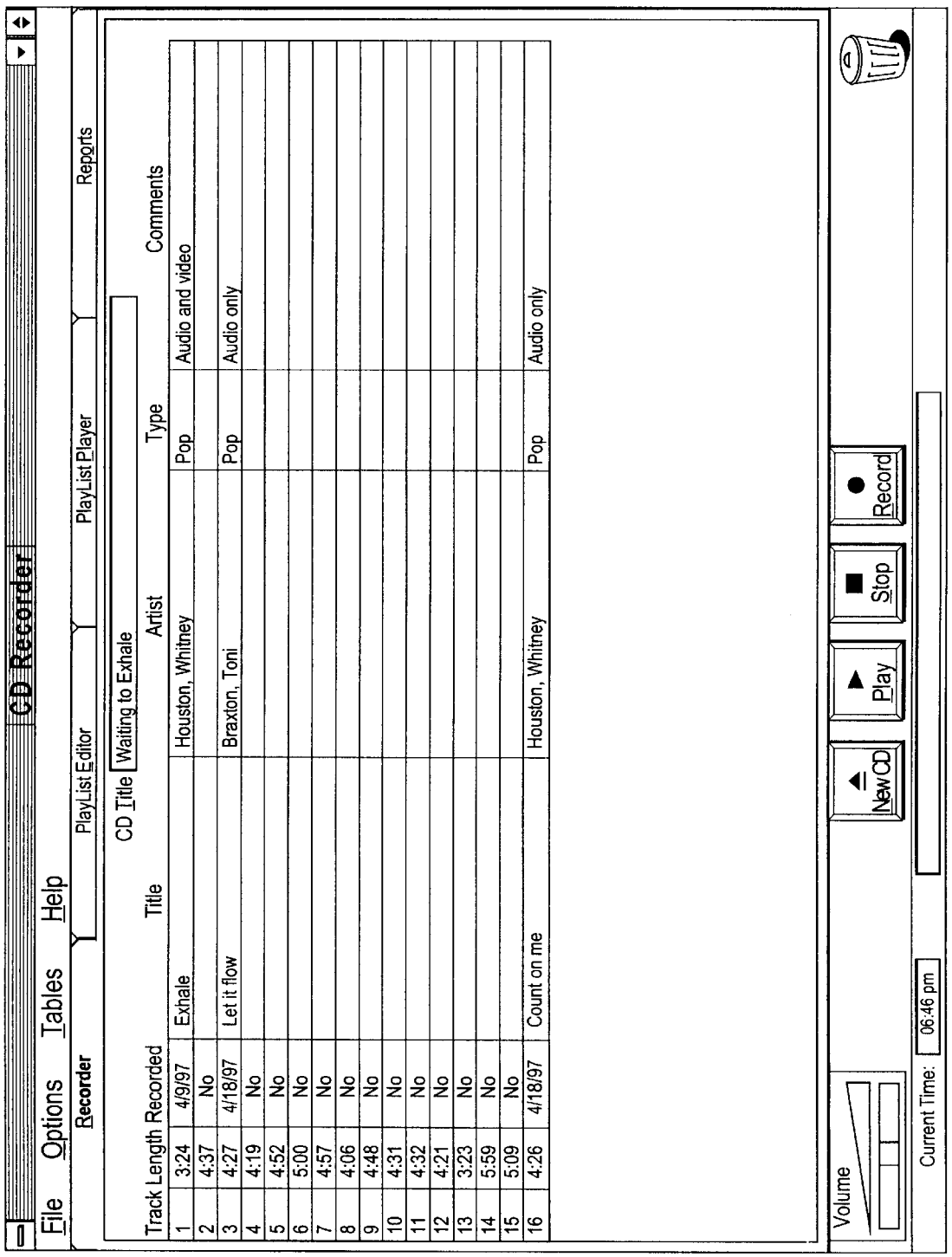
Figure 4D:
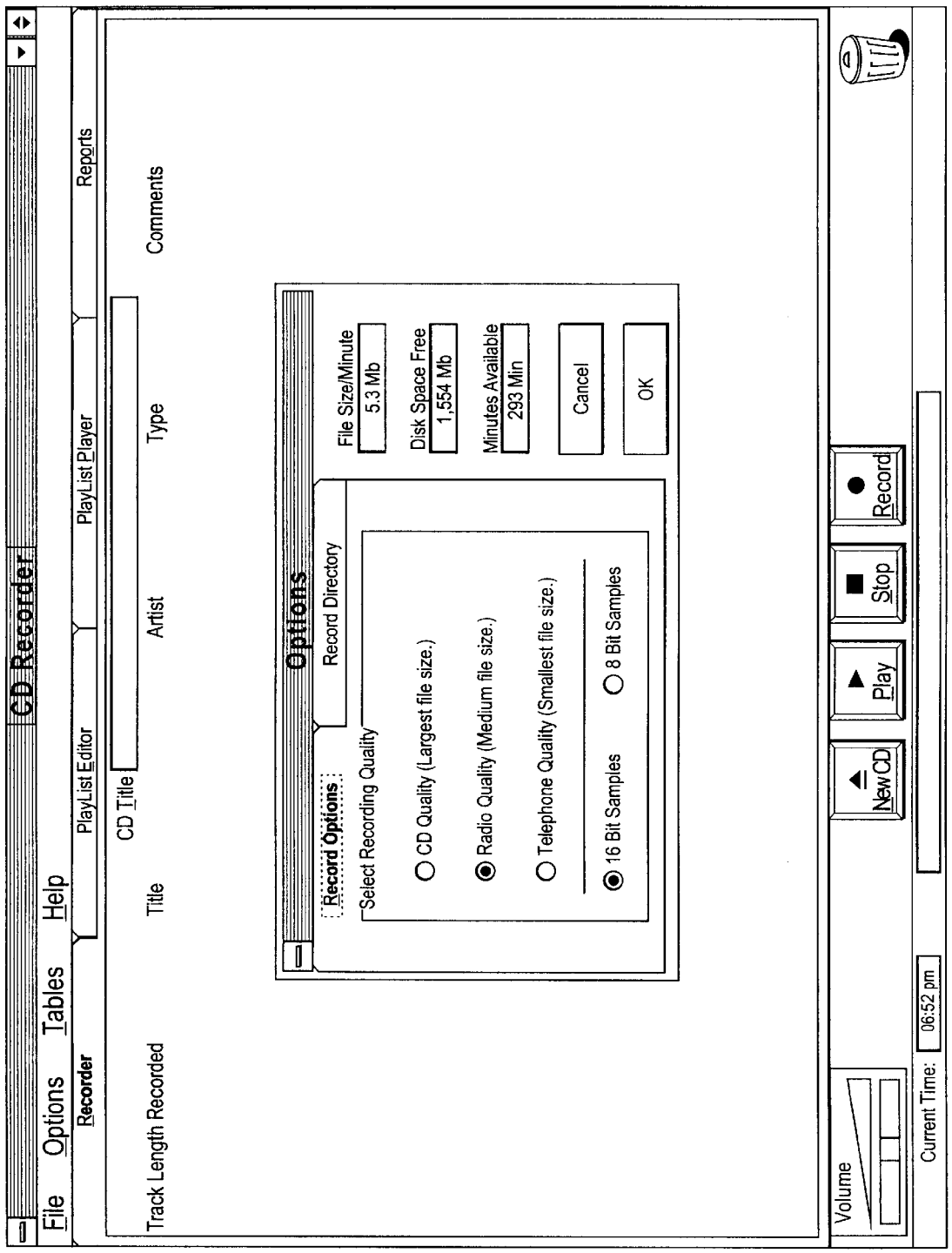
Figure 4E:
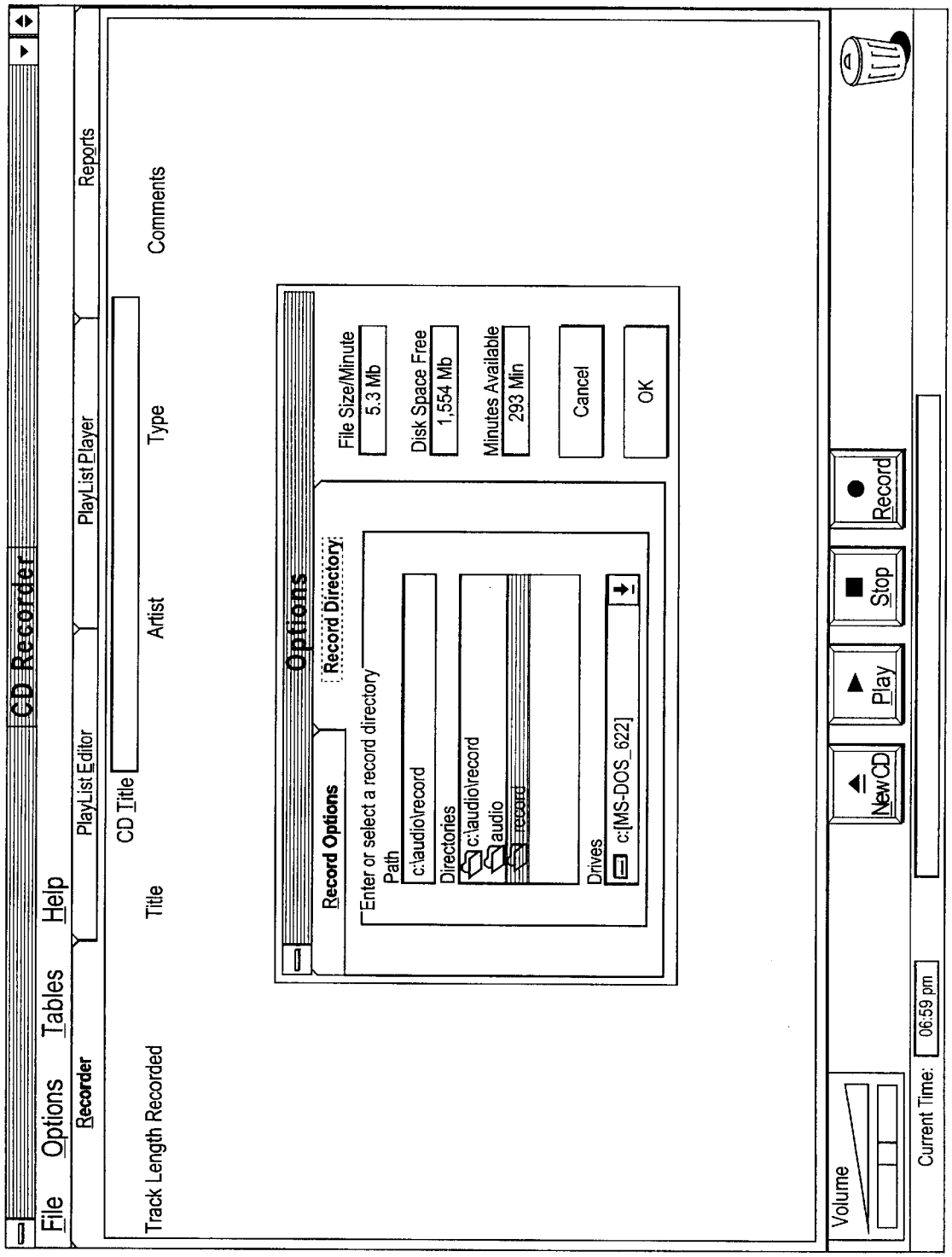
Figure 4F:
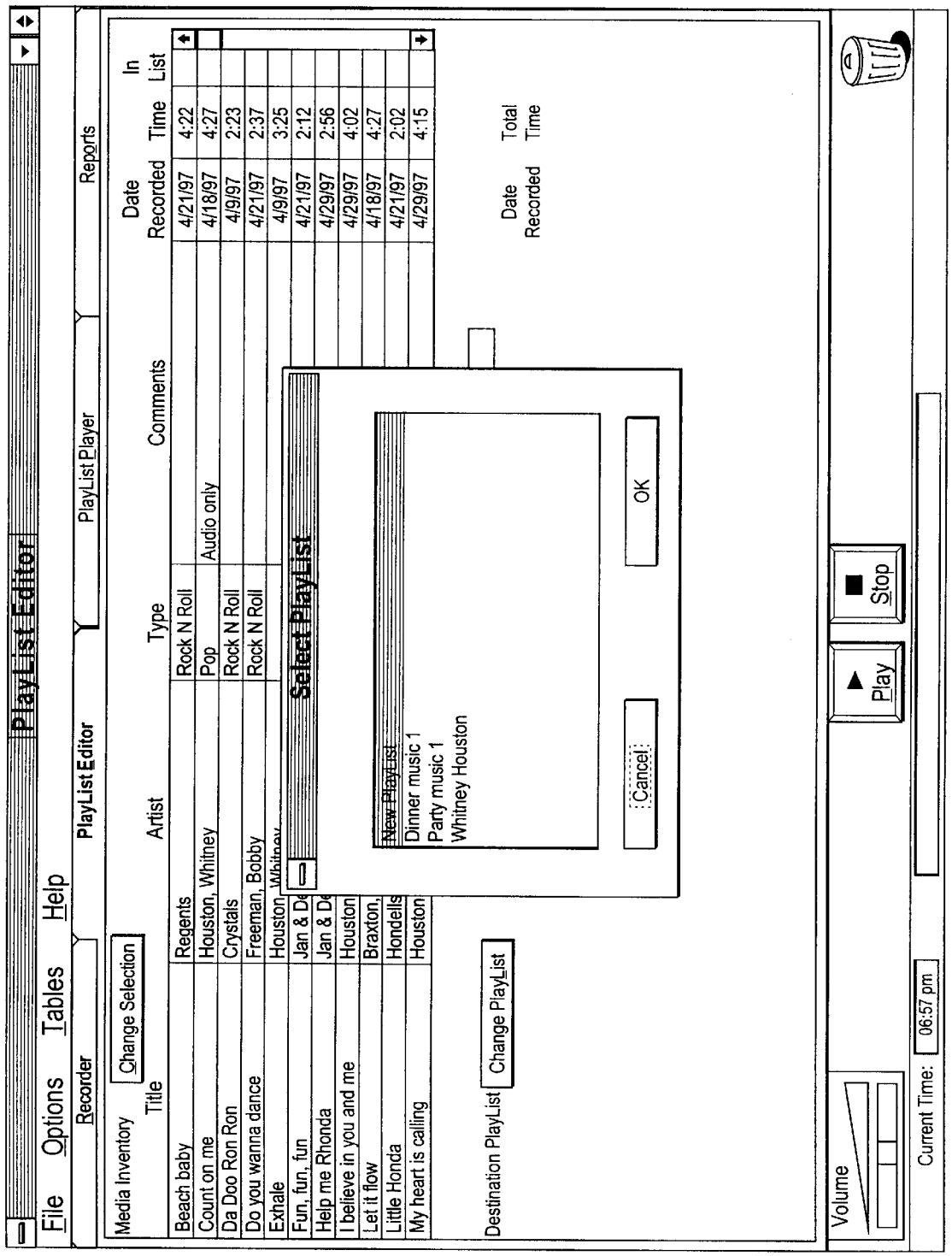

In the event that a CD is present, in a step 114, information will be read off of it as to track numbers and play times and displayed in a step 116 as in FIG. 4C. In a step 118, the master CD database is checked and if a corresponding record is found, in a step 120 the name of the CD is displayed, as indicated in FIG. 4C. Where tracks off of the respective CD had been previously recorded, in step 122, that information will be retrieved from the track database and displayed also as illustrated in FIG. 4C. The length of each track, recording date, title artist and type of work all can be displayed.

With respect to FIGS. 3C and 3D, in a step 124 the control program 16 determines whether or not the user has selected a track to play. If so, the selected track is played in a step 126. If desired, as illustrated in a step 126a characteristics of the work such as beats per minute can be computed and displayed for the user.

In a step 128, the control program 16 checks to determine whether or not the user requested restart of a work at a specified point. If not the system determines in a step 130 if the user has selected one or more tracks to be recorded. If so, in a step 132, selected tracks are recorded.

The system control program 16 also determines whether or not the user has requested a deletion in a step 134 or requested that a new CD be loaded in a step 136, select options in a step 138, a tables function in a step 140 or an exit function in a step 142. In each of steps 136, 138, 140 and 142, the requested respective procedure is carried out.

Where a user has selected the edit screen, illustrated in FIGS. 3E, 3F and 3G, one or more pre-existing playlists can be retrieved and edited. In a step 150, a playlist selection menu is displayable by the control program 16, in accordance with FIG. 4F. Using the selection menu a particular playlist can be selected and the detail retrieved in a step 152 for the selected playlist. The selected playlist can be displayed for editing as illustrated in FIG. 4G in a step 154. For the convenience of the user, the editor screen, FIG. 4G, illustrates in an upper section, an inventory list of available works currently in inventory which can be selected and entered into the destination playlist, in the lower portion of the display illustrated on FIG. 4G.

Figure 4H:
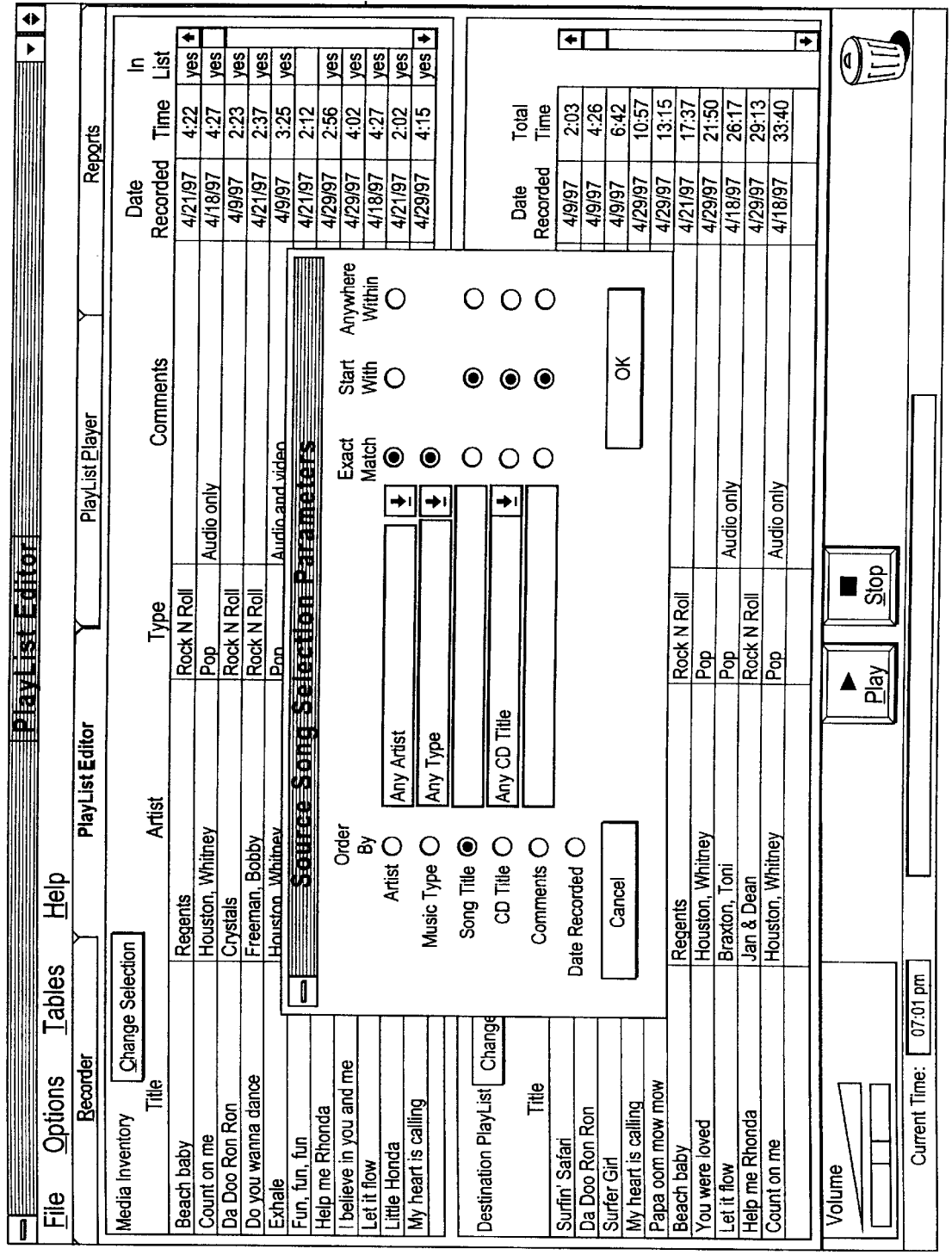

As illustrated in FIG. 3F, in a step 160, a user can edit or revise selections or the sequence of selections in the subject list using an editor selection screen as illustrated in FIG. 4H. In the event that the user requested a change in the play sequence in a step 162, an update procedure is executed in a step 164 corresponding to FIG. 3D and FIG. 4I. It will be understood that standard editing-type functions will be available to the user as would be known to those of skill in the art.

In a step 166 the user can request that a particular selected work be played or presented. The works can be restarted in a step 168 at a particular point.

The user can insert a work or a song in playlist in a step 170. With respect to FIG. 3G, a work or song can be moved within the playlist in a step 172. A particular song or work can be removed from the selected playlist in a step 174. The entire playlist can be deleted in a step 176.

Figure 4J:
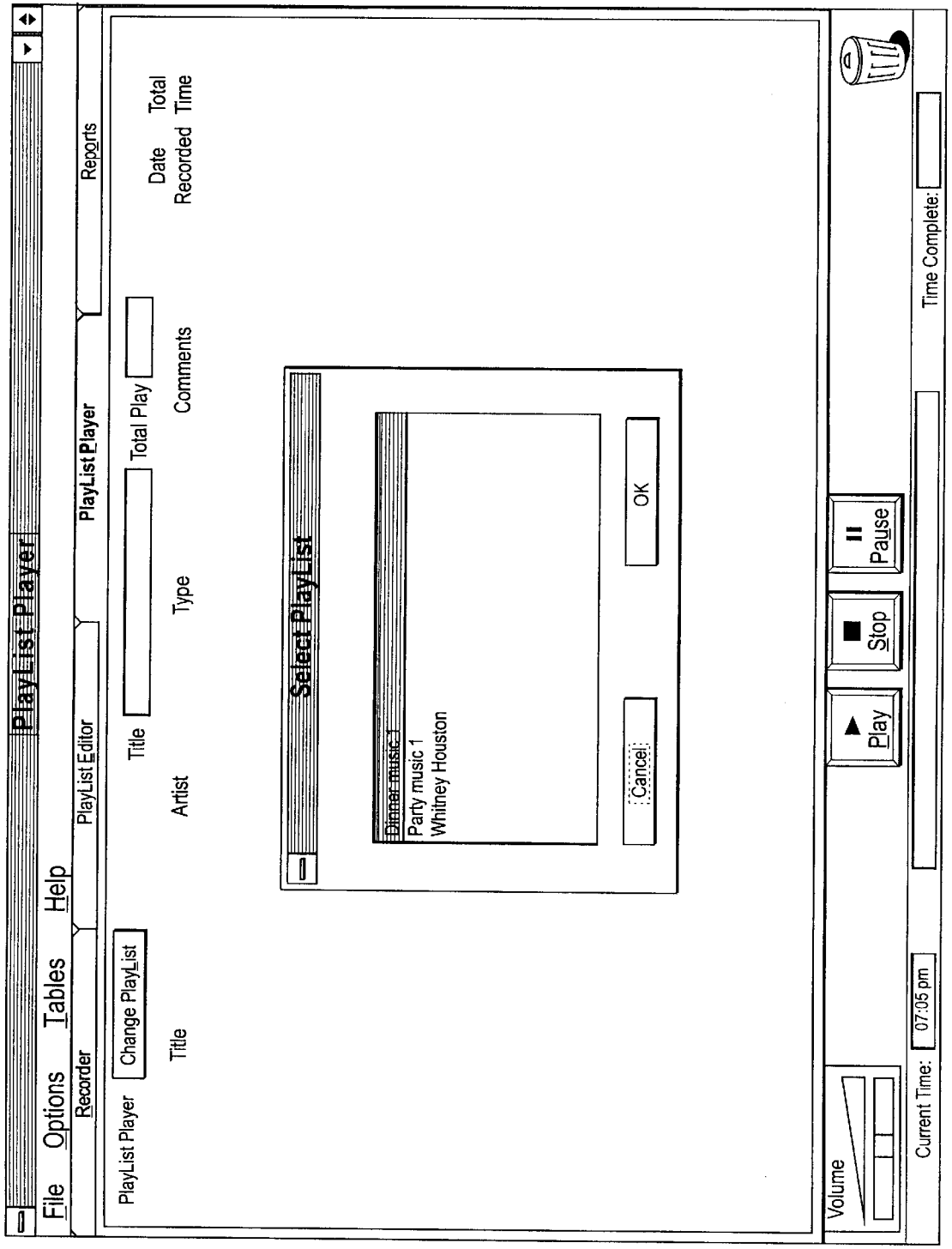

In the event that the user desires to select a particular playlist for execution, in a step 102, FIG. 3A, the playlist master database is read in a step 200, FIG. 3H. The playlist player selection menu FIG. 4J is displayed in a step 202. If the user selects a playlist in a step 204, the playlist detail is read from the appropriate database in a step 206. The selected playlist is then displayed, FIG. 4K, in a step 208.

With respect to FIG. 3I, the user can exit the player screen sequence or can request execution of the playlist in a step 210 at the beginning of the list or at a specified work or song. The list is then executed in a step 212.

Figure 3J:
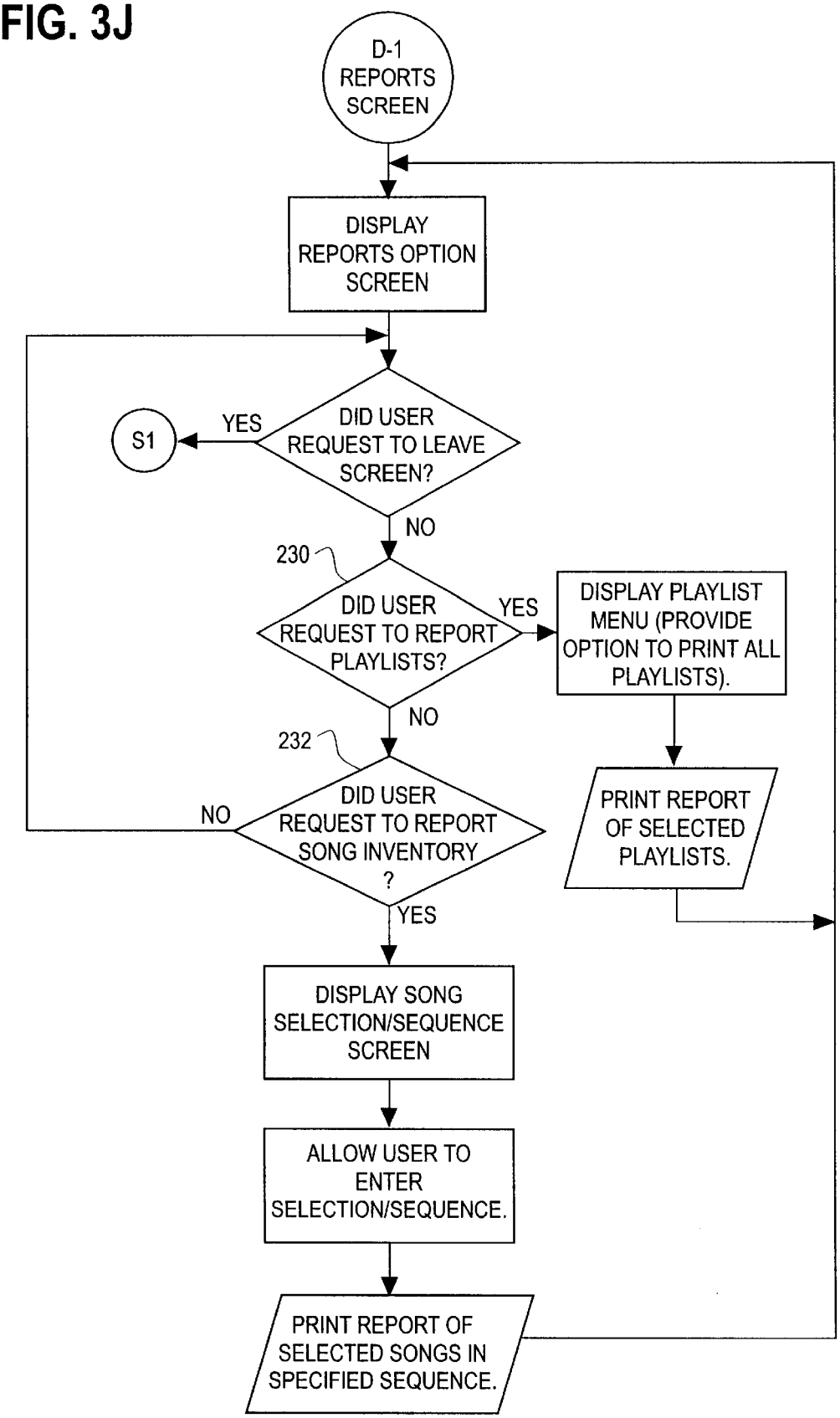

In the event that one or more reports are to be created using the printer 12g, the process of FIG. 3J can be used to request reports as to existing playlists in a step 230. Alternately, the user can request a report of the existing inventory of media elements in a step 232.

Figure 3K:
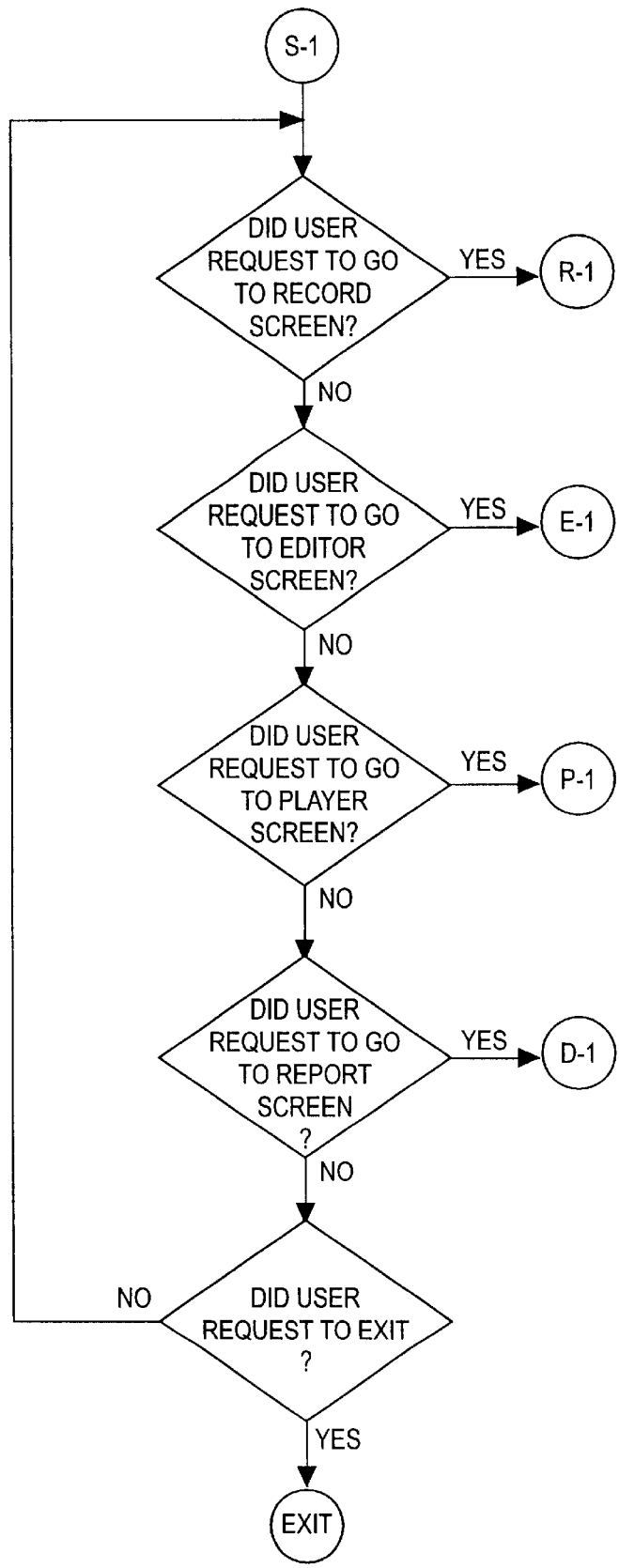
Figure 3L:
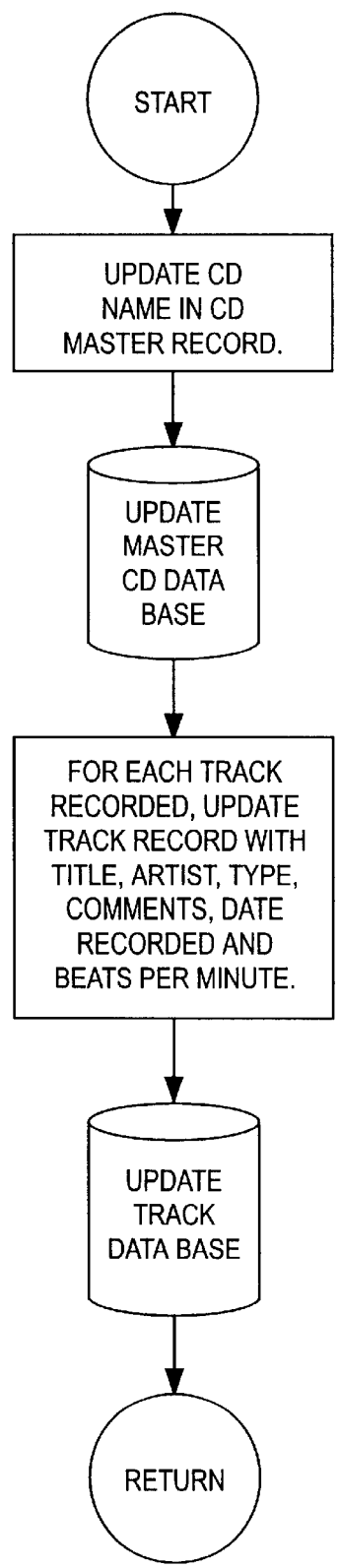

Screen selection is carried out in accordance with the process illustrated in FIG. 3K. Updating of data from the record screen is carried out in a process illustrated in FIG. 3L.

Figure 3M:
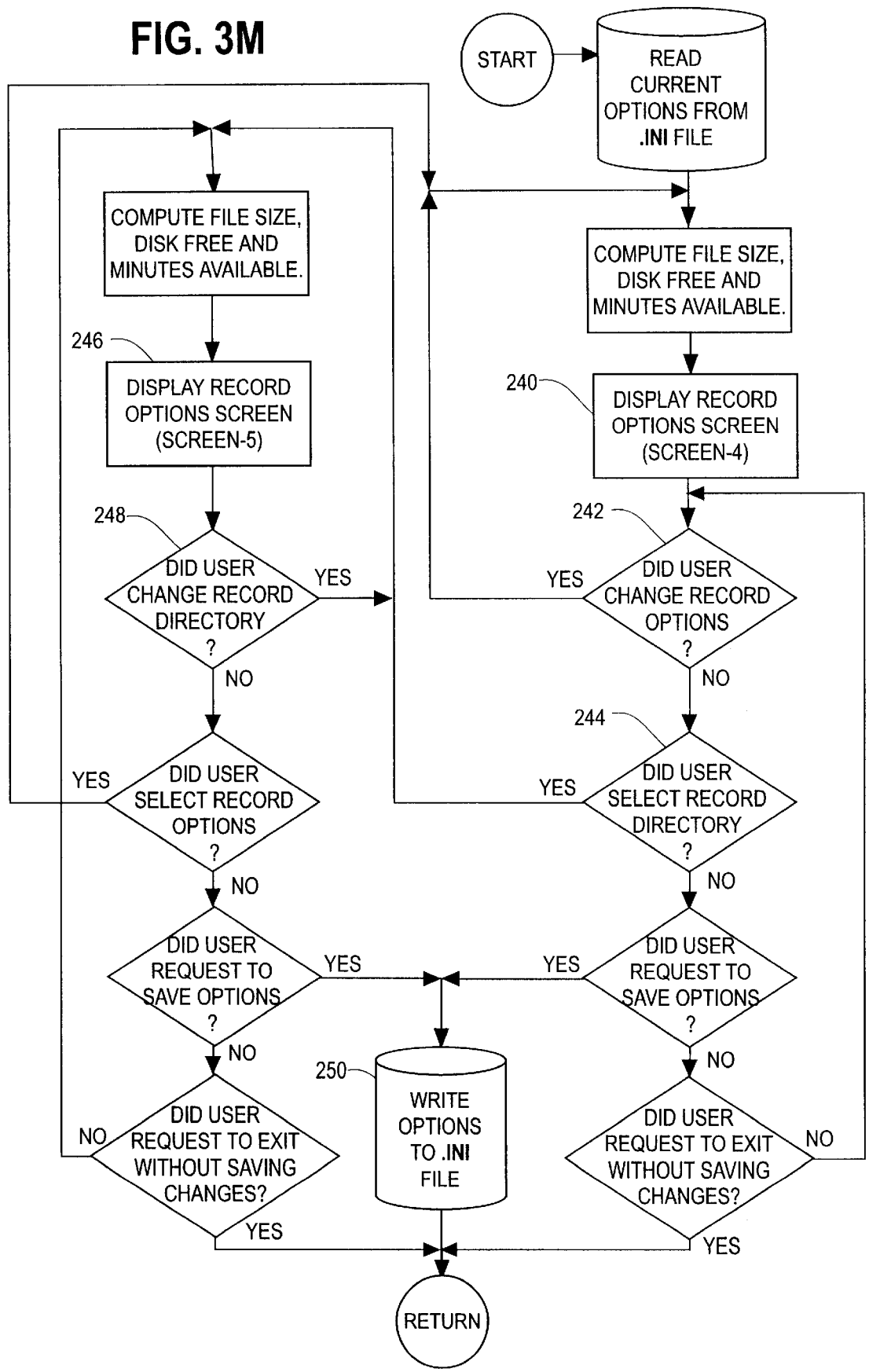

FIG. 3M illustrates steps associated with carrying out requests for various optional functions. For example, in a step 240 an option screen, FIG. 4D, can be displayed for a user.

The user can subsequently in a step 242 change the record options. In the event that the user in a step 244 selects a record directory, the record directory screen FIG. 4E can be displayed in a step 246. The displayed screen can be altered by the user in a step 248. The revised record options can be stored in a step 250 for subsequent use.

Figure 3N:
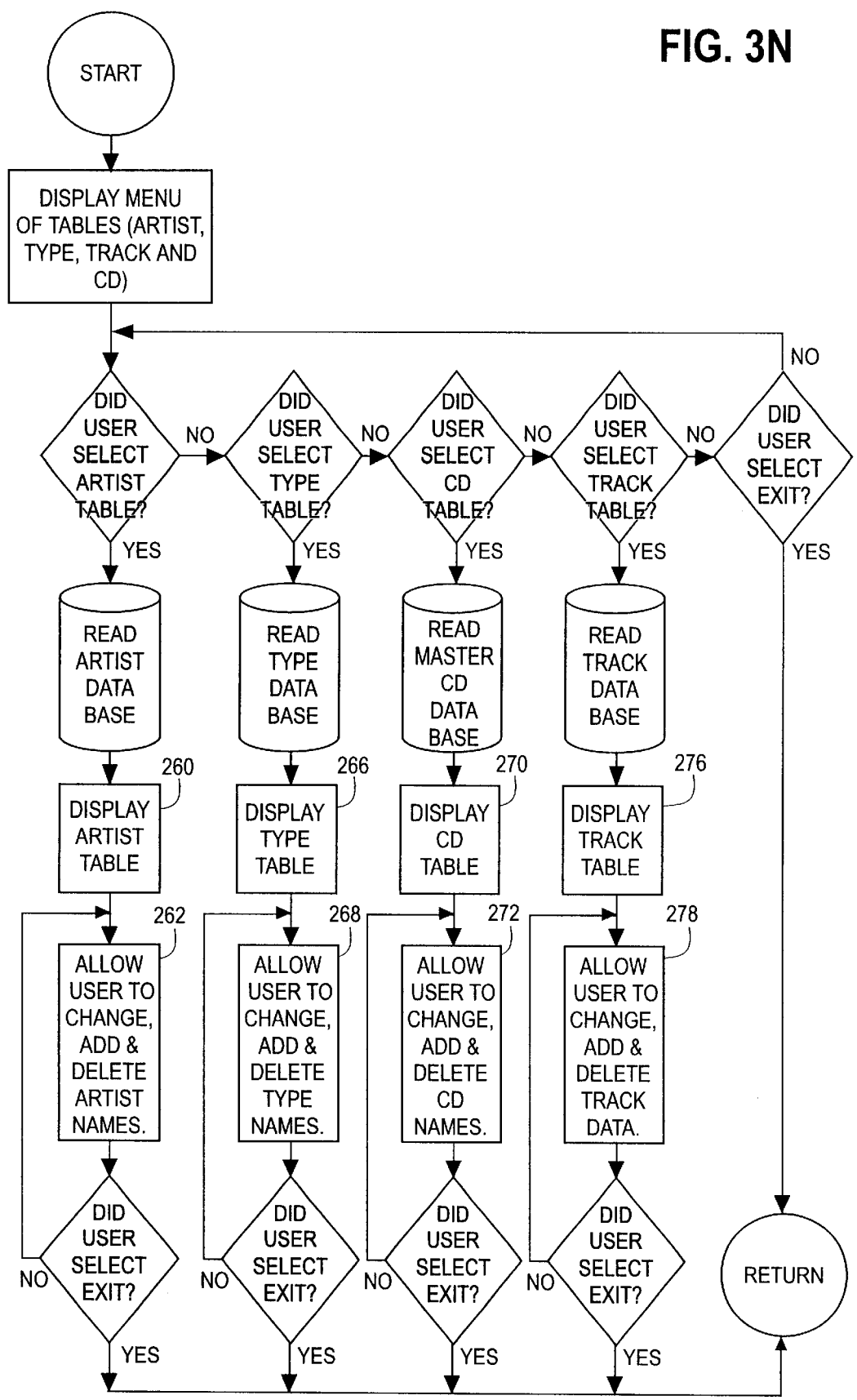

FIG. 3N illustrates steps of a process wherein the user is able to select and display various tables. In a step 260 an artist table can be displayed and edited in a step 262. In a step 266 the type table can be displayed and edited in a step 268. In a step 270, the CD table can be displayed and edited in a step 272. The track table can be displayed in a step 276 and edited in a step 278.

FIG. 3O illustrates the steps in a process of saving the playlist screen, FIG. 4I. In a step 290 the playlist save screen is displayed. In a step 292, if the user has selected to save the existing playlist, the changes are written to the respective database in a step 294. If the user elected to save the new playlist in a step 296, the changes are written to the new playlist database in a step 298. Finally, the user can discard the changes and exit in a step 300.

Figure 3P:

FIG. 3P illustrates the steps of a procedure for deleting a selected work or track.

Hence, as described above, the system 10' can be used to create new or modified playlists, and execute same thereby presenting the sequence of works to a user. Alternately, pre-existing playlists can be edited and additional new playlists created which then subsequently be executed.

Those of skill in the art will understand that other functions as illustrated in FIGS. 3A–3P will also be provided by the control program 16. Attached hereto is a preferred data structure for use with the flow diagrams of FIGS. 3A–3P.

Figure 6:
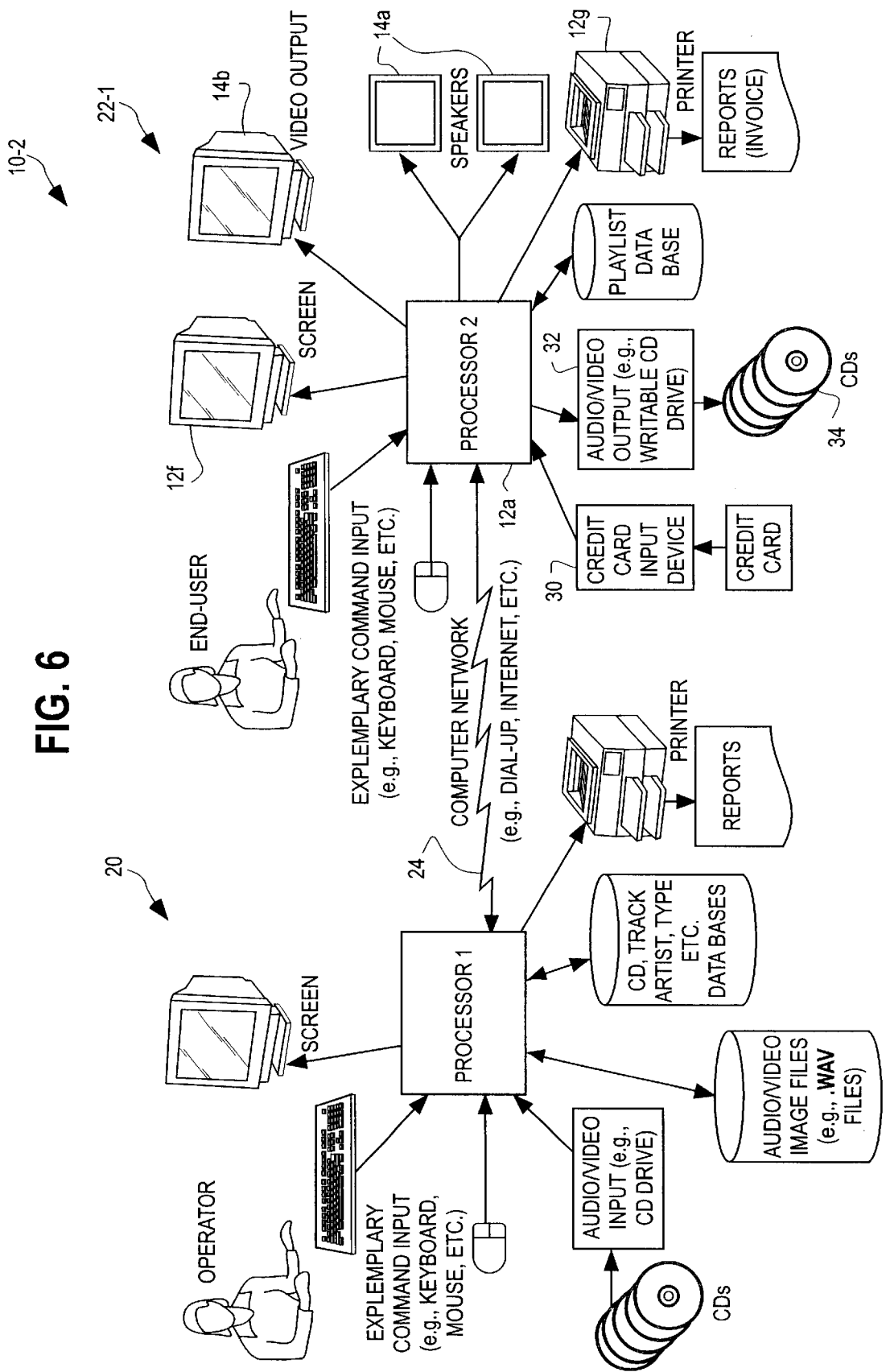
FIG. 6 is a diagram of a system intended to provide a custom written medium of works obtained from a remote source and in response to establishing a predetermined credit.
Figure 7:
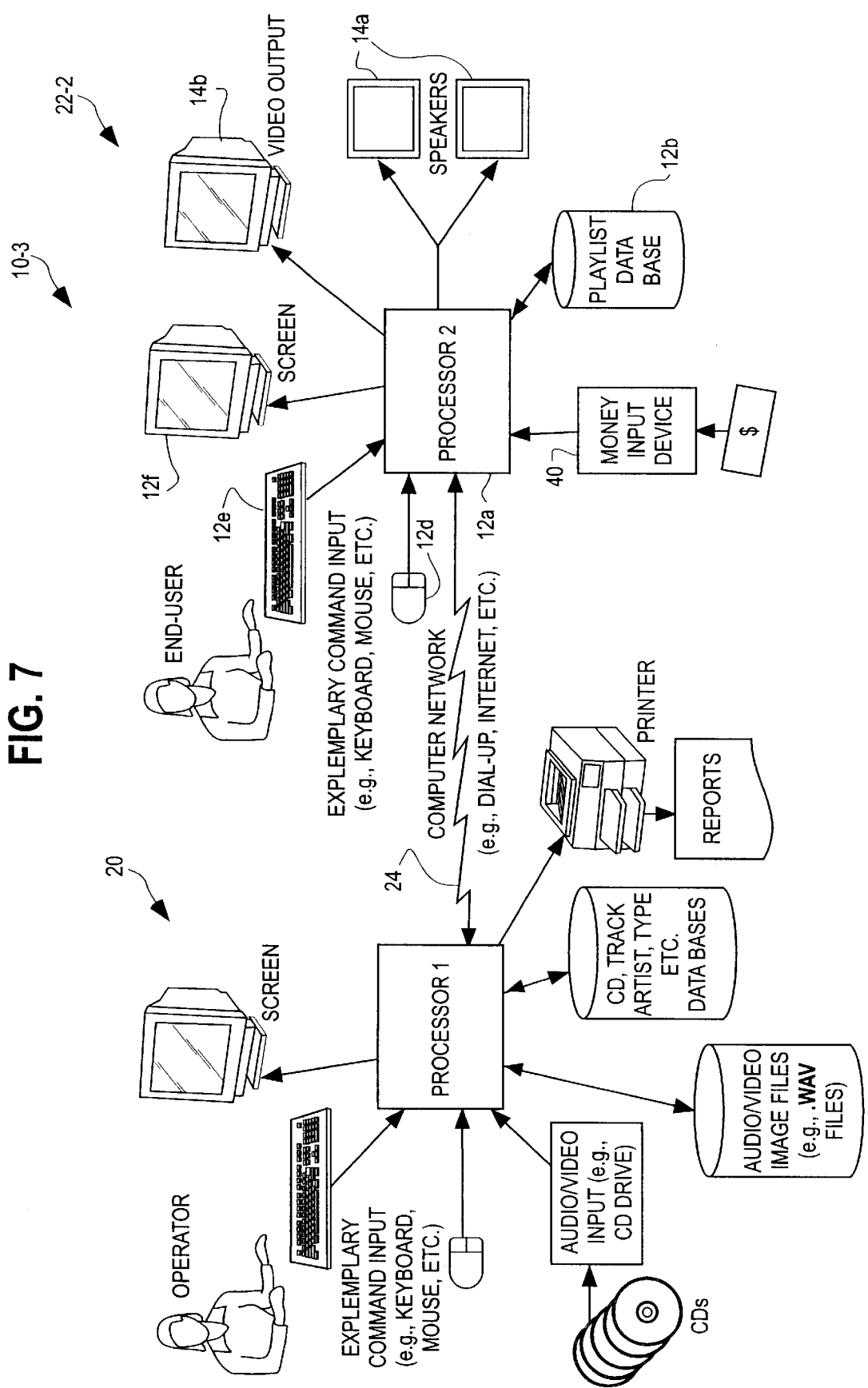
FIG. 7 is a diagram illustrating a system for presenting works on demand from either a local or a remote source.

FIGS. 5 through 7 illustrate alternate types of list building systems. FIG. 5 illustrates a system 10-1 which is a network based playlist creating and executing system. The system 10-1 incorporates a remote source 20 of works which are to be assembled and played or presented at a user's unit or terminal 22. The unit 20 is intended to be an element or a location accessible via a network. For example, the unit 20 can be a location on an internet or the internet or any other network. It can be accessed via a land line or wireless communication link 24 without limitation.

The system 20 incorporates a processor 20a, and databases 20b. The databases 20b include stored digital representations of a variety of works which can be obtained off of local drives, such as the drive 20c without limitation. The remote system operator has available standard input control devices such as mouse 20d, keyboard 20e or other desired input devices. A display screen 20f of the conventional variety is also provided. The remote system 20 also includes an optional printer 20g for purposes of creating hard copy reports for invoicing, billing or royalty payment purposes without limitation.

The system 20 provides a remote pre-stored inventory which the unit 22 can access via communication link 24. The unit 20 provides supervisory and billing services in response to requests by the end user's unit 22 for access to one or more of the works stored in the inventory in the databases 20b.

Subsequent to the request being authorized, the selected works can be made available to the terminal 22 via the communication link 24. The unit 22 can in turn be used as described previously to create new playlists, edit existing lists and then execute the lists under the control of the local end user. The terminal 22 is especially convenient for the end user in that the works can all be acquired electronically and there is absolutely no need for acquiring and keeping a plurality of CDs.

If desired, processor 12a in system 10-1 can keep track of the number of plays and total play time and transmit that information to processor 20a, for billing purposes. Reports producible by the processor 20a include total plays and play time along with invoices for end users. Documentation for royalty payments to the appropriate recipients can also be created. Finally, the reports can list those works by demand or popularity by day, week or month.

FIG. 6 illustrates a system 10-2 which includes a remote source, such as the remote source 20 and a local terminal 22-1. Terminal 22-1 includes elements similar to the terminal 22 previously discussed. Corresponding elements are identified with the same identification numeral.

The terminal 22-1 additionally includes a credit establishing input such as a credit card reader 30. The reader 30 can be used by a user to make a credit card account number available to the terminal 22-1 for billing purposes.

Once a credit line has been established, the user will be able to use the terminal 22-1 to create and/or modify one or more playlists into write the selected media elements via an output drive 32 to a removable medium 34 which could be a CD or a DVD.

The terminal 10-2 could be located in a business establishment and users interested in obtaining a custom combination of works can access the services of the terminal 22-1 via the reader 30 for purposes of creating and writing the desired sequence of works on the medium 34. Other services made available by the terminal 22 can also be made available by the terminal 22-1 in response to the established credit line.

Additional services that can be made available by the terminal 22-1 include printing invoices via the printer 12g. Report information can be transmitted to the system 20 for billing purposes with respect to the commercial establishment where the terminal 22-1 is located as well as making royalty payments to appropriate recipients.

FIG. 7 illustrates an alternate system 10-3 which can be used for entertainment purposes in public establishments. The system 10-3 provides jukebox-like services at the terminal 22-2. These are under the supervision and control of remote system 20.

The terminal 22-2 includes a credit establishing device which could be a coin or a bill receiving unit 40 of a type used with vending machines. Alternately, the unit 40 could also accept credit cards if desired.

Upon establishing an appropriate credit via the unit 40, the terminal 22-2 enables a user to select one or more works whose titles might be displayed on the control screen 12f via the input devices 12d, 12e.

The selected works could be resident at the local database 12b or could be acquired from the remote unit 20 via the communication link as discussed previously. The system 22-2, unlike conventional jukeboxes, has an unlimited selection of audio or audio/video works available to it via communication link 24. In addition, for security purposes, the terminal 22-2 does not include an inventory of valuable CD or DVD media. The works could include audio works, such as music, audio/visual works such as advertisements, music videos or others.

The terminal 22-2 presents a rolling playlist on the screen 12f which can be reviewed by the end user or individual selecting the works to be presented. Newly selected or identified works are added at the end of the playlist and are presented via speakers 12a and video output 12b in sequence depending on the nature of the work. Hence, the terminal 22-2 makes possible the presentation of arbitrarily selected works, in an arbitrary order in response to the credit established by the unit 40.

The remote system 20 via the link 24 monitors the works being presented and the frequency thereof. Billing information can be generated for purposes of charging the entity where the terminal 22-2 is located for each work which is presented. Reports can be produced at the system 20 identifying royalties to be paid to the appropriate recipients based on the works selected for presentation at the terminal 22-2 or for any other desired purpose. It will be understood that the appropriate file type would be used with the appropriate type of work.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

DATA STRUCTURE

| Table | Field Name | Data Type | |
|---|---|---|---|
| Master CD | CD Number | Long Integer | Created by the track times |
|  | CD Title | Text 50 | |
| Track | CD Number | Long Integer | Link to Master CD table |
|  | Track | Byte | Track number found on the CD |
|  | Artist Code | Integer | Link to the Artist table |
|  | Type Code | Long Integer | Link to the Type table |
|  | Track Title | Text 50 | |
|  | Track Time | Long Integer | Actual time recorded in seconds |
|  | File Name | Text 255 | Path/File Name of stored WAV file |
|  | Beats | Integer | Beats per minute |
| Playlist Master | Number | Counter | Database assigned key |
|  | Title | Text 50 | |
| Playlist Detail | Number | Integer | Link to Playlist table |
|  | Play Order | Integer | Order the track was placed within the playbook |
|  | CD Number | Long Integer | Link to Track table |
|  | Track | Byte | Link to Track table |
| Artist | Artist Code | Counter | Database assigned Artist index |
|  | Artist Name | Text 255 | |
| Type | Type Code | Counter | Program assigned index to Music Type |
|  | Music Type | Text 50 | |

What is claimed:

1. A system for creating a list of selected works comprising:

a source of works which may include at least in part, an audio component;

a visual output device;

circuitry, coupled to the source and the output device, including executable instructions for building a displayable inventory of works and for creating and displaying an executable play list of works on the output device, including at least some of the works in the inventory, at the same time that a portion of the inventory is being displayed; and additional instructions for creating an editing command overlay for editing the displayed list of works.

2. A system as in claim 1 which includes an output device coupled to the building circuitry for presenting the works on the play list to the output device.

3. A system as in claim 2 which includes a device for storage of digital representations of a plurality of works.

4. A system as in claim 3 which includes circuitry for presenting the works on a selected, edited list to one of an audio output device or a video output device.

5. A system as in claim 4 wherein the circuitry includes a programmable processor.

6. A system as in claim 3 which includes instructions for conducting analysis of the characteristics of works on a selected list.

7. A system as in claim 6 which includes executable instructions for sorting works in accordance with a pre-selected parameter.

8. A system as in claim 7 which includes instructions to present works, sorted in accordance with the pre-selected parameter, to the output device.

9. A system as in claim 3 which includes instructions establishing information pertaining to at least one of invoicing, royalty paying, demand analysis, or, popularity of selected works.

10. A system as in claim 3 which includes instructions to download a work on a selected play list wherein the work is not available locally.

11. A system for creating a list of selected titles comprising:

a source of works which may include, at least in part, an audio component;

a visual output device;

circuitry, coupled to the source and the output device, for building an inventory list of works and for creating a displayable list of works of at least some of the inventory on the output device wherein the circuitry includes instructions for selecting works to be included in the displayable list in accordance with a selected characteristic, and, for executing a plurality of such selected works.

12. A system as in claim 11 which includes executable instructions for selecting works to be included in the displayable list in accordance with one of a selected audio characteristic, a selected video characteristic, or a selected popularity indicium.

13. A system as in claim 12 which includes circuitry for editing a selected list.

14. A system as in claim 13 which includes instructions for displaying at least part of the inventory list simultaneously with displaying at least part of the edited list.

15. A system as in claim 14 which includes instructions for downloading a work not locally available.

16. A system as in claim 14 which includes instructions for presenting downloaded advertisements.

17. A system as in claim 14 which includes instructions for establishing at least one of royalty payments, or, billing information.

18. A system as in clam 17 which includes instructions for downloading a work not locally available.

19. A system comprising:

executable instructions for accessing at least one source of works;

executable instructions for creating at least one play list; and executable instructions for presenting works on the at least one play list and for maintaining information pertaining to royalty payments for at least some of the presented works.

20. A system as in claim 19 which includes additional instructions for maintaining information as to popularity of various presented works.

21. A system as in claim 19 which includes instructions for presenting advertisements.

22. A system as in claim 19 which includes executable instructions for maintaining the source, at least in part, locally.

23. A system as in claim 19 which includes executable instructions for obtaining, from a remote source, selected works not locally available.

24. A system as in claim 23 which includes executable instructions for visually presenting at least one play list.

25. A system as in claim 24 which includes executable instructions for simultaneously displaying at least part of an inventory of works and at least part of a selected play list.

26. A system as in claim 24 which includes instructions for creating and storing a plurality of different play lists.

27. A system as in claim 19 which includes executable instructions for selecting a plurality of works in accordance with a predetermined performance parameter.

28. A system as in claim 27 wherein the executable instructions select works in accordance with pre-specified beats per time interval.

29. A system comprising:

executable instructions for accessing at least one source of works;

executable instructions for creating and storing multiple play lists;

executable instructions for executing a selected play list and for maintaining popularity information pertaining to works from at least one executed play list, which includes executable instruction whereby works are selected in accordance with pre-established criterion; and wherein the criterion corresponds to beats per unit time and the executable instructions select works in accordance therewith.

30. A system comprising:

executable instructions for accessing at least one source of works;

executable instructions for creating and storing multiple play lists;

executable instructions for executing a selected play list and for displaying advertisements, which includes instructions for selecting works in accordance with a predetermined criterion; and wherein the criterion corresponds to beats per unit time and the executable instructions select works in accordance therewith.

31. A system comprising:

executable instructions for accessing at least one source of works;

executable instructions for creating at least one play list by selecting works in accordance with a predetermined criterion; and executable instructions for executing the play list and for maintaining information pertaining to at least one of billing information; royalty payments and popularity of works.

32. A system comprising:

first software executable at least in part at a user station enabling a user to create a plurality of play lists of multiple works; and second software executable at least in part at the user station for downloading at least some of the works on a selected play list, via a communications network available at least intermittently, from a remote source, to the user station.

33. A system as in claim 32 wherein at least some of the works on the list are presented at the user station at substantially the same time they are downloaded.

34. A system as in claim 32 wherein at least some of the works on the list are downloaded each time they are presented on the user station.

35. A system as in claim 32 wherein at least one work on the list is downloaded after determining that the work is not available at the user station.

36. A system as in claim 32 wherein works available at the user station may be included on the list.

37. A system as in claim 32 which includes collection software to collect information used for royalty-related payments that result from presenting works on the list, wherein the software is located, at least in part, at one of the user station or the remote source.

38. A system as in claim 32 which includes collection software to collect information used to keep track of the popularity of at least some of the presented works, wherein the software is located, at least in part, at one of the user station or the remote source.

39. A system as in claim 32 wherein the user station graphically displays simultaneously at least some of an inventory of available works at the remote source and at least a part of the list.

40. A system as in claim 39 which includes control software enabling a local user to select works from the remote inventory for insertion in the list, wherein the software is located, at least in part, at one of the user station or the remote source.

41. A system as in claim 32 which includes control software enabling a local user to sort at least some works in a remote inventory based on user specified selected characteristics of the works and view a screen containing at least some of the sorted works, wherein the control software is located, at least in part, at one of the user station or the remote source.

42. A system as in claim 32 which includes control software enabling a local user to restrict the works displayed from a remote inventory based on user specified selected characteristics of the works and view a screen containing at least some of the selected works, wherein the control software is located, at least in part, at one of the user station or the remote source.

43. A system as in claim 32 which includes software for controlling a media writing device, coupled to the user station, whereby selected works on the list can be written to a removable medium after the works are downloaded.

44. A system as in claim 32 which includes software for controlling a media writing device, coupled to the user station, whereby selected works on the list can be written to a removable medium at substantially the same time the works are downloaded.

45. A system as in claim 32 which includes software enabling a user to preview at least a part of a work, wherein the software is located, at least in part, at one of the user station or the remote source and, wherein the work to be previewed is one of, on the list, or, in an inventory of works at the remote source.

46. A system as in claim 32 wherein at least some of the works on the list include advertisements.

47. A system as in claim 32 wherein additional works comprising advertisements are presented at the user station at substantially the same time that works on the list are downloaded to the user station.

48. A system as in claim 33 wherein additional works comprising advertisements are presented at the user station at substantially the same time that works on the list are presented at the user station.

49. A system as in claim 32 which includes software to collect information used for billing-related purposes based on works on the list that have been presented wherein the software is located, at least in part, at one of the user station or the remote source.

50. A system as in claim 32 which includes software to collect information used for billing-related purposes based on presented advertisements, wherein the software is located, at least in part, at one of the user station or the remote source.

51. A system as in claim 32 which includes software to calculate beats per minute for at least some works on the list, wherein the software is located, at least in part, at one of the user station or the remote source.

52. A system as in claim 32 which includes software to monitor one of billing or credit.

53. A system as in claim 32 which includes software for controlling a credit establishing unit comprising at least one of a card reader or a vending unit.

54. A system as in claim 32 which includes software enabling a local user to produce a report at least in part, of the works on the list.

55. A system as in claim 32 wherein at least some of the downloaded works on the list comprise video.

56. A system as in claim 32 wherein at least some or the downloaded works on the list are selected from a class which includes at least one of audio works, moving video works, still video works, and other predetermined sensory works.

57. A method comprising:
creating a plurality of play lists with each list including multiple works;
presenting the works on a selected play list to a user, including downloading at least some of the works on the list from a remote source, via a communications network that is available at least intermittently, at a user station.

58. A method as in claim 57 wherein at least some of the works are presented at the user station at substantially the same time they are downloaded.

59. A method as in claim 57 wherein at least some of the works are downloaded each time they are presented on the user station.

60. A method as in claim 57 wherein at least one work is downloaded after determining that the work is not available at the user station.

61. A method as in claim 57 wherein works available at the user station may be included on the list.

62. A method as in claim 57 which includes collecting information pertaining to presented works to be used for royalty-related payments.

63. A method as in claim 57 which includes collecting information used to keep track of the popularity of at least some of the works presented to the user.

64. A method as in claim 57 including graphically displaying simultaneously at least some of the inventory of available works at the remote source and at least a part of the list.

65. A method as in claim 64 which includes enabling a local user to select works from the remote inventory for insertion in the list.

66. A method as in claim 57 which includes enabling a local user to sort at least some works in a remote inventory based on user specified characteristics of the works and to view a screen containing at least some of the sorted works.

67. A method as in claim 57 which includes enabling a local user to select at least some works in a remote inventory based on user specified characteristics of the works and to view a screen containing at least some of the selected works.

68. A method as in claim 57 which includes controlling a media writing device, coupled to the user station, whereby selected works can be written to a removable medium after the works are downloaded.

69. A method as in claim 57 which includes controlling a media writing device, coupled to the user station, whereby selected works on the list can be written to a removable medium at substantially the same time the works are downloaded.

70. A method as in claim 57 which includes enabling a user to preview at least a part of a work, and, wherein the work to be previewed is one of, on the list, or, in an inventory of works at the remote source.

71. A method as in claim 57 wherein at least some of the works on the list include advertisements.

72. A method as in claim 57 including presenting at the user station additional works comprising advertisements at substantially the same time that works on the list are downloaded to the user station.

73. A method as in claim 58 including presenting at the user station additional works comprising advertisements at substantially the same time that works on the list are presented at the user station.

74. A method as in claim 57 including collecting information used for billing-related purposes based on the presented works.

75. A method as in claim 57 which includes collecting information used for billing-related purposes based on presented advertisements.

76. A method as in claim 57 which includes calculating beats per minute for at least some works on the list.

77. A method as in claim 57 including monitoring one of billing or credit based on presented works.

78. A method as in claim 57 including controlling a credit establishing unit comprising at least one of a card reader or a vending unit.

79. A method as in claim 57 which includes enabling a local user to produce a report of at lest some of the works on the list.

80. A method as in claim 57 wherein at least some of the downloaded works comprise video.

81. A method as in claim 57 wherein at least some of the downloaded works are selected from a class which includes at least one of audio works, moving video works, still video works, and other predetermined sensory works.

82. A system comprising;
a first plurality of pre-stored instructions enabling a user to identify a selected plurality of works;
a second plurality of pre-stored instructions for presenting members of the plurality of works at a presenting station;
a third plurality of pre-stored instructions for establishing at least intermittently, a communications link between a source of works and the presenting station with at least some of the works provided at the presenting station, via the link, each time they are presented; and
a fourth plurality of pre-stored instructions responsive to the presented works for at least one of collecting royalty payment information, establishing a credit, collecting information for billing, accumulating popularity information or generating selected reports with at least a portion of the first plurality of instructions located at one of the presenting station or the source.

83. A method comprising:
creating at least one list of multiple works;
presenting the works on the list to a user, including downloading at least some of the works on the list, via a communications network, that is available at least intermittently, from a remote source, to a user station; and
including controlling a credit establishing unit comprising at least one of a card reader or a vending unit.

84. A system comprising:
executable instructions for accessing at least one source of works;
executable instructions for creating at least one play list;
executable instructions for executing the at least one play list and for maintaining popularity information pertaining to works from the at least one executed play list;
which includes executable instructions whereby works are selected in accordance with a pre-established criterion; and
wherein the criterion corresponds to beats per unit time and the executable instructions select works in accordance therewith.

85. A system comprising:
executable instructions for accessing at least one source of works;
executable instructions for creating at least one play list;
executable instructions for executing the play list and for displaying advertisements, which includes instructions for selecting works in accordance with predetermined criterion, and
wherein the criterion corresponds to beats per unit time and the executable instructions select works in accordance therewith.

86. A system comprising:
first software executable at least in part at a user station for creating at least one list of multiple works;
second software executable at least in part at the user station for downloading at least some of the works on the list, available at least intermittently via a communications network, from a remote source, to the user station; and
which includes collection software to collect information used for royalty-related payments that result from presenting works on the list, and wherein the software is located, at least in part, at one of the user station or the remote source.

87. A system comprising:
first software executable at least in part at a user station for creating at least one list of multiple works;
second software executable at least in part at the user station for downloading at least some of the works on the list, via a communications network, available at least intermittently from a remote source, to the user station; and
which includes collection software to collect information used to keep track of the popularity of at least some of the presented works, wherein the software is located, at least in part, at one of the user station or the remote source.

88. A system comprising:

first software executable at least in part at a user station for creating at least one list of multiple works;

second software executable at least in part at the user station for downloading at least some of the works on the list, via a communications network, available at least intermittently, from a remote source, to the user station; and which includes software to collect information used for billing-related purposes based on presented advertisements, wherein the software is located, at least in part, at one of the user station or the remote source.

89. A system comprising:

first software executable at least in part at a user station for creating at least one list of multiple works;

second software executable at least in part at the user station for downloading at least some of the works on the list; via a communications network, available at least intermittently, from a remote source, to the user station; and which includes software to calculate beats per minute for at least some works on the list, wherein the software is located, at least in part, at one of the user station or the remote source.

90. A system comprising:

first software executable at least in part at a user station for creating at least one list of multiple works;

second software executable at least in part at the user station for downloading at least some of the works on the list, via a communications network, available at least intermittently, from a remote source, to the user station; and which includes software to monitor one of billing or credit.

91. A system comprising:

first software executable at least in part at a user station for creating at least one list of multiple works;

second software executable at least in part at the user station for downloading at least some of the works on the list, via a communications network, available at least intermittently from a remote source, to the user station; and which includes software for controlling a credit establishing unit comprising at least one of a card reader or a vending unit.

92. A method comprising:

creating at least one list of multiple works;

presenting the works on the list to a user, including downloading at least some of the works on the list, via a communications network, available at least intermittently from a remote source, to a user station; and which includes collecting information pertaining to presented works to be used for royalty-related payments.

93. A method comprising:

creating at least one list of multiple works;

presenting the works on the list including downloading at least some of the works on the list, via a communications network, available at least intermittently, from a remote source, to a user station; and which includes collecting information used to keep track of the popularity of at least some of the works presented to the user.

94. A method comprising:

creating at least one list of multiple works;

presenting the works on the list including downloading at least some of the works on the list, via a communications network, available at least intermittently, from a remote source, to a user station; and which includes calculating beats per minute for at least some works on the list.

95. A method comprising:

creating at least one list of multiple works;

presenting the works on the list including downloading at least some of the works on the list, via a communications network, available at least intermittently, from a remote source, to a user station; and including monitoring one of billing or credit based on presented works.

96. A system comprising:

first software executable at least in part at a user station for creating at least one list of multiple works; and second software executable at least in part at the user station for downloading at least some of the works on the list, via a communications network available at least intermittently, from a remote source, to the user station which includes software to collect information used for billing-related purposes based on works on the list that have been presented wherein the software is located, at least in part, at one of the user station or the remote source.

* * * * *

INTER PARTES REEXAMINATION CERTIFICATE (0101st)
United States Patent
Hempleman et al.

(10) Number: US 6,763,345 C1
(45) Certificate Issued: *Sep. 8, 2009

(54) LIST BUILDING SYSTEM

(75) Inventors: James D. Hempleman, Chicago, IL (US); Sandra M. Hempleman, Chicago, IL (US); Neil A. Schneider, Lake Zurich, IL (US)

(73) Assignee: Premier International Associates, LLC, Chicago, IL (US)

Reexamination Request:
No. 95/000,201, Dec. 8, 2006
No. 95/000,354, Mar. 7, 2008

Reexamination Certificate for:
Patent No.: 6,763,345
Issued: Jul. 13, 2004
Appl. No.: 09/770,882
Filed: Jan. 26, 2001

(*) Notice: This patent is subject to a terminal disclaimer.

Related U.S. Application Data

(63) Continuation of application No. 08/859,995, filed on May 21, 1997, now Pat. No. 6,243,725.

(51) Int. Cl.
| | |
|---|---|
| G11B 27/11 | (2006.01) |
| G11B 27/36 | (2006.01) |
| G11B 27/034 | (2006.01) |
| G11B 27/031 | (2006.01) |
| G11B 27/34 | (2006.01) |
| G10H 1/00 | (2006.01) |
| G06F 17/30 | (2006.01) |

(52) U.S. Cl. .................. 707/1; 707/E17.009; 715/210; 84/601; 84/645

(58) Field of Classification Search .............. 707/1
See application file for complete search history.

(56) References Cited

U.S. PATENT DOCUMENTS

| | | |
|---|---|---|
| 3,291,919 A | 12/1966 | Robitaille |
| 3,990,710 A | 11/1976 | Hughes |
| 4,186,725 A | 2/1980 | Schwartz |
| 4,472,747 A | 9/1984 | Schwartz |
| 4,528,643 A | 7/1985 | Freeny, Jr. |
| 4,559,570 A | 12/1985 | Schwartz |
| 4,636,876 A | 1/1987 | Schwartz |
| 4,647,989 A | 3/1987 | Geddes |
| 4,675,755 A | 6/1987 | Baumeister et al. |
| 4,682,248 A | 7/1987 | Schwartz |
| 4,703,465 A | 10/1987 | Parker |
| 4,725,977 A | 2/1988 | Izumi et al. |
| 4,744,281 A | 5/1988 | Isozaki |
| 4,755,889 A | 7/1988 | Schwartz |
| 4,766,581 A | 8/1988 | Korn et al. |

(Continued)

OTHER PUBLICATIONS

"Towards the Digital Music Library: Tune Retrieval from Acoustic Input", McNab et al, DL '96, ACM 0-89791-830-4/96, ACM 1996.*

"Content-Based Classification, Search, and Retrieval of Audio", Wold et al, IEEE 1070-986X/96, IEEE 1996.*

"Automatic Audio Content Analysis", Pfeiffer et al, ACM Multimedia 96, pp. 21-30, ACM 1996.*

(Continued)

*Primary Examiner*—Fred Ferris

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

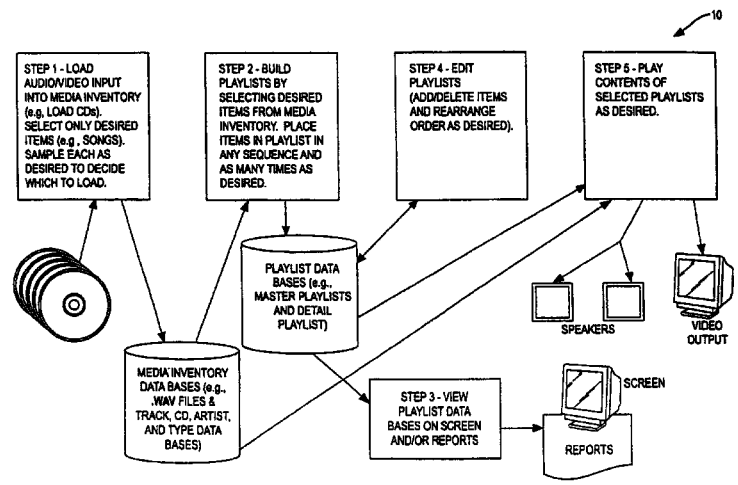

U.S. PATENT DOCUMENTS

| | | | |
|---|---|---|---|
| 4,779,252 A | | 10/1988 | Custers et al. |
| 5,046,004 A | | 9/1991 | Tsumura et al. |
| 5,113,383 A | | 5/1992 | Amemiya et al. |
| 5,132,992 A | | 7/1992 | Yurt et al. |
| 5,157,643 A | | 10/1992 | Suzuki |
| 5,168,481 A | | 12/1992 | Culbertson et al. |
| 5,173,888 A | | 12/1992 | An |
| 5,173,900 A | | 12/1992 | Miller et al. |
| 5,181,107 A | | 1/1993 | Rhoades |
| 5,191,573 A | | 3/1993 | Hair |
| 5,197,047 A | | 3/1993 | Witheridge et al. |
| 5,262,940 A | | 11/1993 | Sussman |
| 5,288,982 A | | 2/1994 | Hosoya |
| 5,317,732 A | | 5/1994 | Gerlach, Jr. et al. |
| 5,331,614 A | | 7/1994 | Ogawa et al. |
| 5,341,350 A | | 8/1994 | Frank et al. |
| 5,355,302 A | | 10/1994 | Martin et al. |
| 5,418,713 A | | 5/1995 | Allen |
| 5,428,732 A | | 6/1995 | Hancock et al. |
| 5,475,835 A | | 12/1995 | Hickey |
| 5,481,509 A | * | 1/1996 | Knowles .................... 386/117 |
| 5,515,347 A | | 5/1996 | Mulder et al. |
| 5,541,638 A | | 7/1996 | Story |
| 5,550,575 A | | 8/1996 | West et al. |
| 5,557,541 A | | 9/1996 | Schulhof et al. |
| 5,561,604 A | | 10/1996 | Buckley et al. |
| 5,566,353 A | | 10/1996 | Cho et al. |
| 5,583,922 A | | 12/1996 | Davis et al. |
| 5,586,235 A | | 12/1996 | Kauffman |
| 5,594,601 A | | 1/1997 | Mimick et al. |
| 5,616,876 A | * | 4/1997 | Cluts .......................... 84/609 |
| 5,629,867 A | | 5/1997 | Goldman |
| 5,633,839 A | | 5/1997 | Alexander et al. |
| 5,633,842 A | | 5/1997 | Nishida et al. |
| 5,654,944 A | | 8/1997 | Lee et al. |
| 5,668,788 A | | 9/1997 | Allison |
| 5,670,730 A | | 9/1997 | Grewe et al. |
| 5,675,734 A | | 10/1997 | Hair |
| 5,683,253 A | | 11/1997 | Park et al. |
| 5,689,481 A | | 11/1997 | Tamura et al. |
| 5,691,964 A | | 11/1997 | Niederlein et al. |
| 5,691,972 A | | 11/1997 | Tsuga et al. |
| 5,726,909 A | | 3/1998 | Krikorian |
| 5,726,956 A | | 3/1998 | Kanno |
| 5,732,067 A | | 3/1998 | Aotake |
| 5,734,823 A | | 3/1998 | Saigh et al. |
| 5,740,134 A | | 4/1998 | Peterson |
| 5,751,672 A | | 5/1998 | Yankowski |
| 5,754,521 A | | 5/1998 | Yokota |
| 5,793,980 A | | 8/1998 | Glaser et al. |
| 5,794,249 A | * | 8/1998 | Orsolini et al. .......... 707/104.1 |
| 5,796,945 A | * | 8/1998 | Tarabella .................... 709/219 |
| 5,798,921 A | | 8/1998 | Johnson et al. |
| 5,801,694 A | * | 9/1998 | Gershen .................... 715/727 |
| 5,809,246 A | | 9/1998 | Goldman |
| 5,819,160 A | * | 10/1998 | Foladare et al. ............... 455/45 |
| 5,822,284 A | | 10/1998 | Nishizawa |
| 5,860,068 A | | 1/1999 | Cook |
| 5,864,868 A | * | 1/1999 | Contois ................... 707/104.1 |
| 5,867,457 A | | 2/1999 | Parvulescu et al. |
| 5,875,110 A | | 2/1999 | Jacobs |
| 5,892,915 A | | 4/1999 | Duso et al. |
| 5,903,892 A | | 5/1999 | Hoffert et al. |
| 5,914,941 A | | 6/1999 | Janky |
| 5,918,213 A | | 6/1999 | Bernard et al. |
| 5,918,223 A | * | 6/1999 | Blum et al. ..................... 707/1 |
| 5,918,303 A | | 6/1999 | Yamaura et al. |
| 5,926,624 A | | 7/1999 | Katz et al. |
| 5,949,411 A | | 9/1999 | Doerr et al. |
| 5,956,716 A | | 9/1999 | Kenner et al. |
| 5,963,957 A | | 10/1999 | Hoffberg |
| 5,969,283 A | | 10/1999 | Looney et al. |
| 5,974,503 A | | 10/1999 | Venkatesh et al. |
| 5,983,069 A | | 11/1999 | Cho et al. |
| 5,986,979 A | | 11/1999 | Bickford et al. |
| 6,011,760 A | | 1/2000 | Fleming, III |
| 6,011,761 A | | 1/2000 | Inoue |
| 6,047,292 A | | 4/2000 | Kelly et al. |
| 6,055,566 A | | 4/2000 | Kikinis |
| 6,058,428 A | | 5/2000 | Wang et al. |
| 6,062,868 A | | 5/2000 | Toriumi |
| 6,065,042 A | | 5/2000 | Reimer et al. |
| 6,067,279 A | | 5/2000 | Fleming, III |
| 6,118,450 A | | 9/2000 | Proehl et al. |
| 6,128,255 A | | 10/2000 | Yankowski |
| 6,243,725 B1 | | 6/2001 | Hempleman et al. |
| 6,437,229 B1 | | 8/2002 | Nobumoto |
| 6,446,080 B1 | | 9/2002 | Van Ryzin et al. |
| 6,587,403 B1 | | 7/2003 | Keller et al. |
| 7,047,241 B1 | * | 5/2006 | Erickson ........................ 707/9 |
| 7,143,102 B2 | | 11/2006 | Fiennes et al. |
| 2002/0010788 A1 | | 1/2002 | Nathan et al. |
| 2002/0016968 A1 | | 2/2002 | Nathan et al. |
| 2003/0014333 A1 | | 1/2003 | Brown |
| 2003/0065639 A1 | | 4/2003 | Flennes et al. |
| 2004/0078761 A1 | | 4/2004 | Ohanian |

OTHER PUBLICATIONS

Author Unknown, "Video–on–Demand" (1995) published by Tampere University of Technology, Finland, available online at: http://www.cs.tut.fi/tlt/stuff/vod/VoDOverview/vod.html.

Listing bearing the date of Jul. 29, 1996 describing "CDRunner", a CD–related program.

Listing bearing the date Feb. 12, 1996 describing "Music CD", a Windows CD player.

Listing bearing the date Feb. 22, 1996, two pages, describing "Super CD", a Windows CD Driver.

Listing bearing the date Jul. 23, 1995 describing a CD ROM player for use on a PC.

Listing bearing the date Jul. 20, 1995 describing a CD Assistant V1.0 for Windows.

Listing bearing the date Feb. 1, 1994 describing CDMaster version 1.2 CD player.

Listing bearing the date Oct. 13, 1996 describing "EagCD", a program for playing CDs.

Listing bearing the date Feb. 5, 1996 describing "CD Satellite 3", a music playing program.

Listing bearing the date Feb. 1, 1994 describing "CDAudio V1.27U", a CD audio player.

Listing bearing the date Feb. 1, 1994 describing an Audio Compact disc Player for Windows.

Listing bearing the date Feb. 1, 1994 describing a CD player for Windows.

Listing bearing the date Jun. 23, 1994 describing "Mega CD V1.1 Audio Honker for Windows", a CD audio player.

Listing bearing the date Dec. 20, 1994 describing "WinDisc", a CD audio player.

Listing bearing the date Jan. 24, 1996 describing "A Real 32 Bit" CD player for Windows 95.

Listing dated Feb. 1, 1994 describing a package called "CD Player 2.0 for Windows".

Listing dated May 25, 1995 describing "CD Wizzard", a CD audio player.

Listing dated Sep. 14, 1995 describing CD Tray, Version 3.03, a data base system for CDs.

Listing dated Aug. 13, 1995 describing "Optical Jammer 4.0", a CD audio player.
Listing dated Oct. 13, 1996 describing EagCD, an audio CD playing utility.
Listing dated Feb. 1, 1994 describing "CDMaster", A CD audio player.
Listing dated Oct. 3, 1993 describing "Audio Pro", a CD audio player.
Listing dated Nov. 5, 1995 describing "the Pause Provider", for editing a player list.
Listing dated Apr. 16, 1995 describing Version 4.00 of DMP a module player for MS–DOS machines.
Listing dated Dec. 20, 1994 describing "Windisc", an audio CD player.
Listing dated Feb. 5, 1996 describing "CD Satellite 3", an audio CD player and playlist builder.
Listing dated Nov. 14, 1995 describing "RibbonCD V1.0", a CD player for Windows.
Listing dated Oct. 17, 1994 describing "CDBar", an audio CD player for Windows.
Listing dated Jul. 30, 1995 describing "HomeWorks" and "Personal Possessions" programs for organizing personal property such as records, tapes and CDs.
Listing dated Dec. 17, 1995 describing "CD Assistant", a music collection organizer.
Printout dated Dec. 31, 1996 which describes "CD–REC" for recording off of an audio–CD.
Listing dated Sep. 14, 1994 which describes "CD Audio Recorder", for recording off of audio CD.
Listing dated Dec. 17, 1995 describing "CD Assistant" for organizing a music collection.
Listing dated Dec. 31, 1996 which describes "CD–REC" for recording an audio–CD.
Listing dated Feb. 20, 1994 describing "CDGP" for digital recording of an audio–CD.
Listing dated Jul. 11, 1994 which describes "MODAC", a recorder and a player of WAV files.
Listing dated Sep. 14, 1994 which describes "CD Audio Recorder" for recording WAV files off of an audio CD.
Listing dated Oct. 17, 1993 which describes "Wave After Wave", a CD Audio player for Windows 3.1.
Listing dated Apr. 30, 1996 which describes a jukebox playing module usable with Windows 95.
Listing dated Jun. 8, 1993 which describes "Multimedia Changer V1.0" for playing WAV files.
Listing dated Jan. 15, 1995 which describes "WaveMaster", a program for playing WAV files.
Listing dated Feb. 1, 1994 which describes CDAudio player for Windows.
Listing dated Apr. 16, 1997 which describes "CDMaster", a CD player module.
Listing dated May 18, 1996 which describes "TapeMaker", a system for organizing a music collection.
Article dated Dec. 1, 1997 entitled "Download favorite music from Web into computer".
An article believed to have been published Aug. 3, 1997 entitled "World Wide Wurlitzer".
Listing of CD/Spectrum Pro 3.2 Home Page, 2 sheets, a CD audio player, with a last update of Jun. 19, 1997 and two sheets associated therewith defining CDDB Database Connectivity.
Screen shot illustrating aspects of a CD player provided by the Windows 95 Operating System.
Listing bearing the date Jan. 28, 1994 describing two interactive CD related programs, CDBase and CDBase Player.
Ace, "Joystick Operation", Nov. 1985. Ampex Corporation, Ampex Training Department. (4 pages).
Aotaki, Keith. "Field Report: Louth Automation ADC–100", Broadacast Engineering, Apr. 1994. Intertec Publishing Corp, Overland Park, KS. (2 pages).
"CartWorks Version 5.xx: System Installation Guide", dbm Systems, Inc., Ridgeland, MS. (21 pages).
"CartWorks: File Utilities, User's Manual", dbm Systems, Inc., Ridgeland, MS. Amended Jul. 18, 1998. (8 pages).
"CartWorks: MHD 'Music–on–Hard–Drive' User's Manual (V6.8)", dbm Systems, Inc., Ridgeland MS. (11 pages).
"CartWorks: MHD 'Music–on–Hard–Drive' QuickSchedule User's Manual", Revised on Feb. 28, 1998. dbm Systems, Inc., Ridgeland, MS. (8 pages).
"CartWorks: On–Demand Editor User's Manual", dbm Systems, Inc., Ridgeland, MS. (7 pages).
"CartWorks: Script Editor User's Manual (v3.12)", dbm Systems, Inc., Ridgeland, MS. (26 pages).
"Cartworks: Spot Set Editor User's Manual", dmb Systems, Inc., Ridgeland, MS. (11 pages).
"CMX 3400: Operations Manual", Aug. 1984 (Revision A: Jan. 2, 1985). CMX Corporation, Santa Clara, CA. p. 3–2. (3 pages).
Brooks Harris. "Off–line/On–line Video Editing: Considerations of Cost Effective Video Post Production". Nov. 1983. (9 pages).
Huber, David Miles. "Audio Production Techniques for Video". 1987. pp. 286–293. (5 pages).
"Grass Valley Group Integrated Production System: IPS 100 Operator's Guide". 1988. Grass Valley Group, Inc. p. 7–1. (3 pages).
"Lake: Making Waves" promotional materials. Lake Systems Corporation, Newton, MA. (10 pages).
"On Air", Louth Automation promotional materials. 1997. Louth Automation. (10 pages).
Mahon, Chandos, "N1 Finds a Match with Louth", TV Technology. Dec. 1994. (1 page).
Cassanmagnago, Mauro. "Louth Brings PC Control to Telepiu", TV Technology. Jan. 1994. (2 pages).
"Profile Professional Disk Recorder PDR 100". Tektronix Profile Professional Disk Recorder PDR 100 promotional materials. 1996. Tektronix, Inc. (4 pages).
"User Manual: Tektronix Profile Family". Apr. 1997. Tektronix, Inc., Wilsonville, OR. (158 pages).
"Master System" promotional material for Sadie Digital Editing. (2 pages).
"BVE–2000 System Information Manual". Sony Corp. Japan. p. 54 (3 pages).
"BVE–9001/02 Operating Program". Sony Corp. pp. 1–1 and 5–16. (2 pages).
"1–inch Delta Time Recorder, SMPTE/EBU Type–C Format: BVH–2500/2500P" promotional material. Sony Corp. (11 pages).
"Studio Recorders and Players: BVW–75". Sony Corp. (1 page).
"Virtual Recorder Manual". Revised Sep. 9, 1996 and Oct. 20, 1996. ASC Audio Video Corp. (94 pages).
"Broadcast Tools: SpotBase, PlayList & TapeBase" promotional materials. ASC Audio Video Corporation, Burbank, CA. (1 page).

"VR300 MPEG–2 Video Server: Product Preview" promotional materials. ASC Audio Video Corporation, Burbank, CA. (1 page).
"VR300 Broadcast Video Server" promotional materials. 1997. ASC Audio Video Corporation, Burbank, CA. (9 pages).
"VR300 Video Server User Manual, Version 1.0". Mar. 20, 1998. ASC Audio Video Corporation. pp. I–V; 3–1 to 4–19; 4–29 to 5–5. (40 pages).
Byrne, Richard and Murphy, Karen. "RCS Works Cart Wall: User's Guide and Reference Manual". Feb. 1994. RCS, Scarsdale, NY. pp. i to 79; M–5. (83 pages).
"CartWorks: Digital Audio Just Got Easier!" promotional materials. CartWorks dbm Systems, Inc., Ridgeland, MS. (4 pages).
CartWorks V10, promotional materials. CartWorks dbm Systems, Inc., Ridgeland, MS. (1 page).
Bailey, Chris. "CartWorks Eases Labor Pains", Radio World Buyer's Guide User Report. Jun. 26, 1996. (1 page).
"LaKart–200 Multi–Channel Automation System" promotional materials. 1991. BASYS Automation Systems, Inc. (9 pages).
Byrne, Richard and Murphy, Karen. "RCS Works: The Log Editor, User's Guide and Reference Manual". May 6, 1994. RCS, Scarsdale, NY. (43 pages).
"PBS Local Insertion Server: Instruction Manual". Jun. 19, 1996. Microvision, Inc., Budd Lake, NJ. (71 pages).
"NewStar News Automation and Editing Systems" promotional materials. Dec. 1996. Tektronix, Inc., USA. (6 pages).
"Portable MiniDisc Recorder MZ–1: Operating Instructions". Sony Corporation. (45 pages).
WaveStation Digital Audio Automation System: Instruction & Operations Manual. 1997. BSI Broadcast Software International, Gendale, AZ. (113 pages).
"Windows '95 CD player" manual (14 pages).
"Wegener To Market Digital MPEG–2 Based Video File Server", MultiMedia World Daily News, NAB Broadcasters. Apr. 11–12, 1995. (8 pages).
"The DAD486X Digital Audio Delivery System Operation Manual, Version 6.0A". 1990–1995. Revised Jun. 30, 1995. ENCO Systems, Inc., Farmington Hills, MI. (348 pages).
"Master Control Manual: The Paperless and Cartless Stuido System. Version 3.03". 1990–1994. Radio Computing Services, Inc. (216 pages).
"Master Control: System Training Outline". 1995–1996. Radio Computing Services, Inc., Scarsdale, NY. (205 pages).
Murphy, Karen, et al. "RCS Works. OG2: The On–Air Workstation, User's Guide and Reference Manual". Nov. 15, 1994, RCS, Scarsdale, NY. (45 pages).
"Selector: The Music Scheduling System, Manual". 1979–1991. RCS Radio Computing Services, Inc., Scarsdale, NY. (882 pages).
Farber, David. "PN's Announcement of RealAudio (Nice New Product I had betaed)". Apr. 10, 1995. www.interesting–people.org (3 pages).
Zuckerman, Laurence. "Internet Audio Minus the Delays Is Set to Start on the Web Tody". New York Times, Apr. 10, 1995, New York Times Company (2 pages).
"Real Audio Server Administrator's Guide: Release 2.0". 1995, 1996. Progressive Netorks, Inc., USA. (106 pages).
"RealAudio Content Creation Guide: RealAudio Encoder Release 2.0". 1995, 1996. Progressive Networks, Inc., USA. (49 pages).

"Real Audio Player Plus". 1996. Progressive Networks, Inc., Seattle, WA. (42 pages).
"NewStar News Automation and Editing Systems" promotional materials. Dec. 1996. Tektronix, Inc., USA. (6 pages).
"New Telerecording Method for Audio"8 published in BM/E Oct. 1985; (2 pages).
"On Air," Louth Automation promotional materials. 1997. Louth Automation. (10 pages).
One page dated Friday, Jun. 21, 1985 software; (1 page).
Pay Per Listen Cable Audio System; Copyright 1990 CompuSonics Corp.; Objective; (7 pages).
Pay Per Listen Cable Audio System; Copyright 1990 CompuSonics Corp.; Notes to Viewgraph presentation; (1 page).
Pay Per Listen Cable Audio System; Copyright 1990 CompuSonics Corp.; System Payback Analysis; (1 page).
"PBS Local Insertion Server: Instruction Manual." Jun. 19, 1996. Microvision, Inc., Budd Lake, NJ (71 pages).
PC/Sonics 1500 User's Guide; Preliminary Release Jun. 20, 1987; Copyright 1987 CompuSonics Corporation; (31 pages).
PC Week; Dated Aug. 29, 1988, vol. 5 No. 35; (2 pages).
Pfeiffer, "Automatic Audio Content Analysis," pp. 21–30, Association of Computing Machinery, 1996.
Photocopy of a CompuSonics machine; dated 1986; (1 page).
Photocopy of CompuSonics video demo disk; Copyright CompuSonics Video 1986; One page.
Photocopy of a computer screen bearing a program; Copyright 1985; (1 page).
Portion of CompuSonics Corporation report dated Aug. 22, 1986; (73 pages).
"Pro Equipment & Services" and "Summer CES" published in Billboard magazine; dated Jun. 9, 1984; (1 page).
"Profile Professional Disk Recorder PDR 100." Tektronix Profile Professional Disk Recorder PDR 100 promotional materials. 1998. Tektronix, Inc. ( 4 pages).
Prototype of User Documentation for DSP Library; CompuSonics Corp.; Dated Jun. 21, 1985; (4 pages).
Radio Computing Services, Inc., Selector The Music Scheduling System Manual, Jan. 1991.
Ranada, David, "New HI–FI Horizons;" Stereo Review vol. 59, Dated Dec. 1984; (6 pages).
"RealAudio Content Creation Guide: RealAudio Encoder Release 2.0." 1995, 1996. Progressive Networks, Inc., USA. (49 pages).
"RealAudio Player Plus." 1996. Progressive Networks, Inc., Seattle, WA. (42 pages).
"RealAudio Server Administrator's Guide: Release 2.0." 1995, 1996. Progressive Networks, Inc., USA. (106 pages).
Schwartz, David, AES 76th Convention, NYC; Specifications and Implementation of a Computer Audio Console for Digital Mixing and Recording. Jun. 20, 1984; 2 pages.
Schwartz, David; "Letter to CompuSonics, Inc. Shareholders;" Dated Jan. 6, 1984; (2 pages).
Schwartz, David; "Letter to CompuSonics, Inc. Shareholders;" Dated Apr. 6, 1984; (1 page).
Schwartz, David; "Letter to CompuSonics, Inc. Shareholders;" Dated Jul. 16, 1984; (1 pages).
Schwartz, David; "Letter to CompuSonics, Inc. Shareholders;" Dated May 31, 1985; (2 pages).
Schwartz, David; "Letter to CompuSonics, Inc. Shareholders;" Dated Oct. 10, 1985; (2 pages).
Schwartz, David; Sightsound vs. N2K; Dated Feb. 1, 2001; (79 pages).

Schwartz, David; "Specification and Implementation of a Computer Audio Console for Digital Mixing and Recording;" AES an Audio Engineering Society Preprint; Oct. of 1984.
Schwartz, David and Stautner, John; "AES Digital Audio Recording on Floppy Disk;" Presented at the 78th Convention May 3–6, 1985 Anaheim; (16 pages).
Securities and Exchange Commission dated Nov. 25, 1985; CompuSonics Corporation; (2 pages).
Securities and Exchange Commission Form K–10; Annual Report Pursuant to Section 13 or 15(d) of the Securities Act of 1934 for fiscal year ended Feb. 28, 1986; (67 pages).
Securities and Exchange Commission Form K–10; Annual Report Pursuant to Section 13 or 15(d) of the Securities Act of 1934 for fiscal year ended Feb. 28, 1987; (49 pages).
Securities and Exchange Commission Form K–10; Annual Report Pursuant to Section 13 or 15(d) of the Securities Act of 1934 for fiscal year ended Feb. 29, 1988; (50 pages).
Securities and Exchange Commission Form 8; Amendment to Application or Report Filed pursuant to Section 12, 13 or 15(d) of the Securities Act of 1934 for fiscal year ended Feb.
"Selector: The Music Scheduling System, Manual." 1979–1991. RCS Radio Computing Services, Inc., Scarsdale, NY. (882 pages).
Shoji, Kimiaki, Okamoto, Shizuo and Nonaka Kazunori; "Great Progress in New Visual Communication Systems—Hi–Captain, VRS, C&DS;" NTT Review vol. 1, No. 3; Dated Sep. 19.
Software; One (1) page dated Friday, Jun. 21, 1985; Copyright 1985. CompuSonics Corp., Cambridge, MA 02139; (1 page).
Software; Two (2) pages dated Friday, Jun. 21, 1985; Copyright 1985, CompuSonics Corp., Cambridge, MA 02139.
Sohn, Hyun Heinz; "A High Speed Telecommunications Interface for Digital Audio Transmission and Reception;" Dated Oct. 1984; (11 pages).
Sohn, Hyun Heinz; AES 76th Convention, NYC; A High Speed Telecommunications Interface for Digital Audio Transmission and Reception; Dated Jun. 20, 1984; 2 pages.
"Sound Investment;" Published in the New York Post on Monday, Jun. 10, 1985; (1 page).
Stautner, John P., AES 76th Convention, NYC; Strategies for the Representation and Data Reduction of Digital Music Signals; Dated Jun. 20, 1984; 2 pages.
Stautner, John P, "Musical Recording, Editing a Production Using the Compusonics DSP–2004;" CompuSonics Corporation; (2 pages).
Stautner, John P., "Toward Electronic Delivery of Music: Sending and Receiving High Fidelity Digital Music;" CompuSonics Corporation; Apr. of 1989; (7 pages).
Telephony Integrating Voice and Data Communications; Dated Sep. 25, 1989, vol. 217, No. 14; (2 pages).
Temime, Jean–Pierre; "Videotex Enters Another Dimension;" Dated Sep. 25, 1989; (3 pages).
The Compusonics DSP–1000 brochure (best available copy); Copyright 1986; (3 pages).
The Compusonics DSP–2002 brochure (best available copy); Copyright 1985; (6 pages).
"The DADPro Digital Audio Delivery System Operation Manual: Version 1.0." 1996. Revised Aug. 20, 1996. ENCO Systems, Inc., Farmington Hills, MI. (424 pages).
The Digital Recording Report; Dated Apr. 1986; vol. 3, No. 4; (8 pages).

"The Search for the Digital Recorder;" Dated Nov. 12, 1984; (2 pages).
Thomson One Banker—Filings List; Compusonics Video Corp.; Copyright 2007; 1 page.
"Towards the Digital Music Library: Tune Retrieval from Acoustic Input," McNab et al, DL '96, ACM 0–89791–830–1/96, ACM 1996.
"User Manual: Tektronix Profile Family." Apr. 1997. Tektronix, Inc., Wilsonville, OR. (158 pages).
Various articles on CompuSonics Corp; Dated 1985; (3 pages).
"Video Explosion on the way for Buyers;" Dated prior to 1985; (1 page).
"Virtual Recorder Manual." Revised Sep. 9, 1996 and Oct. 20, 1996. ASC Audio Video Corp. (94 pages).
Vollor, Chris; "Promises to Keep . . . " Published in Tape Deck 1985; (5 pages).
"VR300 Video Server User Manual, Version 1.0." Mar. 20, 1998. ASC Audio Video Corporation. pp. I–V; 3–2 to 4–19; 4–29 to 5–5. (40 pages).
Washington University Public Domain Archives; Dated Jun. 21, 1989; (3 pages).
"WaveStation Digital Audio Automation System: Instruction & Operations Manual." 1997. BSI Broadcast Software International, Glendale, AZ. (113 pages).
Wegener Announces MPEG–2 Based System for Broadcasters Using Micropolis Video Servers, Mar. 27, 1995.
"Wegener To Market Digital MPEG–2 Based Video File Server," MultiMedia World Daily News, NAB Broadcasters. Apr. 11–12, 1995. (8 pages).
Weinstock, Neal; "CompuSonics: Another Digital Audio Standard;" Published in the Recording Industry Magazine Mix vol. 8 No. 8; Dated Aug. 1984; (3 pages).
Wold, "Content–Based Classification, Search, and Retrieval of Audio," pp. 27–36, Institute of Electrical and Electronics Engineers, 1998.
Yates, Keith; "Hi–Fi Floppy," published in PC World; Apr. 1985; (8 pages).
Getting Started With Regulus, SBE Version, Oct. 25, 1984.
Schwartz, David, AES 76th Convention, NYC; Specifications and Implementation of a Computer Audio Console for Digital Mixing and Recording. Oct. 8–11, 1984; 10 pages.
Form 10–K; Annual Report Pursuant to Section 13 or 15(d) of the Securities Exchange Act of 1934; For the fiscal year ended Feb. 28, 1985; CompuSonics Corporation; (58) pag.
AES "Specifications and Implementation of a Computer Audio Console for Digital Mixing and Recording"; Dated Oct. 1984; By David M. Schwartz; Nine (9) pages.
CompuSonics DSP 2002 Version 1.00 Preliminary User Manual; Dated Aug. 28, 1985; Copyright 1985; Seventy–nine (79) pages.
Letter to CompuSound, Inc. shareholders; Dated Jan. 6, 1984; By David M. Schwartz; Two (2) pages.
Letter to CompuSound, Inc. shareholders; Dated Apr. 6, 1984; By David M. Schwartz; One (1) pageto.
"Liquid Audio Strikes Key Partnerships, Technology Deals To Deliver a Sound and Marketable Internet Solution," Multimedia Week, Sep. 2, 1996.
Liquid Audio Liquid Player Five the CD Quality Music Player for the Internet; Four (4) pages; Copyright 1999 Liquid Audio Inc.
Rocky Mountain News, Denver, Colorado; "Company Sees Future in Digital Recorders" Jul. 22, 1984; One (1) Page.

Rolling Stones; "Americans have bee taking them out for a Spin for more than a Century"; One (1) page.

CompuSonics Digital Audio Telecommunications System; Copyright 1985 CompuSonics Corp.; One (1) page.

Industriell Datateknik Aug. 1984; "Stereobandspelare Med Flexskiva"; One (1) page.

AES 76th Convention, NYC; Specifications and Implementation of a Computer Audio Console for Digital Mixing and Recording; By David M. Schwartz; Dated Jun. 20, 1984; Two (2) pages.

AES 76th Convention, NYC; Strategies for the Representation and Data Reduction of Digital Music Signals; By John P. Stautner; Dated Jun. 20, 1984; Two (2) pages.

AES 76th Convention, NYC; A High Speed Telecommunications Interface for Digital Audio Transmission and Reception; Hyun Heinz Sohn; Dated Jun. 20, 1984; Two (2) pages.

Photocopy of a CompuSonics video demo disk; Copyright CompuSonics Video, 1986; One (1) page.

Photocopies of the DSP–1000 Digital Disk Recorder/Player at the AES show in Chicago Summer of 1985; One (1) page.

Photo of the first CompuSonics professional all digital computer audio recording system; Handwritten date 1984; One (1) page.

Consumer Electronics June of 84 vol. No. 12; Watch out digital discs: Here comes floppy audio; One (1) page.

Audio Times Summer CES Preview vol. 26 No. 5; "Digital Recording System Uses Floppy Discs"; May 1984; Two (2) pages.

Article handwritten date of Apr. 20, 1984 from a Louisville, KY newspaper; "New Technology Challenges the Compact Disc"; One (1) page.

Digital Audio and Compact Disc Review; dated Sep. 1985; Two (2) pages.

Stereo Review vol. 59 Dated Dec. 1984; "New Hi–Fi Horizons"; By David Ranada; Six (6) pages.

Pro Sound News, New York, NY; Dated Jun. 1984; "CompuSonics Bows Totally Digital"; One (1) page.

IntoWorld—The Newsweekly for Microcomputer Users; vol. 6, Issue 23; Dated May 11, 1984; "From the Desk" One (1) page.

"CompuSonics Wants to Create a Missing Link"; By John Schneidswind; Three (3) pages.

Fax Memo to Michael Kapp, President of Warner Bros. Special Products from David Schwartz, Chairman of CompuSonics; Dated Apr. 26, 1990; Regarding CSX Pay Per Listen System; One (1) page.

Pay Per Listen Cable Audio System; Copyright 1990 CompuSonics Corp.; Notes to Viewgraph presentation; One (1) page.

Pay Per Listen Cable Audio System; Copyright 1990 CompuSonics Corp.; System Payback Analysis; One (1) page.

CompuSonics—Executive Summary of a Proposed Video Floppy Disk Company; Created before Jul. 30, 1985; Three (3) pages.

Google search for CompuSonics; Dated Apr. 1, 2004; Two (2) pages.

CompuSonics Application Notes for DSP 1000 Digital Audio Disk Recorder; Copyright 1986 CompuSonics Corp.; Two (2) pages.

CompuSonics 1998 Product Line; Four (4) pages.

CompuSonics Video Application Notes; Copyright 1986; Four (4) pages.

CompuSonics DSP 1000 Audio Computer brochure; Copyright 1987 CompuSonics Corp.; One (1) page.

CompuSonics PC/Sonics Remote Control and Relational Database Software brochure; Copyright 1987; One (1) page.

CompuSonics DSP–1000 Digital Disk Recorder/Player; Copyright 1984; One (1) page.

Business article regarding CompuSonics Corporation; Four (4) pages.

Business article regarding CompuSonics Corporation; Six (6) pages.

Google search results for CompuSonics; Dated Apr. 1, 2004; Two (2) pages.

Article entitled "The Audio Computer and its Applications" by David Schwartz and John Stautner; CompuSonics Corporation; Ten (10) pages.

Prototype of User Documentation for DSP Library; CompuSonics Corp.; Dated Jun. 21, 1985; Four (4) pages.

Sightsound vs. N2K; David M Schwarts; Dated Feb. 1, 2001; Seventy–Nine (79) pages.

The Digital Recording Report; Dated Apr. 1986; vol. 3, No. 4; Eight (8) pages.

Computer program dated Jun. 21, 1984; One (1) page.

Computer program dated Jun. 21, 1985; One (1) page.

Computer program dated Jun. 21, 1985; Two (2) pages.

NTT Review vol. 1, No. 3; Dated Sep. 1989; Great Progress in New Visual Communication Systems—Hi–Captain, VRS, C&DS; By Kimiaki Shoji, Shizuo Okamoto, and Kazunori Nonaka; Nine (9) pages.

"Videotex Enters Another Dimension"; By Jean–Pierre Temime; Dated Sep. 25, 1989; Three (3) pages.

Telephony Integrating Voice and Data Communications; Dated Sep. 25, 1989, vol. 217, No. 14; Two (2) pages.

Government Information Quarterly—An International Journal of Resources, Services, Policies, and Practices; vol. 7, No. 2, 1990; "The New Space and Earth Science Information Systems at NASA's Archive"; By James L. Green; Nine (9) pages.

Computer Communications "Architecture for Distributed Multimedia Database Systems"; By P B Berra, Cyr Chen, A Ghafoor, C C Lin, T D C Little, and D Shin; vol. 13, No. 4, May 1990; Sixteen (16) pages.

Radiology "Ultra–High–Speed Teleradiology with ISDN Technology"; By James L. Lear, MD, MSE; Michael Manco–Johnson, MD; Angela Feyerabend, MD; Gene Anderson; David Robinson; Jun. 1989; Three (3) pages.

"Meta–Scheduling for Distributed Continuous Media"; By David P. Anderson; Dated Oct. 4, 1990; Thirty–two (32) pages.

Introduction dated Jun. 21, 1989; Four (4) pages.

Four (4) pages of a Dialog printout featuring items 7 and 8 from file 275; Dated 1984.

The What's New Magazine Popular Science "Look and Listen"; Dated Sep. 1984; One (1) page.

Memorandum of Understanding Between AT&T Communications, Inc. and CompuSonics Corporation; Four (4) pages; Dated Oct. 15, 1985.

Cover of Fortune magazine; Dated Nov. 12, 1984; One (1) page.

CompuSonics Corp. Corporate Profile; By David Schwartz; John Stautner; and James Woodworth; One (1) page.

Digital Audio Telecommunications System diagram of AT&T Accunet Switch 58 of T1.5 Service; Copyright 1985 CompuSonics Corp; One (1) page.

USA Today; Computerline "Spin a Musical Disk on Personal Computer"; One (1) page.

"Video Explosion on the way for Buyers"; Dated prior to 1985;One (1) page.

Cover of Newsweek magazine bearing an article entiteld "A Digital Recorder for the Home"; Dated Jul. 2, 1984; One (1) page.

Cover of Audio Times magazine featuring "Video–Ready Hi Fi Meets Stero TV at CES"; vol. 24 No. 5; Dated Jun. 1984; One (1) page.

Cover of CES Daily News magazine featuring "Digital Audio Disk takes on a new Meaning" and "Digital Audio with a Disk"; Dated Jun. 2, 1984 One (1) page.

Article entitled "CompuSonics: Another Digital Audio Standard" published in Digital Discussions; One (1) page.

Article entitled "From the News Desk" published in Into-World; Dated May 11, 1984; One (1) page.

Article entitled "Manufacturing Updates" published in AudioVideo; Jun. 1984; One (1) page.

Article entitled "Audio/Video" published in High Fidelity; One (1) page.

Article entitled "Digitized Music from Bach to Rock"; One (1) page.

Photocopy of a CompuSonics machine; One (1) page.

Photocopy of a CompuSonics machine; Dated 1986; One (1) page.

Article entitled "Pro Equipment & Services New CompuSonics Digital System" published in Billboard magazine; Dated May 26, 1984; One (1) page.

"Pro Equipment & Services" and "Summer CES" published in Billboard magazine; Dated Jun. 9, 1984; One (1) page.

BusinessWeek magazine; Dated May 1984; One (1) page.

Design and Engineering 1984; One (1) page.

Audio Times "Digital Recording System Uses Floppy Discs"; Dated May 1984, vol. 26 No. 5, One (1) page.

CompuSonics Corporation's Digital Marketing Corporation Video Real Estate System; Dated Jun. 7, 1988; Three (3) pages.

CompuSonics Executive Summary of a Proposed Video Floppy Disk Company; Dated 1985 or before; Three (3) pages.

CompuSonics DSP 2002 Version 1.00 Preliminary User Manual; Dated Aug. 28, 1985; Copyright 1985, CompuSonics Corporation; Forty (40) pages.

"A High Speed Telecommunications Interface for Digital Audio Transmission and Reception"; By Hyun Heinz Sohn; Dated Oct. 1984; Eleven (11) pages.

Cover of U.S. News & World Report; Dated Jun. 18, 1984; One (1) page.

Prototype of User Documentation for DSP Library; CompuSonics Corp; Dated Jun. 21, 1985; Four (4) pages.

One (1) page dated Friday, Jun. 21, 1985 software; One (1) page.

Software; One (1) page dated Friday, Jun. 21, 1985; Copyright 1985. CompuSonics Corp., Cambridge, MA 02139; One (1) page.

Software; Two (2) pages dated Friday, Jun. 21, 1985; Copyright 1985. CompuSonics Corp., Cambridge, MA 02139.

CompuSonics Corporation stock report; Warrent Agent American Stock Transfer, Inc.; Dated Sep. 11, 1986; Eighty (80) pages.

Securities and Exchange Commission dated Nov. 25, 1985; CompuSonics Corporation; Two (2) pages.

CompuSonics Business Plan Overview; Dated Jun. 14, 1984; Three (3) pages.

PC/Sonics 1500 User's Guide; Preliminary Release Jun. 20, 1987; Copyright 1987 CompuSonics Corporation; Thirty-one (31) pages.

SBE's Regulas 4.2 document containing ten sections; 610 pages.

Appendix A: Command Descriptions; University of California Berkeley; Dated May 1984; Eight pages.

Article entitled "CompuSonics to Bow Digital Audio Floppy Disk Player/Recorder; CD Rival" published in Consumer Electronics Daily vol. VII No. 6 Issue 8; Dated Thursday, May 10, 1984; Two (2) pages.

Audio Video "Manufacturing Update"; Dated Jun. 1984; One (1) page.

CES Trade News Daily "CompuSonics Fuses Computer, Audio into "World's First" Home Digital Recorder"; Dated Monday, Jun. 4, 1984; By Marcia Golden; One (1) page.

Consumer Electronics Show Daily "Digital Sound Now on Computer Disks"; Dated Sunday, Jun. 3, 1984; By Stephen A. Booth; One (1) page.

HFD—The Weekly Home Furnishings Newspaper "CompuSonics readies Floppy Disk to Record and Play back Music" and an article featured in Broadcast Week the Station Book dated May 21, 1984; vol. 2, No. 27; One (1) page.

Brochure featuring CompuSonics DSP 1000 Digital Audio Disk Recorder; Copyright 1988 CompuSonics Corp.; One (1) page.

"CompuSonics Bows Totally Digital"; Dated Jun. 8, 1984; One (1) page.

Article regarding RCA and Consumer Electronics Mktg. VP Stephen Stepnes; Dated May 21, 1984; One (1) page.

Flyer for CompuSoncis DSP–1000 Digital Disk Recorder/Player—Preliminary Specifications; Copyright 1984; CompuSonics Corporation; One (1) page.

Consumer Electronics Dated Jun. 1984, vol. 12; "Watch Out Digital Discs: Here Comes Floppy Audio"; One (1) page.

"Hearing the Future" published in the Seattle, WA. Times; Dated Jun. 8, 1984; One (1) page.

"Digital Recording System Uses Floppy Discs" Published in the Audio Times, vol. 26, No. 5; Dated May 1984; Two (2) pages.

"A High Speed Telecommunicatinos Interface for Digital Audio Transmission and Reception"; By Hyun Heinz Sohn of Shugart Corporation for CompuSonics Corp; Thirteen (13) pages.

Digilist "Where Real Estate Brokerage Leaps from an Ancient Art to the State of the Art . . . "; Digital Marketing Corporation; Seven (7) pages.

"Engineering Your Own Digital Audio Broadcast System"; By David M. Schwartz; CompuSonics Corporation; Ten (10) pages.

Letter to CompuSonics shareholders; Dated May 31, 1985; By David M. Schwartz; Two (2) pages.

Letter to CompuSonics shareholders; Dated Jan. 6, 1984; By David M. Schwartz; Two (2) pages.

AES an Audio Engineering Society Preprint; "Specification and Implementation of a Computer Audio Console for Digital Mixing and Recording"; By: David M. Schwartz; Oct. of 1984; Ten (10) pages.

"A High Speed Telecommunications Interface for Digital Audio Transmission and Reception"; By Hyun Heinz Sohn of Shugart Corporation; Ten (10) pages.

"Hearing the Future" published in Seattle, WA Times; Dated June 1984; One (1) page.

"Toward Electronic Delivery of Music: Sending and Receiving High Fidelity Digital Music" by John P. Stautner; CompuSonics Corporation; Apr. of 1989; Seven (7) pages.

CompuSonics Application Note DSP 1000 Digital Audio Disk Recorder; Copyright 1986 CompuSonics Corp.; Two (2) pages.

"Digital Sound Now on Computer Disks" by Stephen A. Booth; Published in Consumer Electronics Show Daily Jun. 3, 1984; One (1) page.

CompuSonics 1988 Product Line; Six (6) pages.

"AT&T Demo"; Pro Sound News vol. 7 No. 9; Dated Sep. 9, 1985; One (1) page.

CompuSonics Audio Computer Owners Guide; Copyright 1986; Sixty–one (61) pages.

"The Search for the Digital Recorder"; Fortune Nov. 12, 1984; By Brian Dumaine; One (1) page.

The Compusonics DSP–2002 brochure (best available copy); Copyright 1985; Six (6) pages.

The Compusonics DSP–1000 brochure (best available copy); Copyright 1986; Three (3) pages.

Directory screen of CompuSonics DSP 2002; Copyright 1985, CompuSonics Corporation Version 1.02; One (1) page.

"Floppy–Disk Audio System" published in Science Digest Nov. 1984; By Amy Mereson; Two (2) pages.

"Multiple Choice CD Players Help Spur Market Demand" published in Sight & Sound Sep. 1984; Two (2) pages.

"New Telerecording Method for Audio" published in BM/E Oct. 1985; Two (2) pages.

Article regarding CompuSonics Digital Audio Transmission System; One (1) page.

Brochure for CompuSonics PC/Sonics Remote Control and Relation Database Software; Copyright 1987 CompuSonics Corp.; One (1) page.

AES Digital Audio Recording on Floppy Disk; By David M. Schwartz and John P. Stautner of CompuSonics Corp.; Presented at the 78th Convention May 3–6, 1985 Anaheim; Sixteen (16) pages.

Letter to Shareholders by David M. Schwartz; CompuSound, Inc.; Dated Jan. 6, 1984; Two (2) pages.

Letter to Shareholders by David M. Schwartz; CompuSonics; Dated Oct. 10, 1985; Two (2) pages.

Letter to Shareholders by David M. Schwartz; CompuSound, Inc. Dated Apr. 6, 1984; One (1) page.

Letter to Shareholders by David M. Schwartz; CompuSonics; Dated Jul. 16, 1984; One (1) page.

AES 76th Convention, NYC; Strategies for the Representation and Data Reduction of Digital Music Signals; By John P. Stautner of CompuSonics Corp.; Dated Jun. 20, 1984; Two (2) pages.

"Promises to Keep . . . " By Chris Vollor; Published in Tape Deck 1985; Five (5) pages.

"Hi–Fi Floppy" published in PC World Apr. 1985; By Keith Yates; Eight (8) pages.

"Musical Floppies" By Keith Yates; One (1) page.

Article from Sacramento Magazine; Dated Oct. 1984; One (1) page.

"A Store–And–Forward Architecture for Video–On–Demand Service" by A.D. Geimanl; H. Kobrinski; L.S. Smoot; S.B. Weinstein; Copyright 1991; Five (5) pages.

ICC91 International Conference on Communications; vol. 2 of 3; Dated 1991; Twenty (20) pages.

"A Distributed Multimedia Database System" By Arif Ghafoor, C.Y. Roger Chen and P. Bruce Berra; Copyright 1988; Nine (9) pages.

Digital Video Interactive; The Technology and its Application; By R.N. Hurst; Dated 1988; SPIE vol. 899; Optical Storage Technology and Applications; Ten (10) pages.

"Optical Storage Technology and Applications"; By Donald B. Carlin, Yoshito Tsunoda, Albert A. Jamberdino; vol. 899; Published by SPIE—The International Society for Optical Engineering; Dated Jan. 1988; Three (3) pages.

"News and Movies in the 50 Megabit Living Room"; By Andrew Lippman and Walter Bender; Copyright 1987; Six (6) pages.

IEEE/IEICE Global Telecommunications Conference 1987 Globecom '87 Tokyo Conference Proceedings; Edited By Noriyoshi Kuroyanagi; vol. 3 of 3; Fifteen (15) pages.

Patricia Seybold's Office Computing Report "CD–Rom.Listen to the Music"; By David S. Marshak; vol. 11, No. 4; Six (6) pages.

Patricia Seybold's Office Computing Report; vol. 11, No. 4; Dated Apr. 1988; "PC Lans Revisited"; By Judith R. David; One (1) page.

"Digital Video Interactive—A New Integrated Format for Multi–Media Information"; By Sandra Morris; Dated Dec. 1987; Thirteen (13) pages.

Microcomputers for Information Management—An International Journal for Library and Information Services; vol. 4, No. 4; Dated Dec. 1987; Two (2) pages.

Network Access; Dated Jun. 21, 1989; Two (2) pages.

Washington University Public Domain Archives; Dated Jun. 21, 1989; Three (3) pages.

Photocopy of a computer screen bearing a program; Copyright 1985; One (1) page.

Thomson One Banker—Filings List; Compusonics Video Corp.;One (1) page.

Thomson One Banker—Filings List; Compusonics Video Corp.; Copyright 2007; One (1) page.

Form S–18; Registration Statement Under the Securities Act of 1933; Compusonics Video Corporation filed on Sep. 23, 1985; 170 pages.

"Musical Recording, Editing an Production Using the CompuSonics DSP–2004"; By John P. Stautner; CompuSonics Corporation; Two (2) pages.

"CompuSonics Eyes Options; Will Flagship Computer Make Direct CD Copies?"; Dated Mar. 30, 1987; Two (2) pages.

"The Search for the Digital Recorder"; Dated Nov. 12, 1984; Two (2) pages.

"High–Fidelity Heaven?"; Published in Forbs on Dec. 29, 1986; Three (3) pages.

PC Week; Dated Aug. 29, 1988, vol. 5 No. 35; Two (2) pages.

"CompuSonics: Another Digital Audio Standard"; Published in the Recording Industry Magazine Mix vol. 8, No. 8; Dated Aug. 1984; By Neal Weinstock; Three(3) pages.

"Sound Investment"; Published in the New York Post on Monday, Jun. 10, 1985; One (1) page.

Various articles on CompuSonics Corp; Three (3) pages; Dated 1985; No further information available.

"AT&T Demo"; Published in Pro Sound New magazine date; Dated Sep. 9, 1985 vol. 7 No. 9; One (1) page.

"CompuSonics Digitizes Phone Lines"; Published in Digital Audio; Dated Sep. 1985 vol. II No. 1; One (1) page.

"New Telerecording Method for Audio"; Published in BM/E; Dated Oct. 1985; Two (2) pages.
DocuStore brochure; Two (2) pages.
Transcription of deposition of David M. Schwartz taken by Plaintiff; Civil Action No. 2–03CV–320; *Antor Media Corporation* (Plaintiff) vs. *Apple Computer, Inc. et al.* (Defendants); Dated Oct. 22, 2004; 265 pages.
AES "A High Speed Telecommunications Interface for Digital Audio Transmission and Reception"; by Hyun Heinz Sohn of CompuSonics Corp.; Dated Oct. 1984; Eleven (11) pages.
"Toward Electronic Delivery of Music Sending and Receiving High Fidelity Digital Music" by John P. Stautner; CompuSonics Corporation; Dated 1989; Seven (7) pages.
Draft dated Apr. 5, 1985; Nineteen (19) pages.
EMI Music Marketing; List of prices effective Aug. 2, 2004; Eleven (11) pages.
USA Today; Spin a Musical Disk on Personal Computer; One (1) page.
One (1) DVD—Liquid Audio 5 2000.
Ace, "Joystick Operation," Nov. 1985. Ampex Corporation, Ampex Training Department. 4 pages.
Aotaki, Keith. "Field Report: Louth Automation ADC–100," Broadcast Engineering, Apr. 1994. Intartec Publishing Corp, Overlan Park, KS. 2 pages.
"Americans have been taking them out for a spin for more than a century;" Rolling Stones. 1 page.
Anderson, David P., "Meta–Scheduling for Distributed Continuous Media;" Dated Oct. 4, 1990. 32 pages.
Appendix A; Command Descriptions; University of California Berkeley; Dated May 1984.
Article dated Dec. 1, 1997 entitled Download favorite music from Web Ito computer.
Article "Audio/Video" published in High Fidelity. 1 page.
Article entitled "CompuSonics: Another Digital Audio Standard" published in Digital Discussions. 1 page.
Article entittled "CompuSonics to Bow Digital Audion Floppy Disk Player/Recorder; CD Rival" published in Consumer Electronics Daily vol. VIII, No. 6, Iss. 8; dated Thursday.
Article entitled "From the News Desk" published Into World; Dated May 11, 1984.
Article entitled "Manufacturing Updates" published in AudioVideo; Jun. 1984. 1 page.
Article entitled "Pro Equipment & Services New CompuSonics Digital System" published in Billboard magazine; dated May 26, 1984.
Article from Sacramento Magazine; Dated Oct. 1984.
Article handwritten date of Apr. 20, 1984 from Louisville, KY newpaper; "New Technology Challenges the Compact Disc." One (1) Page.
Article regarding RCA and Consumer Electronics Mktg. VP Stephen Stepnes; Dated May 21, 1984.
"AT&T Demo;" Pro Sound News vol. 7, No. 9; Dated Sep. 9, 1985. 1 page.
Audio Times, "Digital Recording System Uses Floppy Discs;" Dated May 1984, vol. 26, No. 5. 1 page.
Audio Times Summer CES Preview vol. 26 No. 5; "Digital Recording System Uses Floppy Discs;" May 1984; two Pages.
Audio Video "Manufacturing Update;" Dated Jun. 1984; (1 page).

Author Unknown, "Video–on–Demand" (1995) published by Tampere University of Technology, Finland, available at http://www.ca.lut.f/lt/stuff/vod/VoDOvarview/vod.html.
"Automatic Audio Content Analysis," Pfeiffer et al, ACM Multimedia 98, pp. 21–30, ACM 1996. (1 page).
Bailey, Chris. "CartWorks Eases Labor Pains," Radio World Buyer's Guide User Report. Jun. 26, 1998. (1 page).
Bender, Walter and Lippman, Andrew; "News and Movies in the 50 Megabit Living Room;" Copyright 1987; (6 pages).
Berra, P.B., Chen, Cyr, Ghafoor, A., Lin, C.C., Little, L.D.C and Shin, D.; "Architecture for Distributed Multimedia Database Systems;" Computer Communications; vol. 13, No.
Berra, P. Bruce, Chen, C.Y. Roger and Ghafoor, Arif, "A Distributed Multimedia Database System;" Copyright 1988; (9 pages).
Booth, Stephen A., "Digital Sound Now on Computer Disks;" Consumer Electronics Show Daily; Dated Sunday Jun. 3, 1984; (1 page).
Brooks Harris, "Off–line Video Editing: Considerations of Cost Effective Video Post Production." Nov. 1983. (9 pages).
BusinessWeek magazine; dated May 1984; (1 page).
Byrne, Richard and Murphy, Karen. "RCS Works Cart Wall: User's Guide and Reference Manual." Feb. 1994. RCS, Scarsdale, NY. pp. 1 to 70; M–5. (83 pages).
Carl, Jeremy. "Liquid Audio Delivers Dolby Digital Music via Web." Copyright 1997 Mackiermedia Corporation, Internet World; Mar. 24, 1997 (2 pages).
Carlin, Donald, Jamberdino, Albert A., and Tsunoda, Yoshito; "Optical Storage Technology and Applications;" vol. 899; Published by SPIE—The International Society for Optical.
"CartWorks: File Utilities, User's Manual," dbm Systems, Inc., Ridgeland, MS. Amended Jul. 18, 1998. (8 pages).
Cassanimagnago, Mauro. "Louth Brings PC Control to Teleplu," TV Technology. Jan. 1994. (2 pages).
"CMX 3400; Operations Manual," Aug. 1984 (Revision A: Jan. 2, 1985). CMX Corporation, Santa Clara, CA. p. 3–2. (3 pages).
Colombo, Ruth. "Liquid Audio White Paper: Buying Music Over the Internet." Copyright 1997 by Liquid Audio Inc.; Dated Aug. 8, 1997 (7 pages).
CompuSonics 1988 Product Line; (6 pages).
CompuSonics 1998 Product Line; (4 pages).
CompuSonics Application Notes for DSP 1000 Digital Audio Disk Recorder; Copyright 1988 CompuSonics Corp.; (2 pages).
Compusonics Audio Computer Owners Guide; Copyright 1986; (61 pages).
"CompuSonics Bows Totally Digital;" Pro Sound News, New York, NY; Dated Jun. 6, 1984; One (1) page.
CompuSonics Corporation's Digital Marketing Corporation Video Real Estate System; Dated Jun. 7, 1988; (3 pages).
CompuSonics Digital Audio Telecommunications System; Copyright 1985 CompuSonics Corp.; One page.
"CompuSonics Digitizes Phone Lines;" Published in Digital Audio; Dated Sep. 1985, vol. II No. 1; (1 page).
CompuSonics DSP 1000 Audio Computer brochure; Copyright 1987 CompuSonics Corp.; (1 page).
CompuSonics DSP 1000 Digital Disk Recorder/Player; Copyright 1984; (1 page).
CompuSonics DSP–1000 brochure (best available copy); Copyright 1986; (3 pages).
CompuSonics DSP–1000/PC (1 page). 1984.

CompuSonics DSP 1500 Digital Audio Cart Recorder brochure; (1 page).

CompuSonics DSP–2002 brochure (best copy available); Copyright 1985; (6 pages).

CompuSonics DSP 2002 Version 1.00 Preliminary User Manual; Dated Aug. 28, 1985; Copyright 1985, CompuSonics Corporation; (40 pages).

"CompuSonics Eyes Options; Will Flagship Computer Make Direct CD Copies?" Dated Mar. 30, 1987; (2 pages).

CompuSonics PC/Sonics Remote Control and Relational Database Software brochure; Copyright 1987; (1 page).

"CompuSonics readies Floppy Disk to Record an Play back Music" and an article featured in Broadcast Week the Station Book dated May 21, 1984; vol. 2, No. 27; The Weekly Home F.

CompuSonics Video Application Notes; Copyright 1986; (4 pages).

Computer program dated Jun. 21, 1985; (1 page).

Computer program dated Jun. 21, 1985; (2 pages).

Consumer Electronics Jun. of 84; vol. No. 12; "Watch out digital discs: Here comes floppy audio;" One page.

"Content–Based Classification, Search, and Retrieval of Audio," World et al, IEEE 1070–986X/98, IEEE 1996.

Brochure featuring CompuSonics DSP 1000 Digital Audio Disk Recorder; Copyright 1988 CompuSonics Corp.; (1 page).

Brochure for CompuSonics PC/Sonics Remote Control and Relation Database Software; Copyright 1987 CompuSonics Corp.; (1 page).

Directory screen of CompuSonics DSP 2002; Copyright 1985, CompuSonics Corporation Version 1.02; (1 pages).

Cover of Audio Times magazine featuring "Video–Ready Hi Fi Meets Stereo TV at CES;" vol. 24, No. 8; Dated Jun. 1984; (1 page).

Cover of CES Daily News magazine featuring "Digital Audio Disk takes on a new Meaning" and "Digital Audio with a Disk;" Dated Jun. 2, 1984; (1 page).

Cover of Newsweek magazine bearing an article entitled "A Digital Recorder for the Home;" Dated Jul. 2, 1984; (1 page).

Cover of Fortune magazine; Dated Nov. 12, 1984; (1 page).

Cover of U.S. News & World Report; Dated Jun. 18, 1984; (1 page).

"Cyberscene;" Copyright 1997 Sentinel Communications Co.; Orlando Sentinel (Florida); Mar. 1, 1997, (2 pages).

DADPro Digital Audio Delivery System Brochure, Enco America, Farmington Hills, MI, 1995.

Davis, Judith R., "PC Lans Revisited;" Patricia Seybold's Office Computing Report; vol. 11, No. 4; Dated Apr. 1988; (1 page).

Design and Engineering 1984; (1 page).

Dialog printout featuring items 7 and 8 from file 275; Dated 1984; (4 pages).

Digital Audio and Compact Disc Review; dated Sep. 1985; Two pages.

Digital Audio Telecommunications System diagram of AT&T Accunet Switch 58 or T1.5 Service; Copyright 1985 CompuSonics Corp.; (1 page).

Digital Recording Report Dated Apr. 1986; vol. 3, No. 4; (8 pages).

"Digital Recording System Uses Floppy Discs," Published in the Audio Times, vol. 26, No. 5; Dated May 1984; (2 pages).

Dumaine, Brian, "The Search for the Digital Recorder;" Fortune, Nov. 12, 1984; (1 page).

EMI Music Marketing; List of prices effective Aug. 2, 2004; (11 pages).

Enco Systems, DAD 486x Digital Audio Delivery System Operation Manual, version 6.0A, 1995.

"Enteractive Briefs: Near–CD–Quality Music Flowing from Internet." Copyright 1998 Billboard Publications, Inc.; Billboard; Nov. 16, 1996. (2 pages).

Flyer for CompuSonics DSP 1000 Digital Disk Recorder/Player—Preliminary Specifications; Copyright 1984; CompuSonics Corporation; (1 page).

Geimanl, A.D., Kobrinski, H., Smoot, L.S., and Weinstein, S.B.; "A Store–And–Forward Architecture for Video–On–Demand Service," Copyright 1991; (5 pages).

Golden, Marcia, "CompuSonics Fuses Computer, Audio Into 'World's First' Home Digital Recorder;" CES Trade News Daily; Dated Monday, Jun. 4, 1984; (1 page).

"Grass Valley Group Integrated Production System: IPS 100 Operator's Guide." 1988. Grass Valley Group, Inc. p. 7–1. (3 pages).

Green, James L., "The New Space and Earth Science Information Systems at NASA's Archive;" Government Information Quarterly—An Inernational Journal of Resources, Services, P.

"Hearing the Future" published in the Seattle, WA Times; Dated Jun. 8, 1984; (1 page).

"High–Fidelity Heaven?" Published in Forbes on Dec. 29, 1986; (3 pages).

Huber, David Miles. "Audio Production Techniques for Video." 1987. pp. 286–293. (5 pages).

Hurst, R.N., "Digital Video Interactive: The Technology and Its Application;" SPIE vol. 899; Optical Storage Technology and Applications; Dated 1988; (10 pages).

IntoWorld—The Newsweekly for Microcomputer Users; vol. 6, Iss. 23; Dated May 11, 1984; "From the Desk;" One page.

Kaplan, Karen. "Heard on the Beat; Sound of CD–quality Music Flowing on Web." Copyright 1996 The Times Mirror Company; Los Angeles Time; Nov. 25, 1998. (2 pages).

Kuroyanagi, Nortyoshi; "IEEE/IEICE Global Telecommunications Conference 1987 Globecom '87 Tokyo Conference Proceedings;" vol. 3 of 3; (15 pages).

"LaKart–200 Multi–Channel Automation Systems" promotional materials. 1991. BASYS Automation Systems, Inc. (9 pages).

Lear, James L., Manco–Johnson, Michael, Feyerabend, Angela, Anderson, Gene and Robinson, David; "Ultra–High–Speed Teleradiology with ISDN Technology;" Radiology; Jun. 1989; (3.

"Liquid Audio Brings Dolby Digital Intenet Audio to Macintosh Computers." Copyright 1997 Business Wire, Inc., Business Wire; Apr. 7, 1997 (2 pages).

Liquid Audio—Liquid Audio Debuts premier music on demand solution for the Internet; M2 Presswire; Copyright 1996 M2 Communications Ltd.; Dated Nov. 4, 1996; (2 pages).

Liquid Audio, Liquid Audio Sales brochure, Copyright 1998 Liquid Audio, Inc. (8 pages).

"Liquid Audio Liquid Player Five the CD Quality Music Player for the Internet;" Four pages; Copyright 1999 Liquid Audio, Inc.

Listing bearing the date Feb. 1, 1994 describing a package called "CD Player 2.0 for Windows."

Listing bearing the date Feb. 1, 1994 describing "CDAudio V.27U," a CD audio player.

Listing bearing the date Dec. 20, 1994 describing "Win-Disc," a CD audio player.

"Look and Listen;" The What's New Magazine Popular Science; Dated Sep. 1984; (1 page).

Lowery, Daryl. "Random–Access Digital Audio–Recording Systems." Jun. 1992.

M2 Presswire. "Liquid Audio—Liquid Audio Debuts Premier Music on Demand Solution for the Internet." Copyright 1998 MS Communications Ltd.; Nov. 4, 1998. (2 pages).

Mahon, Chandos, "N1 Finds a Match with Louth," TV Technology. Dec. 1994. (1 page).

Markoff, John. "Digital Commerce—New Ways of Sending Radio Over the Net Promise More Sound and Less Static." Copyright 1998 The New York Times Company; The New York Times; Aug.

Marshak, David S.; CD–Rom Listen to the Music; Patricia Seybold's Office Computing Report; vol. 11, No. 4; (6 pages).

"Master Control Manual: The Paperless and Cartless Studio System. Version 3.03." 1990–1994. Radio Computing Services, Inc. (216 pages).

"Master Control: System Training Outline." 1995–1996. Radio Computing Services, Inc., Scarsdale, NY. (205 pages).

"Master System" promotional material for Sadie Digital Editing. (2 pages).

McFedries, Paul. Alpha Books' "The Complete Idiot's Guide to Windows 95." Second Edition. 1997 Que Corporation. (404 pages).

McFedries, Paul and Wempen, Falthe. Microsoft's "The Complete Idiot's Guide to Windows 95" 1995 Que Corporation (412 pages).

McNab, "Towards the Digital Music Library: Tune Retrieval from Acoustic Input," pp. 11–96, Association of Computing Machinery, 1996.

Mereson, Amy, "Floppy–Disk Audio System," published in Science Digest Nov. 1984; (2 pages).

Morris, Sandra; "Digital Video Interactive—A New Integrated Format for Multi–Media Information;" Dated Dec. 1987; (13 pages).

"Multiple Choice CD Players Help Spur Market Demand," published in Sight & Sound; Sep. 1984; (2 pages).

Murphy, Karen, et al., "RCS Works. OG2: The On–Air Workstation, User's Guide and Reference Manual." Nov. 15, 1994, RCS, Scarsdale, NY, (45 pages).

Network Access; Dated Jun. 21, 1989; (2 pages).

Wold, "Content–Based Classification, Search, and Retrieval of Audio," pp. 27–36, Institute of Electrical and Electronics Engineers, 1996.

"Wegener Announces MPEG–Based System for Broadcasters Using Micropolis Video Servers," Mar. 27, 1995.

Article believed to have been published Aug. 3, 1997 entitled "World Wide Wurlitzer."

Banger, Jessica L. and Achwartz, David: Independent Consultant Agreement between Well, Gotshal, & Mangers and RealNetworks, Inc.; Mar. 25, 2004; (3 pages).

Computer program dated Jun. 21, 1985; (2 pages).

"Content–Based Classification, Search, and Retrieval of Audio," World et al, IEEE 1070–986X/96, IEEE 1996.

Digital Recording Report Dated Apr. 1986, vol. 3, No. 4; (8 pages).

M2 Presswire, "Liquid Audio—Liquid Audio Debuts Premier Music on Demand Solution for the Internet." Copyright 1996 MS Communications Ltd.; Nov. 4, 1996, (2 pages).

"Towards the Digital Music Library: Tune Retrieval from Acoustic Input," McNab et al, DL '96, ACM 0–89791–830–4/96, ACM 1996.

USA Today; Computerline "Spin a Musical Disk on Personal Computer;" (1 page).

"News" article about CompuSonics DATS (digital audio transmission system).

"Liquid Audio Strikes Key Partnerships, Technology Deals To Deliver a Sound and Marketable Internet Solution," Multimedia Week, Sep. 2, 1998.

Judge Everingman, Markman Order in Civil Action No. 2–05CV–506.

Jakob Nielsen, "Comparative Design Review: An Exercise in Parallel Design," Apr. 24–29, 1993.

"Technology: Digital Commerce; New ways of sending radio over the Net promise more sound and less static," New York Times, Aug. 12, 1996.

"Liquid Audio Strikes Key Partnerships, Technology Deals To Deliver a Sound and Marketable Internet Solution," Multimedia Week, Sep. 2, 1996.

"Liquid Audio," M2 Presswire, Nov. 4, 1996.

ENCO Systems, DAD486x Digital Audio Delivery System Operation Manual, version 6.0A, 1995.

ENCO Systems, DAD486x Digital Audio Delivery System Brochure, 1995.

Nielsen, Jakob et al. "Comparative Design Review: An Exercise in Parallel Design". Apr. 24–29, 1993. Interchi '93.

Lowery, Daryl. "Random–Access Digital Audio–Recording Systems". Jun. 1992.

Microsoft's "The complete Idiot's Guide to Windows 95" by Paul McFedries with Faithe Wempen, 412 pages; 1995 Que Corporation.

Alpha Books' "The Complete Idiot's Guide to Windows 95"; Second Edition by Paul McFedries; 1997 Que Corporation; 404 pages.

Liquid Audio White Paper: Buying Music Over the Internet; By: Ruth Colombo; Copyright 1997 by Liquid Audio, Inc.; Dated Aug. 8, 1997; Seven (7) pages.

Digital Commerce—New ways of sending radio over the Net promise mor sound and less static; By: John Markoff; Copyright 1996 The New York Times Company; The New York Times; Dated Aug. 12, 1996—Late Edition; Two (2) pages.

Heard on the beat; Sound of CD–quality music flowing on web; By Karen Kaplan; Copy right 1996 The Times Mirror Company; Los Angeles Times; Dated Nov. 25, 1996—Home Edition; Two (2) pages.

Enteractive Briefs: Near–cd–Quality music flowing from internet; Copyright 1996 Billboard Publications, Inc.; Billboard; Dated Nov. 16, 1996; Two (2) pages.

Cyberscene; Copyright 1997 Sentinel Communications Co., Orlando Sentinel (Florida); Dated Mar. 1, 1997—Metro; Two (2) pages.

Liquid Audio Brings Dolby Digital Internet Audio to Macintosh Computers; Copyright 1997 Business Wire, Inc., Business Wire; Dated Apr. 7, 1997; Two (2) pages.

Liquid Audio Delivers Dolby Digital Music via Web; By Jeremy Carl; Copyright 1997 Mecklermedia Corporation, Internet World; Dated Mar. 24, 1997; Two (2) pages.

Liquid Audio Sales brochure by Liquid Audio; Copyright 1998 Liquid Audio, Inc.; Eight (8) pages.

List bearing the date Jan. 24, 1996 describing A Real 32 Bit Windows 95 CD Player.

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–96 are cancelled.

\* \* \* \* \*